US012503259B2

United States Patent
Colson et al.

(10) Patent No.: US 12,503,259 B2
(45) Date of Patent: Dec. 23, 2025

(54) 3-D PRINTED PACKAGING

(71) Applicants: Shay C. Colson, Bellingham, WA (US); David A. Divine, Nine Mile Falls, WA (US); David S. Thompson, Spokane, WA (US); Patrick Molvik, Newport, WA (US); James L. Schmeling, Brookeville, MD (US)

(72) Inventors: Shay C. Colson, Bellingham, WA (US); David A. Divine, Nine Mile Falls, WA (US); David S. Thompson, Spokane, WA (US); Patrick Molvik, Newport, WA (US); James L. Schmeling, Brookeville, MD (US)

( * ) Notice: Subject to any disclaimer, the term of this patent is extended or adjusted under 35 U.S.C. 154(b) by 497 days.

(21) Appl. No.: 17/713,208

(22) Filed: Apr. 4, 2022

(65) Prior Publication Data
US 2022/0348363 A1    Nov. 3, 2022

Related U.S. Application Data

(60) Continuation-in-part of application No. 16/894,878, filed on Jun. 7, 2020, now Pat. No. 11,565,837, and
(Continued)

(51) Int. Cl.
*B29C 41/20* (2006.01)
*B29C 64/112* (2017.01)
(Continued)

(52) U.S. Cl.
CPC .............. *B65B 3/02* (2013.01); *B29C 64/112* (2017.08); *B29C 64/118* (2017.08);
(Continued)

(58) Field of Classification Search
CPC ..... B29C 41/20; B29C 64/106; B29C 64/112; B29D 99/001; B29D 99/0021;
(Continued)

(56) References Cited

U.S. PATENT DOCUMENTS

2009/0271323 A1* 10/2009 Zinniel ................. B33Y 40/20
705/26.1
2012/0287470 A1* 11/2012 Pettis ...................... B33Y 30/00
358/1.15
(Continued)

FOREIGN PATENT DOCUMENTS

KR          102055346 B1 * 12/2019 ............. G06Q 30/06

OTHER PUBLICATIONS

Translation of KR 102055346 B1 (published on Dec. 12, 2019).*

*Primary Examiner* — Leo B Tentoni

(57) ABSTRACT

Items may be packaged for shipping or storage using additive manufacturing techniques, also known as three dimensional (3-D) printing. Packages made by such processes may be referred to as 3-D printed packages and may include packing material printed at least partially around the item(s) and/or an outer cover printed about at least a portion of an exterior of the packing material and/or the item(s). A packaging system may include a 3-D printer and a computing device communicatively coupled to the 3-D printer. The computing device may obtain a packaging model describing a package for one or more items. A print module of the computing device may include instructions to print the package at least partially about the item(s) according to the packaging model.

18 Claims, 16 Drawing Sheets

Related U.S. Application Data a continuation-in-part of application No. 16/214,053, filed on Dec. 8, 2018, now Pat. No. 11,716,211, and a continuation-in-part of application No. 15/901,893, filed on Feb. 22, 2018, now Pat. No. 11,292,622, said application No. 16/894,878 is a division of application No. 15/817,210, filed on Nov. 18, 2017, now Pat. No. 10,676,219, said application No. 16/214,053 is a continuation-in-part of application No. 15/721,726, filed on Sep. 29, 2017, now abandoned, said application No. 15/901,893 is a continuation-in-part of application No. 15/721,731, filed on Sep. 29, 2017, now abandoned, said application No. 16/214,053 is a continuation-in-part of application No. 15/721,731, filed on Sep. 29, 2017, now abandoned, application No. 17/713,208 is a continuation-in-part of application No. 15/594,640, filed on May 14, 2017, now Pat. No. 11,292,241, said application No. 15/901,893 is a continuation of application No. 14/992,005, filed on Jan. 10, 2016, now abandoned, which is a continuation of application No. 14/146,725, filed on Jan. 3, 2014, now Pat. No. 9,248,611.

(60) Provisional application No. 62/631,509, filed on Feb. 16, 2018, provisional application No. 62/485,967, filed on Apr. 16, 2017, provisional application No. 62/462,355, filed on Feb. 23, 2017, provisional application No. 62/424,390, filed on Nov. 19, 2016, provisional application No. 62/403,125, filed on Oct. 1, 2016, provisional application No. 61/887,973, filed on Oct. 7, 2013.

(51) Int. Cl.

| | | |
|---|---|---|
| *B29C 64/118* | (2017.01) | |
| *B29C 64/124* | (2017.01) | |
| *B29C 64/153* | (2017.01) | |
| *B29D 99/00* | (2010.01) | |
| *B33Y 10/00* | (2015.01) | |
| *B33Y 30/00* | (2015.01) | |
| *B33Y 40/00* | (2020.01) | |
| *B33Y 80/00* | (2015.01) | |
| *B65B 3/02* | (2006.01) | |
| *B65B 5/02* | (2006.01) | |
| *B65B 57/12* | (2006.01) | |
| *B65B 59/00* | (2006.01) | |
| *B65B 61/26* | (2006.01) | |
| *B65D 1/40* | (2006.01) | |
| *B65D 81/02* | (2006.01) | |
| *G06Q 10/083* | (2023.01) | |
| *G06Q 10/0833* | (2023.01) | |
| *G06Q 10/0834* | (2023.01) | |
| *G06Q 20/40* | (2012.01) | |
| *G06Q 30/018* | (2023.01) | |
| *G06Q 30/06* | (2023.01) | |
| *B29L 31/00* | (2006.01) | |
| *B65D 25/34* | (2006.01) | |
| *B65D 65/46* | (2006.01) | |

(52) U.S. Cl.
CPC ......... *B29C 64/124* (2017.08); *B29C 64/153* (2017.08); *B29D 99/001* (2013.01); *B29D 99/0021* (2013.01); *B33Y 30/00* (2014.12); *B33Y 40/00* (2014.12); *B33Y 80/00* (2014.12); *B65B 5/02* (2013.01); *B65B 57/12* (2013.01); *B65B 59/001* (2019.05); *B65B 61/26* (2013.01); *B65D 1/40* (2013.01); *B65D 81/022* (2013.01); *G06Q 10/083* (2013.01); *G06Q 30/0185* (2013.01); *B29L 2031/712* (2013.01); *B29L 2031/7126* (2013.01); *B29L 2031/7162* (2013.01); *B33Y 10/00* (2014.12); *B65B 2210/04* (2013.01); *B65D 25/34* (2013.01); *B65D 65/466* (2013.01); *B65D 2203/00* (2013.01); *G06Q 2220/00* (2013.01); *Y02W 90/10* (2015.05)

(58) Field of Classification Search
CPC ......... B29L 2031/712; B29L 2031/762; B33Y 10/00; B33Y 30/00; B65B 3/02; B65B 5/02; B65B 57/12; B65B 59/001; B65B 61/26; B65B 2210/04; B65D 1/40; B65D 25/34; B65D 65/466; B65D 81/022; B65D 2203/00; G06Q 10/083; G06Q 10/0833; G06Q 10/0834; G06Q 20/40; G06Q 20/401; G06Q 30/0185; G06Q 30/06; G06Q 2220/00
USPC ............... 264/279, 279.1, 308; 53/410, 411; 705/44, 64, 65, 67, 75, 318, 332, 333, 705/334

See application file for complete search history.

(56) References Cited

U.S. PATENT DOCUMENTS

| | | | |
|---|---|---|---|
| 2015/0099087 A1* | 4/2015 | Reznar | B29C 64/112 428/68 |
| 2017/0046806 A1* | 2/2017 | Haldenby | G06Q 20/401 |
| 2018/0255131 A1* | 9/2018 | Stöcker | G06Q 10/083 |

* cited by examiner

3-D PRINTED PACKAGING

RELATED APPLICATIONS

This application is a continuation in part of U.S. patent application Ser. No. 15/594,640 filed May 14, 2017 (now U.S. Pat. No. 11,292,241). This application is also a continuation in part of U.S. patent application Ser. No. 16/894,878 filed Jun. 7, 2020 (now U.S. Pat. No. 11,565,837), which is a divisional of U.S. patent application Ser. No. 15/817,210 filed Nov. 18, 2017 (now U.S. Pat. No. 10,676,219), which claims the benefit of priority to U.S. Provisional Application No. 62/424,390 filed Nov. 19, 2016. This application is also a continuation in part of U.S. patent application Ser. No. 15/901,893, filed Feb. 22, 2018, which is a continuation of U.S. patent application Ser. No. 14/992,005 filed Jan. 10, 2016, which is a continuation of U.S. patent application Ser. No. 14/146,725, filed Jan. 3, 2014 (now U.S. Pat. No. 9,248,611), which claims the benefit of priority to U.S. Provisional Application No. 61/887,973, filed Oct. 7, 2013. U.S. patent application Ser. No. 15/901,893 is also a continuation of U.S. patent application Ser. No. 15/721,731 filed Sep. 29, 2017, which claims the benefit of priority to U.S. Provisional Application No. 62/403,125 filed Oct. 1, 2016 and to U.S. Provisional Application No. 62/485,967 filed Apr. 16, 2017. U.S. patent application Ser. No. 15/901,893 also claims the benefit of priority to U.S. Provisional Application No. 62/462,355 filed Feb. 23, 2017. This application is also a continuation in part of U.S. patent application Ser. No. 16/214,053 filed Dec. 8, 2018 (now U.S. Pat. No. 11,716,211), which is a continuation in part of U.S. patent application Ser. No. 15/721,726 filed Sep. 29, 2017, which claims the benefit of priority to U.S. Provisional Application No. 62/403,125 filed Oct. 1, 2016 and to U.S. Provisional Application No. 62/485,967 filed Apr. 16, 2017. U.S. patent application Ser. No. 16/214,053 is also a continuation in part of U.S. patent application Ser. No. 15/721,731 filed Sep. 29, 2017, which claims the benefit of priority to U.S. Provisional Application No. 62/403,125 filed Oct. 1, 2016 and to U.S. Provisional Application No. 62/485,967 filed Apr. 16, 2017. U.S. patent application Ser. No. 16/214,053 also claims the benefit of priority to U.S. Provisional Application No. 62/631,509 filed Feb. 16, 2018. All of the foregoing applications are incorporated herein by reference in their entirety.

BACKGROUND

Products are commonly packaged by a manufacturer or distributor prior to sale. This sort of packaging is referred to as "retail packaging." Retail packaging varies widely depending on the products to be packaged, the size and the weight of the products, the durability or fragility of the products, where and how the products are to be sold, and numerous other factors. The retail packaging for a particular product is often designed specifically for the particular product. Considerable time and expense goes into designing retail packaging for a product. Due to the specialized nature of retail packaging, the retail packaging for one product is not likely to be suitable for another product. Thus, the cost of designing retail packaging for a product significantly increases the cost of making the product available for sale. Such upfront design costs may make retail packaging of some low volume or limited run products cost prohibitive.

Products and other items (collectively referred to as "items") may subsequently be packaged for storage and/or shipping. This sort of packaging is referred to as "non-retail packaging." Non-retail packaging typically employs general-purpose packaging supplies, such as cardboard boxes, bubble wrap, polystyrene peanuts, tissue paper, shrinkwrap, packing tape, and the like. Such general-purpose packaging supplies are readily available, but are not particularly suited for the specific items to be packaged. Consequently, items may be damaged during storage and/or transportation. Furthermore, the effectiveness of packaging is dependent largely on how the user chooses to package the item. Many users lack the skills or experience to effectively package items.

Accordingly, there remains a need for improved methods of retail and non-retail packaging.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This application describes using 3-D printing or other additive manufacturing techniques for retail packaging (i.e., packaging of a product prior to sale by a manufacturer, distributor, or the like) and/or non-retail packaging (e.g., packaging for storage, shipping, or the like). As used herein, the term non-retail packaging refers to any packaging for storage and/or shipping, whether performed before or after a sale to a consumer. That is, non-retail packaging includes shipping from a manufacturer to a customer, shipping from a manufacturer to distributor, shipping from a distributor to a customer, shipping from any image individual to another, and/or packaging item(s) for storage.

In some instances, the techniques described herein may be used to generate retail packaging for new products and/or existing products (e.g., repackaging of products with damaged or opened packaging, to refresh or update packaging, to package the product for a new or different market, to add additional or alternative packaging features, etc.). The techniques described herein may additionally or alternatively be used to generate non-retail packaging for products and other items (unpackaged items, items packaged using conventional retail packaging techniques, and/or items packaged using the retail packaging techniques described herein). In some instances, the techniques described herein may be usable to generate packages that serve as both retail packaging and non-retail packaging. Additionally, in some examples, the techniques described herein may be used in conjunction with 3-D printing of products themselves. For instance, after printing a product using 3-D printing techniques, a retail or non-retail package may then be printed for the product. The package may be printed as part of a same printing operation as the product itself, or as a separate printing operation in the same or different printing area.

While many of the examples are described as using 3-D printing and/or being implemented by a 3-D printer, the techniques described herein are also applicable to other forms of additive manufacturing. Unless specifically noted to the contrary, the terms "3-D printing" and "3-D printer" are used herein to mean additive manufacturing and additive manufacturing machines, respectively.

Example 3-D Printed Packaging System

Figure 1:
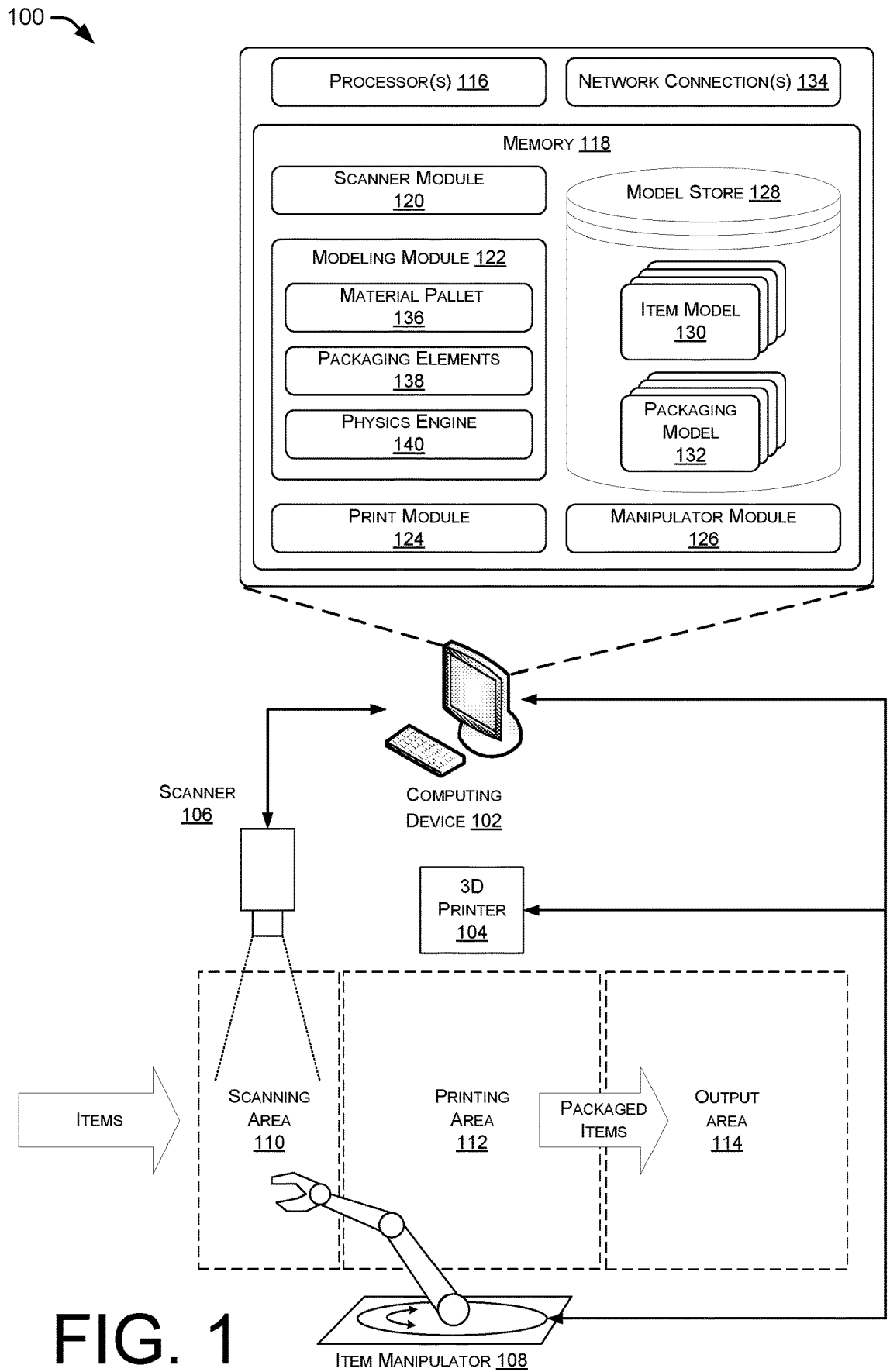
FIG. 1 is a schematic diagram of an example system usable to package items using 3-D printing.

FIG. 1 illustrates a system 100 usable to implement 3-D printed packaging of items. The system 100 may be used to provide retail packaging for products that are for sale to consumers. The system 100 may additionally or alternatively be used to provide non-retail packaging for other items. In the case of non-retail packaging, the items may or may not already include some packaging (e.g., retail packaging).

As shown in FIG. 1, system 100 includes a computing device 102 in communication with a 3-D printer 104. In the illustrated example, the system 100 also includes a scanner 106 and an item manipulator 108. However, in other examples, the scanner and/or manipulator may be omitted or combined with each other, the 3-D printer 104, and/or computing device 102. When present, the scanner 106 may comprise a 3-D optical scanner, a 3-D laser scanner, and/or one or more cameras to obtain information about an item, such as its visual appearance, outer dimensions, or the like. Numerous different scanners are available, such as, for example, the exaCT-s® CT Workstation or the Shapetracer Laser Line Scanner, both available from Wenzel America of Wixom, Michigan, or the Artec Spikder, Artec L, or Artec EVA 3-D Scanners available from Artec Group of Palo Alto, California. In some examples, the scanner 106 may additionally or alternatively comprise an ultrasound scanner, an x-ray scanner, a spectrometer, a scale, and/or other scanning or sensing equipment to determine interior characteristics of the item, materials from which the item is made, weight of the item, volume of the item, density of the item, and the like.

In some examples, the computing device 104 may "recognize" the item based on the scan. The computing device 104 may recognize the item by, for example, reading a product identifier (e.g., universal product code or "UPC", model number, serial number, bar code, quick response code, or other identifier) of the item (if available), and then query a product catalog, model store, or other database to obtain additional information about the item. The computing device 102 may additionally or alternatively recognize the item using object recognition (e.g., by comparing the scan or a vector representation of the scan to a database of reference scans or images of items). Once an item is recognized, the computing device 104 may obtain additional information about the item such as a computer model of the item, a textual description of the item, product reviews of the item, human input information about the item, web pages related to the item, or any other available information about the item.

The item manipulator 108 may comprise a robotic arm or other computer controlled manipulator. In some examples, the item manipulator 108 may be specialized to move the item within the system 100. For instance, the item manipulator 108 may include specialized hardware (e.g., item engaging tools designed specifically for a particular type or shape of item) and/or software (e.g., customized code for a particular operation or set of operations). In that case the item manipulator 108 may be capable of limited and/or predetermined motions. However, in other examples the item manipulator 108 may comprise a robotic arm with a configurable or articulatable item-engaging tool or other manipulator having multiple degrees of freedom and capable of a wide range of motion. Numerous different manipulators are available depending on the specific tasks to be performed. In one specific example, a six-axis robotic arm, such as the Adapt Viper line of robotic arms available from Adept Technology, Inc. of Pleasanton, California. In some embodiments, the item manipulator 108 may additionally or alternatively comprise a conveyor belt, rollers, or other mechanisms to move items from one location and/or orientation to another.

The computing device 102, 3-D printer 104, scanner 106, and/or item manipulator 108 are in communication with one another over a wired and/or wireless network. The network of system 100 may be further connected to one or more other local and/or wide area networks, such as the Internet.

When an item is received, the item may be placed in a scanning area 110, where the item may be scanned by the scanner 106 to determine the nature of the item. Once the item has been scanned and the system 100 has determined the nature of the item to be packaged, the item may be moved to a printing area 112 where the item will be packaged. The item may be packaged alone or with one or more other items (e.g., other items that are part of a same order and/or are to be shipped to the same location). Once the item(s) are packaged, the packaged item(s) may be output to an output area 114 for storage, shipping, and/or further processing. The following description describes the process of packaging a single item. However, it should be understood that the process may also be used to print packaging for/around multiple items.

The computing device 102 comprises one or more processors 116 and memory 118. The processor(s) 116 may comprise one or more microprocessors (e.g., central processing units, graphics processing units, etc.), each having one or more processing cores, one or more microcontrollers, or the like. The memory 118 may be configured to store one or more software and/or firmware modules, which are executable by the processor(s) 116 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The memory 118 may comprise computer-readable media and/or devices and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media includes hardware and does not include modulated data signals or carrier waves.

Referring back to FIG. 1, the memory 118 includes a scanner module 120, a modeling module 122, a print module 124, and manipulator module 126, and a model store 128. The scanner module 120 may provide an interface (e.g., driver, application programming interface or "API," or the like) to the scanner 106. For instance the scanner module 120 may provide commands to control the scanner 106 to obtain information about the item. The scanner module 120 may additionally receive the output of scanner 106 (i.e., the scanned image(s) or sensor data captured by the scanner 106). From the output of the scanner 106, the scanner module is able to generate an item model 130 (if one did not already exist) or may select and/or supplement an existing item model 130 (if one already exists). Once generated, selected, and/or supplemented, the item model 130 may be stored in the model store 128 or other repository for subsequent access by local and/or remote computing devices.

The modeling module 122 generates a computer model of the packaging that is to be applied to the item. In other words, the modeling module 122 determines the geometry and layout of the package that should be used to package the item, taking into account the item model 130. The modeling module 122 generates a packaging model 132 describing the geometry layout of the package. The packaging model 132 may be stored in the model store 128. While the item models and packaging models are both shown as being stored in model store 128 in this example, in other examples the item models and packaging models may be stored separately in memory 118 or at one or more other data stores in communication with the computing device 102. The modeling module 122 may be a stand alone module, or may be a part of, an add-on to, or may otherwise integrate with, a 3-D modeling program such as SolidWorks available from Dassault Systèmes SolidWorks Corp. of Waltham, Massachusetts, Pro-Engineer available from PTC of Needham, Massachusetts, or the like.

Print module 124 may provide an interface (e.g., driver, application programming interface or "API," or the like) between the computing device 102 and the 3-D printer 104. For example, the print module 124 may include a printer driver and may provide commands controlling a print head of the 3-D printer. Print module 124 may control the 3-D printer 104 to generate packaging for the item according to packaging model 132. The print module 124 may control, among other things, the material or materials from which the package is to be printed, print speed of a print head of the 3-D printer 104, size and shape of packing material and/or an outer surface or shell of the package.

The manipulator module 126 may provide an interface (e.g., driver, application programming interface or "API," or the like) between the computing device 102 and the item manipulator 108. For example, the manipulator module 126 may be usable by the computing device 102 to direct the item manipulator 108 to move the item before, during and/or after printing the package. For instance, the manipulator module 126 may direct the item manipulator to place the item into the scanning area 110, to rotate or otherwise move the object in the scanning area 110, to move the object from the scanning area 110 into the printing area 112, to rotate or otherwise move the object in the printing area 112, and/or to remove the item from the printing area 112.

The computing device 102 also includes one or more network connections 134 to connect the computing device 102 to the other devices in the system 100, as well as to one or more other local and/or wide area networks. In some examples, the network connections 134 may allow a user, such as a purchaser of an item, to specify how the item is to be packaged for shipping to the purchaser or another intended recipient.

When the item is placed in the scanning area 110, the scanner 106 may scan the item. From the scan, the computing device 102 may obtain information to determine the nature of the item from one or more sources. For instance, as discussed above, the computing device 102 may recognize the item based on a product identifier or based on object recognition. If the computing device 102 recognizes the item, the computing device 104 may query one or more data sources to obtain additional information about the item. For instance, the computing device 102 may reference the model store 128 to determine whether or not a computer model of the item exists. If a computer model of the item exists, the computing device 102 may reference an item model 130 corresponding to the item to determine the geometry, materials, weight, volume, density, and/or other characteristics of the item. If a computer model of the item is not available, the computing device 102 may scan the item using scanner 106 to determine one or more characteristics of the item. In some instances the computing device 102 may have or be able to obtain (e.g., through external resources via the Internet) a complete item model 130 including exterior dimensions, interior dimensions, weight, volume, density, materials of construction, surface finish, and the like. In other instances, the computing device 102 may have a limited or partial item model 130, which describes less than all characteristics of the item. For instance a limited or partial item model might only include exterior dimensions of the item.

Based on item model 130 the item, modeling module 122 may construct or obtain (e.g., through external resources via a network such as the Internet) a packaging model 132 for the item. The modeling module 122 may include a material palette 136 defining the materials that are available from which to construct a package for the item. The modeling module 122 may further include one or more packaging elements 138, such as templates and previously stored design elements. For instance, packaging elements 138 may include computer models of ribs, flanges, honeycomb structures, bubble structures, trusses, or other design elements, features, or parts. The modeling module 122 may also include a physics engine 140 to model forces that are likely to be applied by and/or to the item during storage, shipping, and/or sale. In one example, the physics engine 140 may take into account characteristics of the item (e.g., size, shape, weight, fragility/durability, etc.) based on the item model 130, material properties (e.g., strength, elasticity, ductility, hardness, etc.) of the item and available packaging materials from the material pallet 136, forces to which the item may be exposed (e.g., gravity, inertia, impact, air resistance, etc.), and/or other factors (e.g., price, scarcity, shipping mode, storage location, intended use, etc.) obtained from item catalogs, product reviews, web sites, and/or other sources. In some instances, the physics engine 140 may obtain such information for an item at least in part from a product identifier of the item. The foregoing description is of just one example, and in other examples, the physics engine 140 and modeling module 122 may obtain information needed to perform their respective functions directly or indirectly from the enumerated sources, or from other available sources.

Based on the foregoing criteria, modeling module 122 may generate the packaging model 132 customized for the item to withstand the forces that are likely to be applied. For example, the physics engine 140 may determine that, based on a strength and weight of the item and a distance that the item is likely to be dropped during shipping, the packaging should be able to withstand a certain impact force. In another example, the physics engine 140 may determine that, based on the strength and weight item and a number of items that are commonly stacked on top of one another, the packaging should be able to support a certain static load. In some examples, the physics engine 140 may employ finite element analysis (FEA) or other mathematical techniques to model static and/or dynamic systems in which the item may be used/stored/shipped and/or the forces to which the item is likely to be exposed.

In other examples, instead of computing the forces to which the item is likely to be subjected, the physics engine 140 may categorize the item into one or more categories and may apply predetermined packaging rules, designs, or templates corresponding to the one or more categories. For instance, if the item has a density less than a certain threshold the physics engine 140 may categorize the item as being a "light weight" item. The physics engine 140 may further categorize the item as being a "fragile" item if, for example, it has relatively thin spans of material, is made of a brittle or low strength material, or is for other reasons susceptible to damage. The physics engine 140 may then identify (e.g., from a look up table or matrix) one or more packaging structures to use for the item based on the categorizations of "light weight" and "fragile." The physics engine may further modify or customize the packaging structures based on, for example, the size, weight, or other characteristics of the item. For instance, the physics engine 140 may determine a packing structure or combination of packing structures (e.g., bubble and web structures in this example) to use to package an item based on its categorization (e.g., "light weight" and "fragile"). The physics engine 140 may then adjust the number of packing structures (e.g., number of bubbles and/or webs, in this example), size of packaging structures (e.g., width, height, thickness, diameter, etc.), quantity of material used to generate the packing structures (e.g., mass or volume), the material from which the packing structures are constructed (e.g., hard plastic, elastomer, metal, etc.), and/or other characteristics of the packing structures (e.g., corner rounding, gussets, fillets, etc.) according to the characteristics of the item. In some embodiments, the physics engine 140 may additionally or alternatively take into account the value of the item, constraints on the cost of the package (e.g., what the customer is willing to pay), constraints on the size and/or weight of the package (e.g., due to postal or other delivery requirements), or other considerations.

Additional details of the packaging structures are described below in the section entitled "Example Packing Structures."

In some examples, before and/or after the item is placed in the printing area 112, the item may have a release applied so that the 3-D printed packaging does not stick to or damage the item. In one example, the computing device 102 may instruct the item manipulator to apply the release to the item, while in other examples the release may be applied to the item by another device or process prior to or after being placed in the printing area 112. In some examples, the release may comprise a chemical or material (e.g., corn starch, wax, paper, metal foil, etc.) applied to item to prevent the 3-D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3-D printed packaging material from adhering or bonding to the item. In still other examples, the release may be omitted (e.g., if the 3-D printed packaging material does not adhere to the material of the item, if a gap is maintained between the item and the 3-D printed packaging material during printing, and/or if it is desired that the 3-D printed packaging material adhere or bond to the item). In still other examples, a release may be applied to some parts of an item but not other parts, such as limited corners or edge points of the item to allow the package to adhere to, or form a weak bond with, the item (e.g., to secure the package to the item during shipping). In such an example, the limited corners or edge points that are not coated with the release may be sized and positioned such that the adhesion or weak bonds may be easily broken upon opening the package to separate the item from the package. The release may be applied before, during, or (in the case where part of the package is printed before the item is placed in the printing area) after the printing process commences.

Once the packaging model 132 has been generated and the item is otherwise ready for packaging (e.g., any desired release has been applied, any other items that are to be packaged with the item are present, etc.), the computing device 102 may initiate the printing process. In some examples, the item may be placed in the printing area 112 before printing commences and the package may be printed around the item. In other examples, at least a portion of a package may be printed before the item is placed in the printing area 112. For instance, the computing device 102 may instruct the 3-D printer 104 (e.g., via print module 124) to print a bottom or side surface and/or one or more support structures of a package prior to instructing the item manipulator 108 (e.g., via the manipulator module 126) to place the item into the printing area 112. The item manipulator 108 may then place the item into/onto the partially printed package (e.g., onto already printed support structures and/or into an already partially printed shell of a package), the computing device 102 may then cause the 3-D printer 104 to print the remainder of the package around the item.

In some examples, the package printed by the printing process may be one continuous part. In that case, the package may completely encapsulate the item or may cover only part of the item. In the case that the package encapsulates the item, the package may provide an air and/or water tight package. In some examples, the package may be hermetically sealed. Because the package is 3-D printed, the package may be seamless, minimizing chances that the package will catch on surfaces it comes into contact with and consequently minimizing the chances of damage to the package or the surfaces with which it comes into contact. The seamless surfaces of the package may also improve material handling capabilities. For instance, the seamless surfaces of the package may make the package easier to slide on conveyors, easier to pick up (e.g., with suction devices or grippers), easier to stack and load, etc. The seamless appearance may also provide a clean, aesthetically appealing appearance.

In other examples, the package maybe printed as multiple parts to facilitate opening or unpackaging the item. For instance, the package may comprise multiple parts that fit together like a 3-D puzzle and/or are held in place by one or more other parts. Additionally or alternatively, the package may include one or more opening features to help assist in the opening of the package. By way of example and not limitation, the package may include one or more thinned or frangible regions where the package is configured to separate during opening, one or more tabs or finger holds configured to be grasped by a user, or the like.

The package may additionally or alternatively include one or more of the following features:
  thermal insulation (e.g., regions of material having a low coefficient of thermal conductivity such as wood, polystyrene, cellulose or glass fiber insulation, air or other gasses, and/or a vacuum) and/or electrical insulation (e.g., dielectric material);
  vibration damping (e.g., regions of viscoelastic material such as rubber, silicone, synthetic polymers, wood, or composites including any of the foregoing);
  crumple zones (e.g., features designed to fail before the rest of the package) to absorb energy of impacts;
  child safety features (e.g., features requiring more strength, instruction reading ability, and/or dexterity to open than a typical child possesses);
  tamper resistant and/or tamper evident features (e.g., features that will clearly show once the package has been opened or tampered with, such as for example, 2-D or 3-D water marks, frangible regions that will break if tampered with, materials or indicators that change color or otherwise indicate when they are exposed to air or humidity, ink or dye in the package that if punctured will discolor the package indicating the tampering);
  desiccant material (e.g., received in pockets, pouches, or receptacles printed in the package and/or the package itself may be printed in whole or in part of a desiccant material);
  all or part of the package may form an accessory for the item (e.g., a charging stand for an electronic device, a cover for an electronic device, a pill holder for medication, etc.); and/or
  the package may be made in whole or in part of a recyclable material (e.g., thermoplastic, glass, metal, ceramic, etc.), biodegradable material (e.g., cellulose based materials, sand with organic binder such as glycerin, etc.), and/or water soluble material (e.g., sucrose, glycerin, corn starch, gelatin, etc.) such that the entire package may be recycled and/or disposed of without any subsequent sorting or separating.

During or after 3-D printing the package structure, one or more pieces of information may be printed onto the package. The information may include, for example, shipping information (e.g., sender and/or recipient address), postage for the package, a packing list of the item(s) in the package, shipping instructions (e.g., "fragile", "this end up," etc.), opening instructions, set up or assembly instructions, "quick-start instructions," description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3-D relief code, or the like), a date on which the package was printed, a location at which the package was printed, an entity that printed the package, an identifier of the printer that printed the package, or any other pertinent information. The information may be printed in 2-D or 3-D by the 3-D printer 104 or by a 2-D printer located in or proximate the printing area 112.

Hybrid 3-D Printed/Conventional Packaging

In some examples, 3-D printed packaging may be combined with one or more conventional packaging techniques to result in one or more hybrid techniques. In one example, the package may comprise a preprinted or preformed container, such as a cardboard box. A 3-D printed package or portion of a 3-D printed package (e.g., packing material) may be placed in or printed and the preprinted or preformed container. For instance, in one simple example 3-D printed packing material may be printed around an item, the item enclosed in the packing material may then be placed inside the preformed container. Alternatively, the preformed container may be placed in the printing area 112, a portion of packing material may be printed within the container, and item may be placed in the container and the partially printed packing material, and a remaining portion of the packing material may be printed around the item within the container.

In another example, a conventionally packaged item may further have a 3-D printed package printed around the conventional package. For instance, an item may be packaged in conventional packing materials such as bubble wrap, tissue paper, or the like and/or may be placed in a conventional container such as a cardboard box. The conventionally wrapped item may then be placed into the printing area 112, and a 3-D printed package including a shell and/or packing material may be printed around the conventionally packaged item.

Example Packing Structures

As discussed above, structure of package may be based upon the fragility of the item, the weight of the item, the shipping distance, shipping mode, and/or the value of the item. For instance, fragile items may be packaged with a more protective structure of packing material than sturdy items. Heavy items may be packaged with a more robust structure of packing material than light weight items. The shipping distance, shipping mode, and value of the item may also be taken into account, with further distances and higher values resulting in more robust packing structures than shorter distances and lower values. Likewise, certain shipping modes (e.g., freight, bulk rate, etc.) may result in more robust packing than others (e.g., airmail, courier, drone, etc.). The robustness of a package may be adjusted by adjusting one or more of the type of support structure (e.g., lattice structure, a honeycomb structure, a truss structure, a bubble structure, one or more support ribs, web structure, loose particles or fibers, etc.), quantity of packing material (e.g., volume, mass, thickness, etc.), material used for packing material (e.g., plastic, rubber, silicone, silicon, glass, metal, stone, composites of any of the foregoing, etc.), and/or characteristics of the packing material (e.g., strength of material, hardness, toughness, elasticity, vibration damping ability, thermal insulating ability, etc.).

Multiple different packing materials and/or support structures may be used to package the item. For example, different support structures and/or crumple zones may be used in different portions of the package. For example, a relatively hard and/or rigid inner support structure may be formed immediately around (e.g., directly surrounding) the item, while a softer and/or more flexible material may be formed around the inner support structure, or vice versa.

Figure 2A:
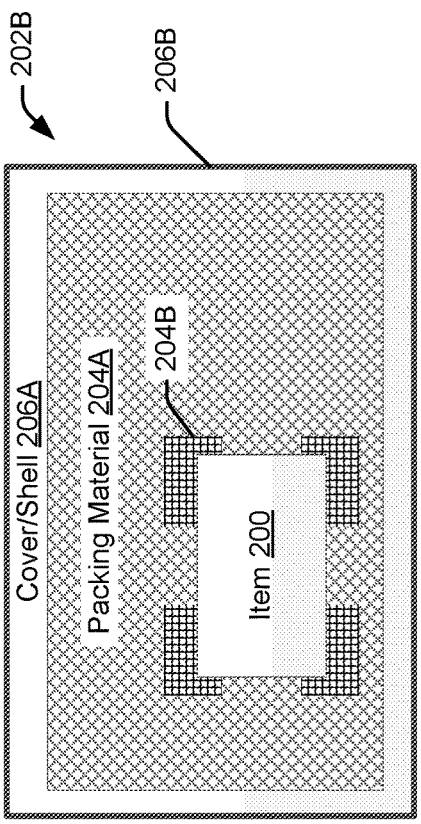
FIGS. 2A-2D are schematic diagrams illustrating example packaging techniques using 3-D printing.
Figure 2B:
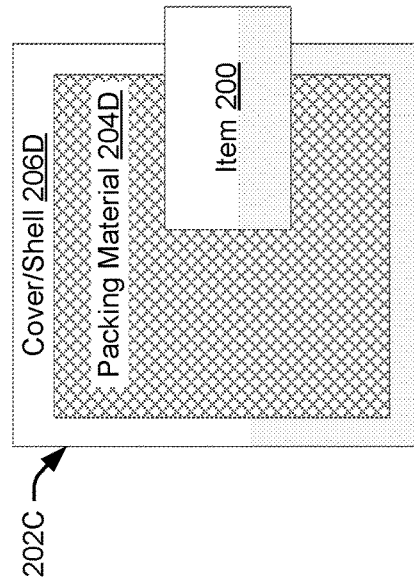
Figure 2C:
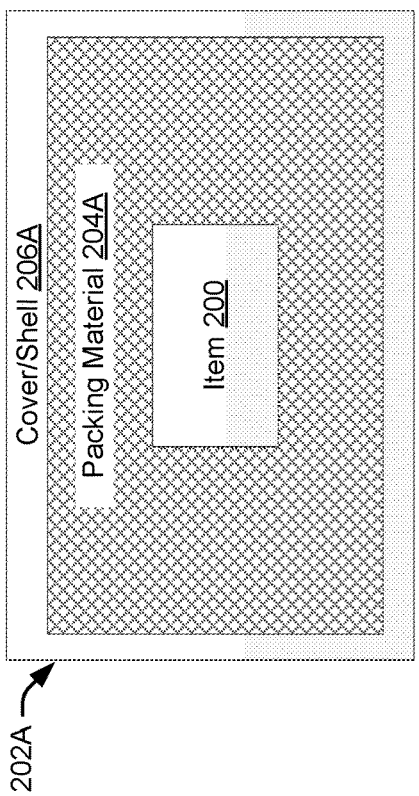
Figure 2D:
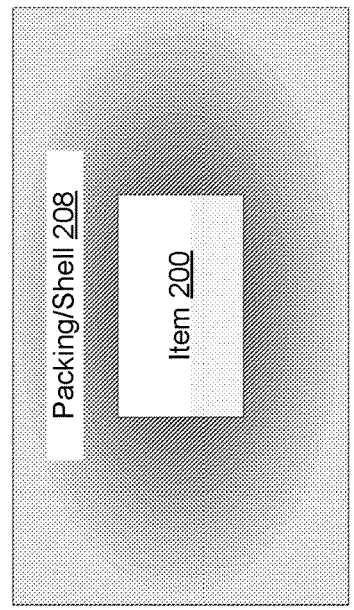
Figure 3A:
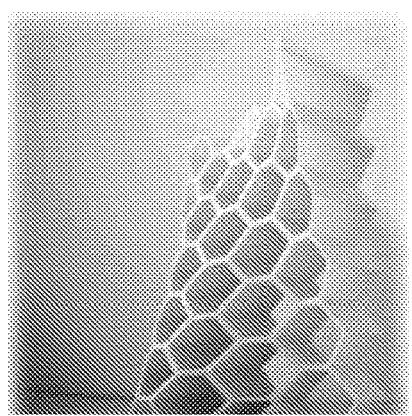
FIGS. 3A-3F illustrate example 3-D printed packaging structures that may be used to package items.
Figure 3B:
Figure 3C:
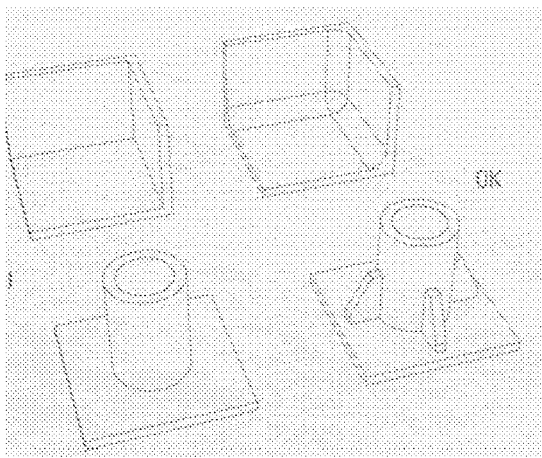
Figure 3D:
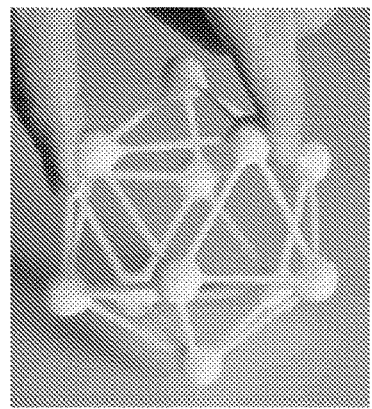
Figure 3E:
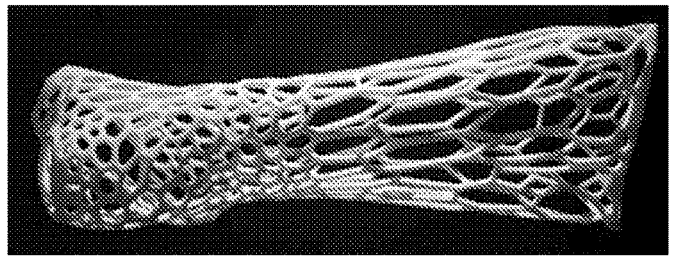
Figure 3F:
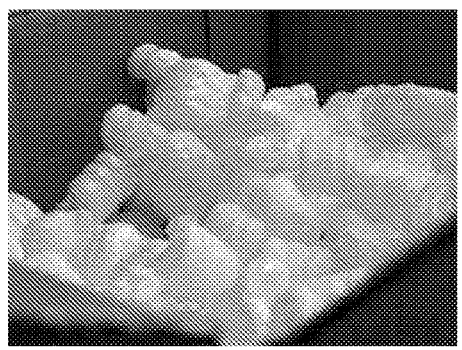
Figure 4A:
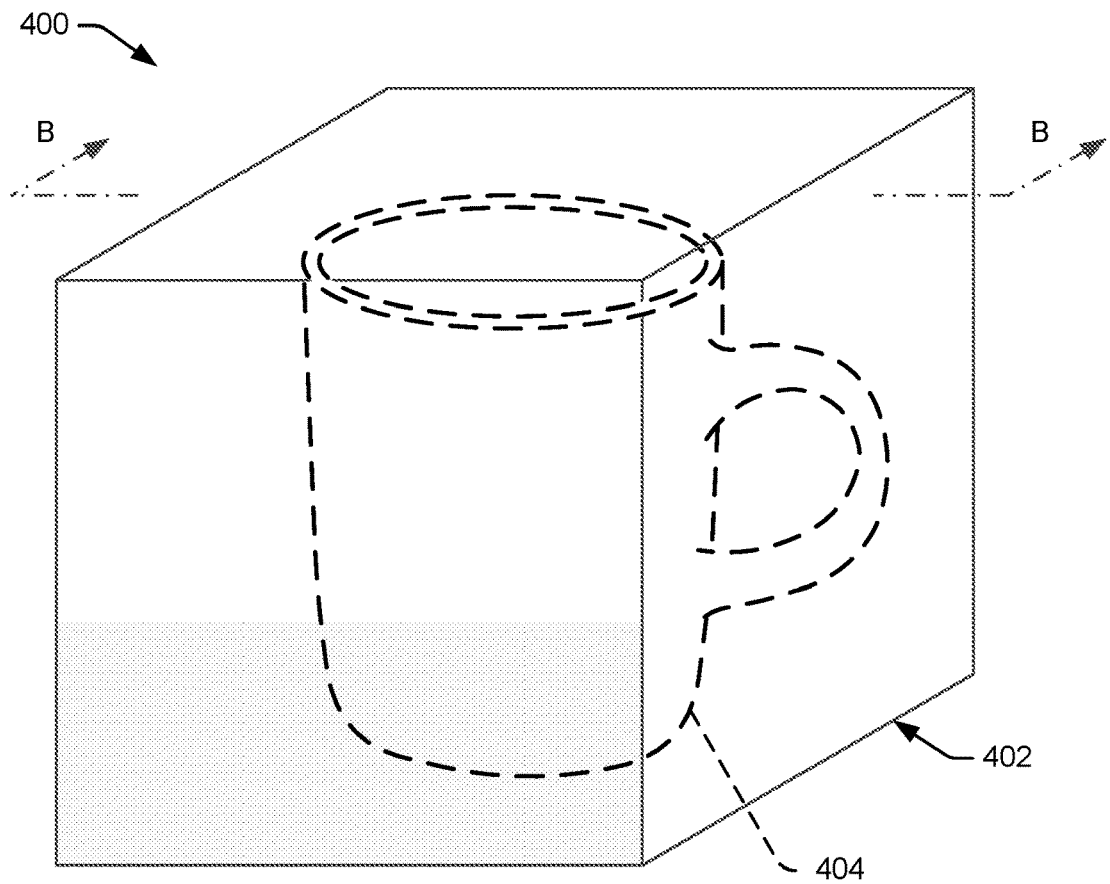
FIGS. 4A and 4B illustrate an example packaged item, packaged using 3-D printing.
Figure 4B:
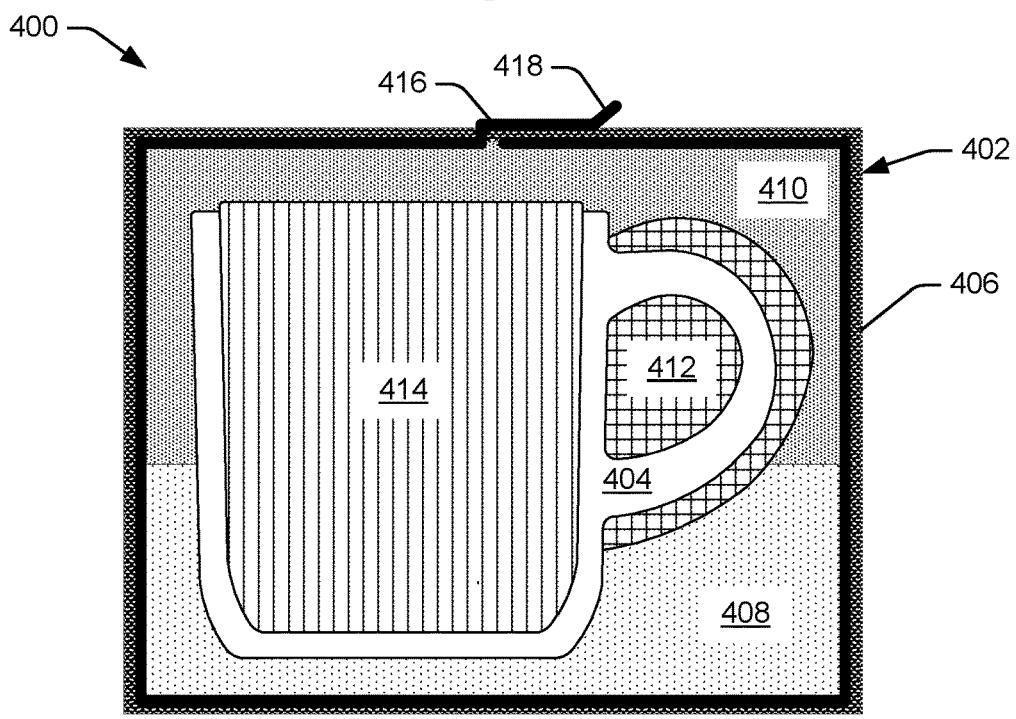

FIGS. 2A-2D illustrate example packaging techniques, FIGS. 3A-3F illustrate example packaging structures, and FIGS. 4A and 4B illustrate an example packaged item using packaging techniques and packaging structures such as those shown in FIGS. 2A-2D and FIGS. 3A-3F. However, numerous other packaging techniques and structures are possible within the scope of this disclosure by combining, rearranging, modifying, and/or omitting aspects of these and other examples described herein. The examples herein are merely examples for the purpose of illustration.

FIG. 2A illustrates an example in which an item 200 is packaged in a first example package 202A. The item 200 may represent any item that is to be packaged (retail packaging, non-retail packaging, or both). By way of example and not limitation, the item 200 may represent an item that is to be packaged for sale in a brick and mortar store, an item that is to be packaged for sale via an online merchant, an item to be placed in storage (e.g., long or short term storage), or an item that is to be shipped. Specific examples of items that may be packaged using these techniques are too numerous to list. A few arbitrary examples may include electronic devices, consumer products, medical devices, medication, food, etc.

The package 202A in this example completely surrounds or encapsulates the item 200, and includes packing material 204A that completely surrounds the item 200, and an outer cover or shell 206A disposed around an exterior of the packing material 204A. The packing material 204A may comprise a lattice structure, a honeycomb structure, a truss structure, a bubble structure, a web structure, one or more support ribs, loose particles or fibers, and/or other structures that may support the item 200 in the package 202A. Furthermore, the packing material 204A may comprise any of the materials described herein. The specific support structure(s) and/or material(s) used may depend on the desired strength, strength-to-weight ratio, density, rigidity, flexibility, vibration damping, impact absorption, thermal and/or electrical insulation, or other characteristics of the package 202A. In some examples, the size, material, and/or other characteristics of the package 202A may be based at least in part on a weight, durability, and/or cost of the item 200.

In the example of FIG. 2A, the packing material 204A is shown as being substantially homogenous throughout the package 202A. However, in other examples, the packing material may be heterogeneous (e.g., including multiple distinct areas of different support structures and/or different packing materials). Also, while the package 202A is shown as having only a single region of packing material 204A and a single shell 206A, in other examples packages may include multiple packing materials and/or regions of packing materials, and/or multiple outer covers or shells. In one specific example, a first portion of the packing material 204A (e.g., a region proximate to the item 200) may be printed of a desiccant material, such as silica, activated charcoal, calcium sulfate, calcium chloride, and molecular sieves, rice, or the like, while a second portion of the packing material 204A is made of a non-desiccant material. In other examples, the packing material 204A may be made entirely of desiccant material. In either of the foregoing examples, the second portion of the packing material 204A and/or the shell 206 may form a seal (e.g., hermetic seal) around the item 200 and the first portion of the packing material 204A comprising the desiccant material. Furthermore, in other examples, packages may omit either the packing material or the shell, or may employ a composite packing/shell, which may be homogenous or heterogeneous.

In some embodiments, a volume occupied by the packing material 204A may have a lower density than a volume occupied by the shell 206A. This may be accomplished by structural and/or material differences between the packing material 204A and the shell 206A. In some examples, this may be accomplished by making the packing material 204A porous and/or including voids, cavities, pouches, or "bubbles," while the making the shell 206A of a solid and/or non-porous material. In that case, the packing material 204A may be made of the same or different material than the shell 206A. The pores, voids, cavities, pouches, and/or bubbles may be filled with air or other gas, or may be substantially empty space (e.g., vacuums or partial vacuums). In some examples, a region defined by the packing material 204A may include about 30% to 70% by volume of air, gas, and/or substantially empty space. In other examples, the region defined by the packing material 204A may include 70% or more by volume of air, gas, and/or substantially empty space. Additionally or alternatively, this difference in density between the packing material 204A and the shell 206A may be accomplished by making the packing material 204A of a lower density material (e.g., plastic, polystyrene, etc.) than the shell 206A (e.g., metal, higher density plastic, etc.).

FIG. 2B illustrates another example in which the item 200 is packaged in a second example package 202B. In this example, the package 202B includes multiple regions of packing materials 204A and 204B and multiple shells 206A and 206B. Like the example of FIG. 2A, the package 202B completely encapsulates the item 200. However, in this example, the package 202B includes packing material 204A and additional or second packing material 204B. The additional packing material 204B in this example is localized at one or more limited locations around the item 200 and does not encapsulate the item. The additional packing material 204B may be located at locations of the item that may benefit from additional strength, impact absorption, or other protection. In the illustrated example, the additional packing material 204B is disposed at corners of the item 200. However, in other examples, the additional packing material 204B may be disposed at other locations relative to the item 200. The additional packing material 204B may have different construction (e.g., different structure) and/or be made of different material than the packing material 204A and/or the shells 206A and 206B. In one specific example, the additional packing material 204B may be made of a material (e.g., a viscoelastic material) and/or having a structure (e.g., an accordion or bubble structure) having greater damping ability than the packing material 204A (e.g., a truss, lattice, or honeycomb structure) to dampen vibrations and/or absorb impacts imparted to the package 202B and minimize their transmission to the item 200. Additionally or alternatively, in some examples, the additional packing material 204B may comprise a desiccant material to absorb moisture from within an interior of the package.

Also in this example, the package 202B includes an outer shell 206B disposed around shell 206A. The shells 206A and 206B may be made of the same or different material and may have the same or different structures. In one example, the outer shell 206B may be made of a harder or more rigid material than the shell 206A. Additionally or alternatively, the shell 206A may be made of a material that is more flexible, deformable, and/or has a greater damping ability than the outer shell 206B, thereby further isolating the item 200 from vibrations or impacts imparted to the exterior of the package 202B.

Also, in this embodiment, the item 200 is disposed in the package 202B off-center. The location of the item 200 within the package 202A may be chosen based on a center of gravity of the item, a relative durability of the different portions of the item, or the like. For instance, in the example of FIG. 2B, the item 200 may be disposed toward the bottom left of the package 202B based on the item 200 having a center of gravity located at the top right corner of the item 200, such that the center of gravity of the item 200 is located near a center of the package 202B. Additionally or alternatively, the item 200 may be disposed toward the bottom left of the package 202B based on the item 200 having a fragile region on the top right of the item 200, thereby providing a larger region of packing material between the fragile region of the item and the outside of the package 202B.

FIG. 2C illustrates an example package 202C in which the packing material and shell are formed integrally as a single packing shell 208. The packing shell 208 may comprise a uniform material throughout or, as shown in FIG. 2C, may be variable over its volume. In some examples, one or more material characteristics of the packing shell 208 may vary across one or more dimensions of the package 202C. For instance, the packing shell 208 may be printed with a higher density (in material and/or structure) proximate the item 200, with the density decreasing toward an exterior of the package 202C, or vice versa (i.e., low density near the item and higher density at the exterior of the package). The density of the packing shell 202 may change based on, for example, a distance from the item 200, or a relative distance between the item 200 and the exterior of the package 202C. The variability in material and/or material characteristics may smoothly transition at a uniform rate, may smoothly transition one or more variable rates, may transition in discrete steps, or a combination of the foregoing. Additionally or alternatively, the packaging structure of the packing shell 208 may change abruptly or smoothly transition, such as from an outer honeycomb configuration to an inner lattice work configuration.

FIG. 2D illustrates another example package 202D in which the package 202D covers less than the entire item 200. In this example, the item 200 protrudes at least partially from the package 202D. This example may be used where, for example, the item 200 has a base or stand to support the item 200 during use. In that case, once delivered, the package 202D may be placed with the base of the item resting on the ground or other support surface and the package 202D may be removed from the item 200 without having to lift the item from the package 202D.

FIGS. 3A-3F illustrate examples of several structures that may be used for packing materials, shells, and/or other portions of packages according to this application. However, packages according to this disclosure are not limited to these example structures. The structures may be printed from any one or more of the materials described herein or other materials.

FIG. 3A illustrates an example honeycomb structure that may be used to package items. The size, shape, wall thickness, and other characteristics of the honeycomb structure may vary depending on the item to be packaged and the requirements and constraints on the package. Such a honeycomb structure is an example that may provide a relatively high rigidity in at least one dimension with relatively high strength-to-weight ratio.

FIG. 3B illustrates an example web structure comprising multiple relatively fine fibers or strands that connect to each other, other portions of a package, and/or an item to be packaged.

FIG. 3C illustrates example structures in which one or more support ribs, flanges, or gussets are disposed between one or more portions of a package (e.g., between top, bottom, sides of the package, internal features, and/or other support structures of the package) and/or the item. The rib structures may be employed to increase one or more radiuses, add structural supports at weak locations, and/or remove stress risers in the package.

FIG. 3D illustrates an example lattice structure in which elongated bars, rods or other supports are arranged to form trusses. The bars, rods or supports may be disposed, for example, between (i) one or more portions of a package (e.g., top, bottom, sides, internal features, and/or support structures of the package), (ii) one or more nodes or connection points of the lattice structure, and/or (iii) the item.

FIG. 3E illustrates an example hybrid honeycomb-web structure in which web structures are formed in a honeycomb pattern. The honeycomb pattern may be uniform, or as illustrated in FIG. 3E, may vary in size, shape, and/or web cross section. In one example, the hybrid honeycomb-web structure may be created or obtained through operation of the physics engine 140 (FIG. 1) or other portion of the system 100.

FIG. 3F illustrates an example packing structure comprising multiple loose or fibrous particles, similar to packing peanuts or silly string. The loose or fibrous particles may comprise any desired shape and/or size. In some examples, the particles may be configured to interlock, frictionally engage, and/or entangle with one another. In other examples, individual particles may be sized and/or shaped to provide resilience, vibration damping, impact absorption, or the like.

Another example support structure includes a bubble or air pocket structure in which a relatively thin membrane of material is printed to form bubbles or air pockets. The bubbles or air pockets may be uniform in size, shape, and/or wall thickness or may vary in size, shape, and/or wall thickness. In some examples, the bubbles or air pockets may be individually sealed, while in other examples, some or all of the bubbles or air pockets may be in communication with one or more other of the bubbles or air pockets via one or more air passages. In the latter case, the air passages may be sized to restrict passage of air, thus providing a damping effect to damp vibration and/or absorb impact. The size of the air passages may be uniform throughout, or may be varied to restrict airflow more in some areas than others.

Yet another example support structure includes a sponge-like structure having a plurality of voids or pores. The voids or pores may be uniform in size and/or shape, or may be variable. Moreover, the voids may be evenly spaced throughout the sponge structure, or may be non-uniformly spaced throughout the sponge structure.

Any of the foregoing structures may be modified and/or combined with each other or other structures to produce packages according to this disclosure. By way of example and not limitation, the honeycomb structure of FIG. 3A may be modified to include gussets or corner rounding between adjacent chambers of the honeycomb to further increase a structural integrity and minimize stress risers in the structure.

FIGS. 4A and 4B illustrate an example packaged item 400 comprising a package 402 encapsulating an item 404. In the illustrated example, the item is shown as a cup or mug for ease of explanation. However, in other examples, the item may be any item that is to be packaged (e.g., for storage or shipping). In FIG. 4A, the item 404 is shown in broken lines inside the package 402. FIG. 4B is a cross sectional view of the packaged item 400 taken along line B-B in FIG. 4A. As shown in FIG. 4B, the package 402 may include a shell 406 covering an exterior of the package 402, and multiple regions of packing material 408, 410, 412, and 414. Each of the different regions 408, 410, 412, and 414 of packing material may have a different structure, a different density, and/or be made of a different material. The structure and/or material of the different regions of packing material may be chosen based on characteristics (e.g., size, density, durability, strength, material of construction, etc.) of different regions or parts (e.g., interior, exterior, top, bottom, void, protrusion, etc.) of the item to be shipped. Further, the structure and/or material of the different regions of packing material may be chosen based on one or more constraints (e.g., weight of the package, total weight of the packaged item, expected orientation of travel, size of the overall package or one or more dimensions, etc.).

For instance, in the illustrated example, the bottom packing material 408 and the top packing material 410 may comprise a flexible or deformable material and may have a bubble or sponge structure configured to dampen vibration and/or absorb impacts applied to the packaged item 400. In the illustrated example, the bottom packing material 408 and the top packing material 410 are two separate pieces of material that may be pulled apart to access the item 404 once the shell 406 is removed. The bottom packing material 408 and the top packing material 410 may be made of the same or different materials. The packing material 412 disposed around the handle of the mug is an example of packing material that may be used to protect fragile regions of the item 404. In this example, the packing material 412 may comprise a relatively hard material having a relatively rigid structure (e.g., lattice, truss, or rib structures) that supports and protects the fragile portion (the handle in this example) of the item. In some examples, the packing material 412 may comprise multiple parts that fit together around the fragile part and are separable to remove the packing material 412 once the package 402 is opened. The packing material 414 within a cavity of the item (the reservoir of the mug in this example) may be made of yet another material and/or structure designed to provide a relatively rigid supporting structure (e.g., honeycomb) to prevent the item from being crushed when exposed to outside forces.

The package 402 may also include one or more printed opening mechanisms to facilitate opening the package. In this example, the opening mechanism includes a tear strip 416 disposed around at least a portion of a perimeter of the package 402 outside the packing material 408, 410, 412, and 414, but within the shell 406. The tear strip 416 may be made of a material having strength greater than a material of the shell 406. Additionally or alternatively, the shell 406 may include a frangible feature or other region aligned with the tear strip 416 to facilitate tearing or breaking of the shell 406 along the frangible seam or region. The frangible feature may comprise, for example, one or more perforations, thinned or weakened areas, and/or notches or grooves. In the illustrated example, the tear strip 416 protrudes through the shell 406 and includes a pull tab 418 or other graspable member. In such an example, a user may grasp the pull tab 418 and pull the tear strip 416 to tear or otherwise break the shell 406. Once the shell 406 is broken, it may be removed and the user may pull apart the top and bottom packing materials 408 and 410 to expose the item 404. The packing materials 412 and 414 may then be removed from the item.

In other examples, the tear strip 416 may not protrude from the shell 406. In that case, the package may include a visual indicator of how the package is to be opened. For instance, the package may have a dashed line printed on an exterior of the package where the tear strip is located, a picture showing a person opening the package, and/or textual instructions for how to open the package.

Additionally, in some embodiments, the opening mechanism may comprise a child resistant opening mechanism that is readily operable by an adult, but is difficult or impossible to open by a child. In one example, a child resistant opening mechanism may be implemented using the tear strip shown in FIG. 4B by making the tearing force required to pull the tab 418 at or above a threshold force requiring more strength to open than a typical child possesses. The tearing force may be set at or above the threshold by, for example, selecting a thickness and/or material of the shell to provide the threshold force.

Example Packaging Process

Figure 5:
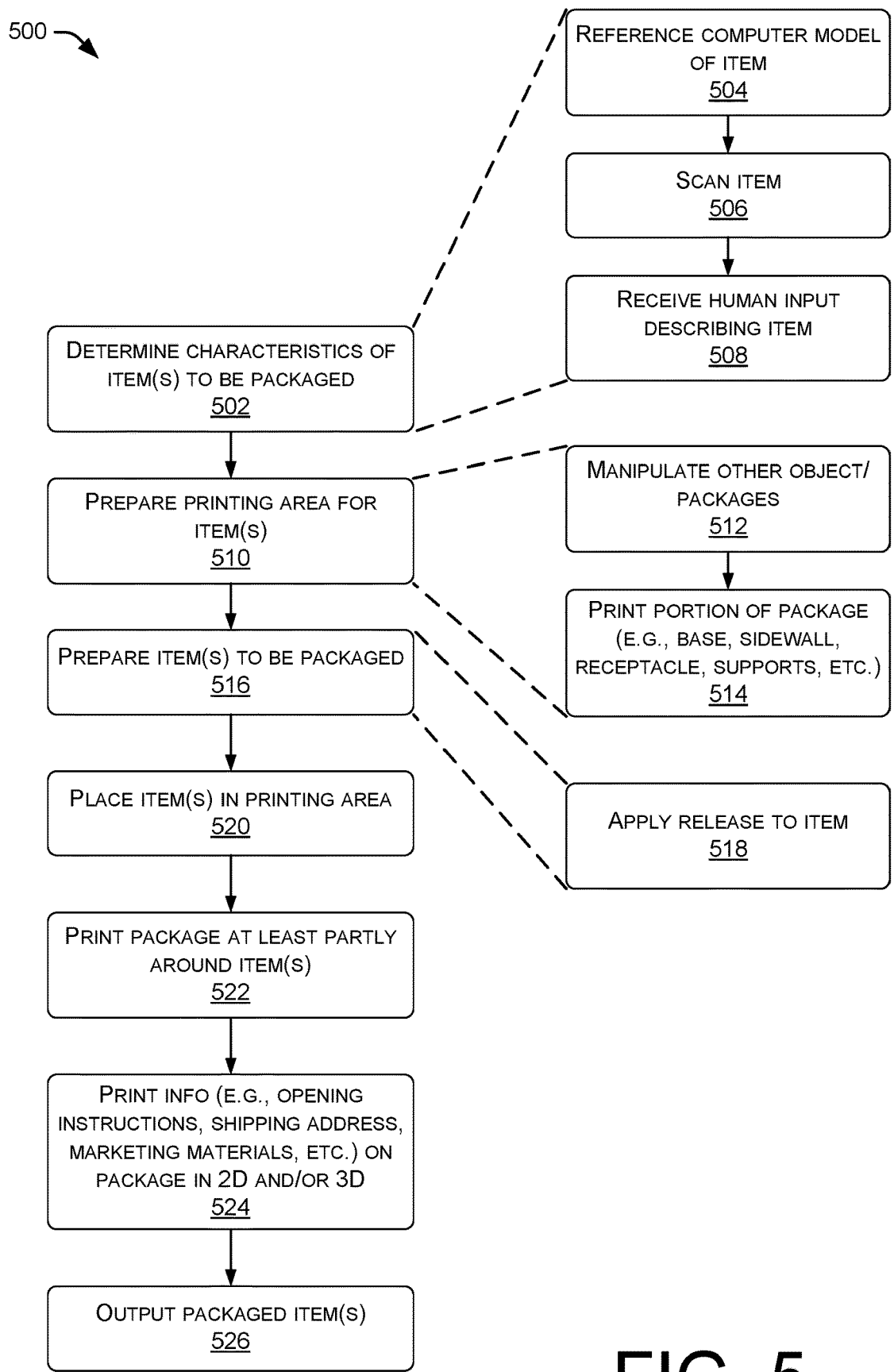
FIG. 5 is a flowchart illustrating an example process of packaging and item using 3-D printing.

FIG. 5 is a flowchart showing an example process 500 of packaging an item in whole or in part using 3-D printing or additive manufacturing. The process 500 may, but need not necessarily, be implemented in whole or in part by the system 100. The process 500 is described with reference to the system 100 for ease of understanding, but is not limited to being performed with the system 100. Accordingly, the system 100 is capable of performing numerous other processes and the process 500 may be implemented using numerous other systems.

The process 500 is illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the process, or alternate processes. Additionally, individual operations may be omitted from the process without departing from the spirit and scope of the subject matter described herein. In the context of software, the blocks represent computer instructions that, when executed by one or more processors, perform the recited operations. Such instructions may be resident in memory (e.g., memory 118 of FIG. 1). In the context of hardware, the blocks may represent one or more circuits (e.g., ASICs, FPGAs, specialized processors, or the like) configured to execute the recited operations.

The example process 500 includes, at block 502, determining one or more characteristics of one or more items to be packaged. The characteristics may include any measurable or observable property of the item such as, for example, geometry (internal and/or external), size, shape, materials, weight, volume, density, color, hardness, strength, surface finish, temperature, chemical composition, or the like. The characteristic(s) of the item may be determined in a variety of ways. By way of example and not limitation, characteristics of each item may be determined by referencing a computer model for the item (block 504), scanning the item (block 506), and/or receiving human input describing the item (block 508). Any or all of these operations, or other operations, may be used to determine characteristics of the item(s) to be packaged.

At block 504, characteristics of the item may be determined by referencing a computer model of the item (if available) or other information about the item. For example, a computing device, such as computing device 102, may refer to a computer model of the item, such as item model 130. The item model maybe stored locally at the computing device, or stored remotely and accessible by the computing device via a network (e.g., a local or wide area network). In some examples a user may specifically provide or identify the item model that the computing device is to reference for a given item (e.g., by uploading, selecting, or otherwise identifying the item model). In other examples, the computing device may automatically identify an item model corresponding to the item in response to recognizing the item. In various examples, the computing device may recognize the item by one or more of optical recognition of the item (e.g., by comparison of an image of the item with a catalog or potential items, such as items in an inventory), scanning an item identifier (e.g., bar code, quick response code, radio frequency identification tag, etc.), or the like. In some instances, the item model may include only dimensional information of the item, while in other instances the item model may include information about materials, manufacturing techniques, surface finishes, and other information about the item.

At block 506, characteristics of the item may be determined by scanning the item. For example, a computing device, such as computing device 102, may obtain scan information from a scanner, such as scanner 106. In some examples, the computing device may control the scanner or otherwise cause the scanner to scan each item, while in other examples, the scanner may scan each item independently of the computing device and may make the scan information available to the computing device (e.g., by storing the scan information in a model store such as model store 128, by pushing the scan information to the computing device, or by allowing the computing device to query the scanner to obtain the computing device). As noted above, the scanner 106 may comprise a 3-D optical scanner, a 3-D laser scanner, one or more cameras to determine outer dimensions of the item, an ultrasound scanner, an x-ray scanner, a spectrometer, a scale, and/or other scanning or sensing equipment to determine interior characteristics of the item, materials from which the item is made, weight of the item, volume of the item, density of the item, and the like. These scanned characteristics of the item may be obtained and/or used in addition to or instead of characteristics determined from the item model (if available). For instance, in some examples, the scanned characteristics may be used to supplement an item model (e.g., to provide material information, weight, density, or the like to supplement an item model that only includes geometric information of the item). Further, as noted above, some scanned characteristics may be used to recognize the item in order to identify an item model corresponding to the item. In still further examples, the scanned characteristics may be used to generate an item model for an item for which an item model was not previously available.

At block 508, human input may be used to determine characteristics of the item. The human input may be preexisting information (e.g., product specifications, item descriptions, brochures, websites, etc.) describing the item. Additionally or alternatively, the human input may be generated substantially at the time the item is to be packaged (e.g., by an operator of the computing device, scanner, or 3-D printer inputting a description of one or more characteristics of the item). In yet another example, human input may be obtained from one or more remote human users by, for example searching for customer reviews of the item (e.g., on one or more merchant web sites or the internet), requesting human users to describe the item (e.g., requesting information about the item via a mechanical Turk service), or the like.

The method 500 may further include, at block 510, preparing a printing area for the item(s). Preparing the printing area may include cleaning the printing area following a previous printing operation, manipulating one or more other objects (e.g., items or packages) in the printing area (block 512), and/or printing a portion of a package to receive the item (block 514). In some instances, manipulating the one or more other objects, at block 512, may simply comprise removing a package from a previous printing operation. In other instances, multiple items may be sequentially packaged in the printing area. In that case, manipulating one or more other objects at block 512 may comprise placing a pallet, tray, or other support surface into the printing area, rearranging or reorienting a support surface previously placed in the printing area, and/or moving or reorienting one or more packaged items in the printing area. In one specific example, multiple items may be sequentially packaged in situ on a pallet or other support surface. Once the support surface is fully loaded, the support surface may be removed from the printing area along with the multiple packaged items supported thereon.

As noted, in some examples, preparing the printing area may comprise, at block 514, printing a portion of a package for the item. The portion of the package printed may depend on the nature of the item to be packaged and may include, for example, a base, sidewall, receptacle, one or more supports, or the like. In one simple example, a base or bottom of a package may be printed in the printing area on which the item may be placed. For instance, referring to the example of FIG. 4B above, a bottom portion of the shell 406 and packing material 408 may be printed in the printing area as part of preparing the printing area to receive the item 404.

Additionally or alternatively, the method 500 may include, at block 516, preparing the item to be packaged. In some instances the item may not require any special preparation prior to printing. However, in other examples, at block 518 a release may be applied to the item to prevent the packaging material from adhering to or damaging the item. In one example, a computing device such as the computing device 102 may instruct a tool such as item manipulator 108 to apply the release to the item, while in other examples the release may be applied to the item by another device or process prior to or after being placed in the printing area. In some examples, the release may comprise a chemical or material (e.g., corn starch, wax, paper, metal foil, etc.) applied to item to prevent the 3-D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3-D printed packaging material from adhering or bonding to the item. In still other examples, the release may be omitted (e.g., if the 3-D printed packaging material does not adhere to the material of the item, if a gap is maintained between the item and the 3-D printed packaging material during printing, and/or if it is desired that the 3-D printed packaging material adhere or bond to the item). As noted above, the release may be applied before, during, or (in the case where part of the package is printed before the item is placed in the printing area) after the printing process commences.

While the foregoing examples describe operations to facilitate the packaging process, the item may additionally or alternatively be subjected to one or more other operations in preparation to be packaged. For instance, the item may be sanitized (e.g., by chemical sanitizer, steam, irradiation, or other sanitation mechanisms), be subjected to a preserving process, coated with a moisture barrier, or any number of other processes depending on the item to be packaged.

At block 520, the item maybe placed and/or supported in the printing area and, at block 522, printing of the package around the item(s) may commence or continue (in the case where the package was partially printed prior to the item being placed in the printing area). In some examples, the item(s) or partially printed package may be manipulated during the printing process. For instance, in one simple example, an item may be placed in the printing area, a top portion of a package may be printed around the item, the package may then be rotated 180 degrees to expose the bottom of the item, and the bottom portion of the package (now oriented on the top) may then be printed. In other examples, the item may remain stationary during the printing process and one or more print heads of the 3-D printer may move around the item. In that case, one or more surfaces or members supporting the item may move to maintain support of the item while accommodating movement of the print head(s) of the 3-D printer. As noted above, in some examples, the printing process may include printing one or more packages around one or more items simultaneously and/or sequentially.

Once one or more packages have been printed, at block 524, information may be printed on the package in 2-D or 3-D. The information may be printed on the package(s) by the same 3-D print head(s) used to print the package(s) or by a separate 2-D printer located in or proximate the printing area. A wide range of information may be printed on the package(s). By way of example and not limitation, information that may be printed on the package(s) includes shipping information (e.g., sender and/or recipient address), packing list of the item(s) in the package, shipping instructions (e.g., "fragile", "this end up," etc.), opening instructions, description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3-D relief code, or the like), a date on which the package was printed, a location at which the package was printed, an entity that printed the package, an identifier of the printer that printed the package, marketing or advertising information, an aesthetic design or image (e.g., printed on wrapping paper), or any other pertinent information.

At block 526, the package(s) may be output. As noted above, outputting the package may comprise outputting a single package containing one or more items or outputting multiple packages (e.g., on a pallet or other support surface) each containing one or more items. In one example, a computing device such as computing device 102 may instruct a tool such as manipulator 108 to remove the packaged item(s) from the print area. In other examples, the packaged items may be output from the printing area by one or more other systems in coordination with or independent of the computing device.

Example Data Aggregation System

Figure 6:
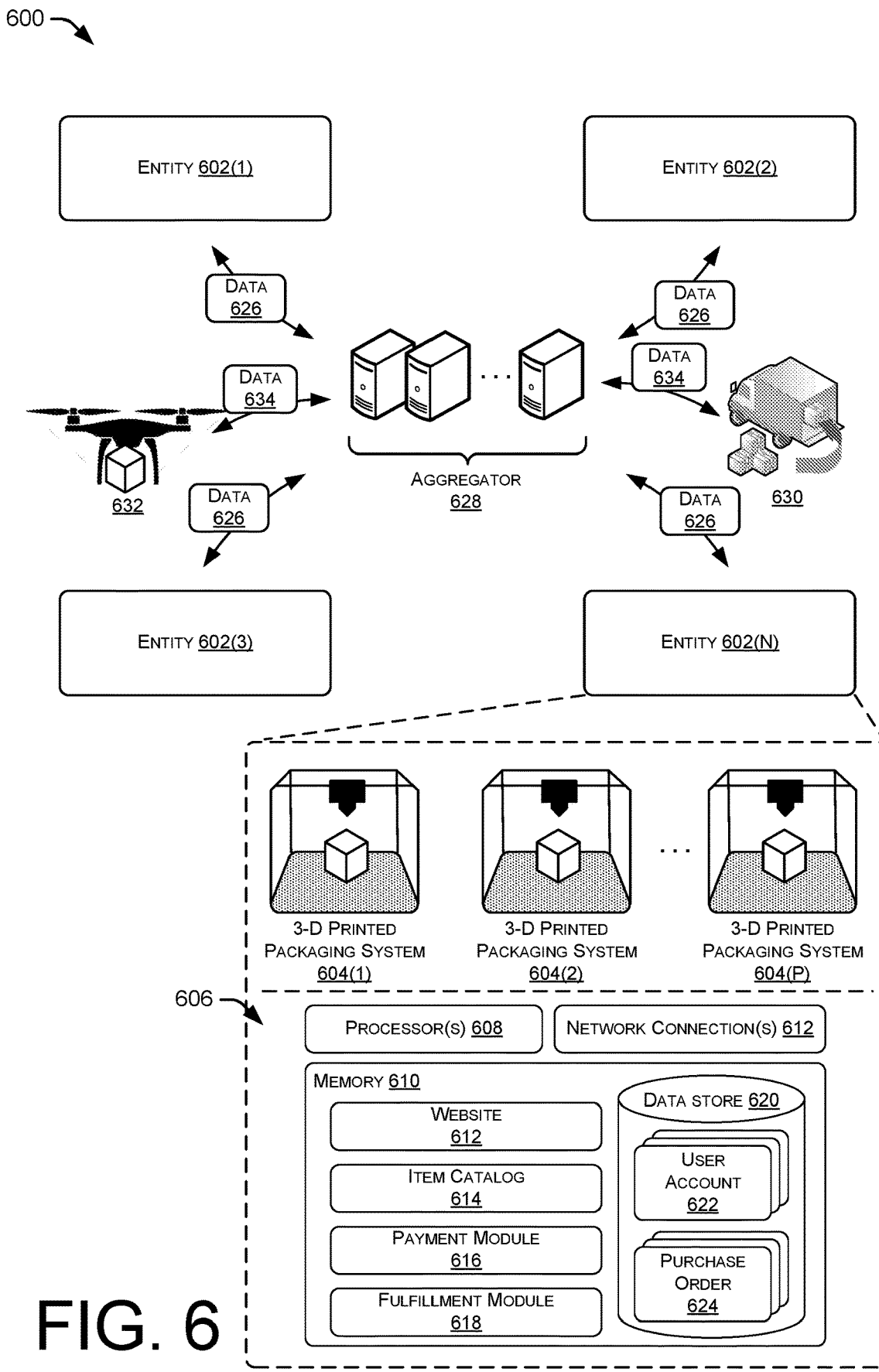
FIG. 6 is a schematic diagram of an example system including multiple merchants or other entities having 3-D printed packaging systems.

FIG. 6 is a schematic diagram illustrating an example data aggregation system 600 including one or more merchants or other entities 602(1), 602(2), 602(3), . . . 602(N) (collectively "merchants 602"), where N is any integer greater than or equal to 1. The entities 602 may be e-commerce merchants, brick and mortar stores, fulfillment centers, warehouses, a packaging station or kiosk, or the like. By way of example and not limitation, the entities may be retailers selling new and/or used items, shipping companies (e.g., UPS, FedEx, DHL, etc.), airlines, trucking companies, office supply companies auction services, shopping malls, or service providers. Each of the entities includes one or more 3-D printed packaging systems, such as the 3-D printed packaging system 100 of FIG. 1. The 3-D printed packaging system(s) may be the same or different than each other. As in the example of FIG. 1, the 3-D printed packaging system (s) may include a computing device 102, a scanner 106, and/or an item manipulator 108 in communication with a 3-D printer 104. The 3-D printed packaging system(s) of each entity may operate independently of each other, may work collaboratively, and/or may share common resources or areas. For instance, an entity may include multiple 3-D printed packaging system(s), each having its own 3-D printer, but with an item manipulator moving items to, from, and/or between multiple 3-D printers.

As another example, after being scanned in a scanning area, a computing device may select which 3-D printer from among multiple 3-D printers to print a package for each item. The 3-D printer may be selected based on, for example, the item to be packaged, the type of package to be printed, type of packing material to be printed, the weight of the item to be packaged, size of the package to be printed, size of printing queues of the multiple 3-D printers (e.g., the item may be sent for printing to a printer with the shortest printing queue), a time at which the package is scheduled to be picked up for delivery, how well the package for the item will fit relative to other packages printed by the printer, or other factors. Each respective item may then be moved by one or more item manipulators to the selected 3-D printer for printing packaging. Subsequently, packaged items from multiple different 3-D printers may be output to a common output area for further processing or pickup.

In some examples, multiple 3-D printers may operate on a package in series (i.e., one printer prints a first part of a package and then one or more other printers subsequently print additional portions of the package using a same or different printing technologies). For example, the first 3-D printer may print a first portion of the package using FDM to print a framework or shell of the package, while another printer subsequently prints an additional portion of the package using a higher speed 3-D printing technique (e.g., CLIP—Continuous Liquid Interface Production available from Carbon 3D, or ILI™, Intelligent Liquid Interface available from NewPro3D), a vacuum forming technique, a traditional packaging technique, or the like.

As shown in FIG. 6, example entity 602(N) includes 3-D printed packaging system 604(1), 3-D printed packaging system 604(2), . . . 604(P) (collectively "3-D printed packaging systems 604"), where P is any integer greater than or equal to 1. The entity 202(N) may also include one or more computing systems 606 including one or more processors 608, memory 610, and one or more network connections 612, which may function the same as or similar to the corresponding components described with reference to FIG. 1. The computing system(s) 606 may be implemented using one or more local computing resources (e.g., computers, servers, etc.) and/or remote (e.g., cloud-based resources). In some examples, the computing system(s) 606 may be distributed across multiple local and/or remote computing resources.

The memory 610 may include one or more applications or modules. In the illustrated example, the memory 610 includes a website 612 hosted by the computing system(s) 606. The website 612 may correspond to an e-commerce website offering one or more new or used items for purchase from one or more merchants. The website 612 may provide access to an item catalog 614 including item detail pages listing items available for purchase from the one or more merchants. The item detail pages of the item catalog 614 include information about the items available for purchase, such as a name of the item, a model name and/or number of the item, a description of the item, reviews of the item, a machine-readable code for the item (e.g., bar code, QR code, etc.), and/or a computer model (e.g., design drawings or solid model) of the item. A payment module 616 may include functionality and interfaces to receive payment for items purchased from the item catalog 614 via from the website 612. The payment module 616 may receive payment information (e.g., credit card numbers, bank account information, billing address, etc.) from customers purchasing items via the website 612. A fulfillment module 618 may receive customer information, order information (e.g., items ordered, number of items ordered, information about the items, etc.), shipping information (e.g., selected shipping speed, shipping carrier, etc.), recipient information (e.g., name, address, birthdate, etc.), and other data usable to fulfill the customer's order and ship the item to its destination.

A data store 620 stores various data generated by and/or accessible to the computing system 606. Among other things, data store 620 stores data regarding user accounts 622 and purchase orders 624. The user accounts 622 may include data regarding customers that have registered with the entity 602(N), such as customers, recipients, sellers, shippers, carriers, reviewers, or the like. The user accounts 622 may include names, login credentials (e.g., user name, password, security questions, tokens, or other credentials), contact information (e.g., email addresses, phone numbers, mailing addresses, etc.), demographic information (e.g., age, gender, etc.), payment credentials (e.g., credit cards, bank accounts, etc.), birth dates, preferences, purchase history, return history, browsing history, user recommendations, medical history, drug allergies, prescriptions, or any other information reasonably related to the business of the entity 602(N). Each purchase order 624 may include a record of a purchase of one or more items, and may include payment information for the transaction, shipping information, recipient information, characteristics of the item(s) included in the order, models of the item(s) included in the order, models of the package(s) to package the item(s) in the order, and the like.

The foregoing examples are merely illustrative, and the entities 602 and their 3-D printed packaging system(s) can be configured according to any of these or other variations.

Data 626 may be captured from each of the entities 202 and transmitted to an aggregator 628. The data 626 may include any or all of the data generated and/or stored by the entities 602 (e.g., 3-D printed packaging system 100, computing system 606, etc.). In some examples, the aggregator 628 may be a merchant store, a shipping or logistics company, and/or a provider of some or all of the 3-D printed packaging systems employed by the entities 602. By collecting data 626 from as many entities as possible the aggregator 628 can gain insight into real-time global commerce, knowing not only what was purchased, but also from where, to whom it was shipped, how much it weighs, how big the package is, and/or any of the other information related to the customer, recipient, shipper, items, package, described herein. The aggregator can then send data and/or instructions back to the entities 602 based on these insights. This level of understanding in the real-time or near-real-time supply chain allows the aggregator 628 to adjust delivery schedule, schedule package pickups and/or deliveries, reroute trucks, bundle packages, and/or otherwise adapt and manage logistics with much greater precision. For example, based on the data 626, the aggregator 628 can determine in substantially real-time which truck 630 or drone 632 to deploy to which retailer 602 and can transmit data and/or instructions to the respective truck 630 and/or done 632 to effectuate the desired actions. Specifically, the aggregator 628 may be able to determine the volume and/or weight capacity of truck needed to pick up all of the packages from a given entity. Additionally or alternatively, the aggregator 628 may determine how many drones will be required to deliver the packages from a given fulfillment center to their recipients. Still further, the aggregator 628 can determine the best routes to allow the trucks 630 and/or drones 632 to deliver their packages in the shortest distance and/or in the fastest time. In some examples, the trucks 630, drones 632, couriers, aircraft, and other delivery vehicles (any or all of which may be autonomous or driven by humans) may transmit data 634 back to the aggregator 628, including estimated delivery times, travel times, traffic information, delivery status (e.g., in transit, delivered, signature or other confirmation of delivery, delivery declined/rejected, returned, etc.), delivery times, package status (e.g., lost, damaged, stolen, etc.), or any other information regarding the package, its contents, recipient, etc. These and numerous other optimizations are possible and will result in more efficient deliveries—reducing time, cost, and waste in the shipping portion of the process. The two-way arrows between the aggregator 628 and the entities 602, and between the aggregator 628 and the trucks 630 and drones 632 indicate that data, instructions, and other information can be transmitted in both directions (to and from the aggregator 628).

In some examples, the aggregator 628 may be able to adjust, broker adjustments, or suggest adjustments, to transactions to more efficiently fulfill orders, minimize transit times and/or distances, or otherwise optimize the shipping and/or fulfillment process. For instance, based on the data 626 received from the various entities 602, the aggregator may determine that two different customers in two different geographical areas have ordered the same product from different entities. Consider an example scenario in which a first customer in a first location (e.g., California) purchases a product from a first company, which has the product in a warehouse in a second location (e.g., New York). Within a threshold amount of time (e.g., within 8 hours, 24 hours, etc.) before or after the first purchaser purchases the product and before the first company has shipped the product, a second customer in a third location (e.g., New Jersey) orders the same product from second company that has the product in a fourth location (e.g., Oregon). Traditionally, the first company would ship the product from its warehouse at the second location to the first customer at the first location (i.e., from California to New York in this example), and the second company would ship the same product from its warehouse at the fourth location to the second customer at the third location (i.e., from Oregon to New Jersey in this example). However, this traditional or default scenario is not efficient since the second company's warehouse is closer to the first customer, and the first company's warehouse is closer to the second customer. Thus, two identical products are unnecessarily shipped across the country at considerable expense and causing unnecessary delay in delivery of the product to the customers.

If, on the other hand, the first and second companies in the preceding scenario correspond to entities 602(1) and 602(N) that employ the 3-D printed packing systems 604 described with reference to FIG. 6, these inefficiencies can be eliminated. In that case, when the first and second companies receive their respective orders from the first and second customers just as in the traditional/default scenario. However, in this example, data 626 regarding the orders including, among other things, information about the item purchased and the origin and destination locations of the respective items, is also transmitted to the aggregator 628. Based on this data 626, the aggregator 628 can determine that the default scenario is not the most efficient way of fulfilling the orders. Based on this determination, in some examples, the aggregator 628 may suggest to the respective companies (entities 602(1) and 602(N)) that they each fulfill the other's order (i.e., the first company ships the product from its New York warehouse to the second customer in New Jersey, and the second company ships the product from its Oregon warehouse to the first customer in California). In some examples, this may be accomplished by each company subcontracting with the other company to fulfill the order on its behalf. In some examples, the aggregator 628 may provide a web interface or other mechanism to facilitate or broker this subcontracting arrangement between the first and second companies. In some examples, the first and second companies may agree ahead of time to allow the aggregator 628 to make such a change independently if the change meets one or more criteria (e.g., the change results in lower shipping cost, faster shipping time, shorter shipping distance, net cost savings or other benefit to the respective company). In that case, the aggregator 628 may transmit alternate fulfillment instructions to the respective entities. The alternate fulfillment instructions may include alternate packaging and/or shipping information for the items. Based at least in part on the alternate fulfillment instructions, the 3-D printed packaging systems at the respective entities may be instructed (e.g., by the aggregator 628 or by the computing systems 606 of the respective entities) to print the packages to fulfill the other company's order (i.e., the entity of the first company prints a package to ship to the second customer and the entity of the second company prints a package to ship to the first customer). Employing one or more of the foregoing techniques, the shipping costs and/or times can be substantially reduced relative to the default scenario. Another example related to this scenario allows the shipper to orchestrate dynamic re-routing of packages wherein the recipient can be compensated for allowing a schedule change that is more efficient for the shipper. In this example, the shipper may receive a rush order that offers them the opportunity to capture increase revenue, but only if they can delay the delivery of the first order. Utilizing the data channels described in the previous examples, the shipper may offer the recipient of the delayed delivery compensation (financial, credit towards future product purchase, etc.) in such a way as to not miss out on revenue opportunities from reordering deliveries to fulfill the higher priority order. This dynamic auction capability, at scale, can create a pricing market whereby recipients who are willing to pay more for even faster shipping can receive that benefit, and recipients willing to wait for delivery can lower their shipping costs, all while allowing the shipper to capture more revenue on each delivered package.

In a related example, changes to the packaging can be performed dynamically while en-route. This capability facilitates the dynamic re-routing of packages in several scenarios. For instance, if Item A is in transit to Customer A, but a rush order (i.e. Same Day, or Within 1 Hour) is placed for Item A by Customer B, the compensation model above can be utilized to dynamically negotiate appropriate compensation for Customer A, while the packaging is modified to be redirected to Customer B. These capabilities are further supported by the data flows between packages and the centralized data stores to allow retailers to offer purchasing opportunities that would otherwise not be possible. For example, if a customer is shopping for an item and the retailer is aware that such an item is already on a delivery vehicle near the customer's location, they can offer the customer the opportunity for immediate delivery. If ordered, the compensation process for the original recipient takes place, the packaging is modified to reflect the new recipient, the item is delivered quickly to the second customer and an additional item is dispatched (or dynamically re-routed from another customer) to the original purchaser. This dynamic re-routing capability allows retailers and shippers to essentially utilize their delivery vehicles as a flexible extension of their supply chain, moving items to new locations in immediate response to customer demands.

Multiple Package Examples

As discussed above, in some examples, multiple items may be packaged concurrently or sequentially. In the case where the items are to be packaged in multiple packages, the size, shape, and configuration of one or more of the packages may be based at least in part on the size, shape, and configuration of others of the multiple packages. For instance, if multiple packages are to be placed on a pallet or other support surface, the size, shape, and/or configuration of some or all of the packages may be chosen at least in part to result in a uniform, well-packed unit of packages. A uniform, well-packed unit of packages is one that is stable (i.e., won't topple over) and is substantially free of voids, gaps, and open spaces between packages. However, uniform, well-packed unit of packages need not be completely free of voids, gaps, and open spaces. For instance, a uniform, well-packed unit of packages may include voids, gaps, and open spaces to provide clearance to fit hands or package handling tools between packages, to provide clearance for assembly or disassembly of packages to/from the unit of packages, to allow for expansion or contraction of the packages, or the like. In some examples, a uniform, well-packed unit of packages may be substantially cube shaped or rectangular prism shaped. However, in other examples, a uniform, well-packed unit of packages may take on other shapes. FIGS. 7A-7D are top or cross-sectional views of examples of uniform, well-packed units of packages.

In some examples, all of the packages making up the unit of packages may be configured based at least in part the other packages in the unit of packages. In other examples, a limited number of the packages (e.g., a single package, corner packages, a row of packages, etc.) in the unit of packages may be configured based in part on a remaining space on a pallet or other support surface. In that case, size and shape of the limited number of packages may be modified (relative to the otherwise optimal size and shape for the package) to fill a remaining space on a pallet or other support surface (or a row of stacked packages) to result in a uniform, well packed unit of packages. In either of the foregoing examples, the computing device 102 may take into account the size and shape of multiple packages in a queue of packages to be printed when creating new package models. Furthermore, as new packages are added to the queue, the computing device 102 may modify or adjust the size and shape of one or more other packages in the queue in order to create a uniform, well-packed unit of packages.

In still other examples, the computing device 102 can receive information or instructions from another 3-D printed packaging system of an entity and/or from aggregator 628, and may print packages based at least in part on the information or instructions from the other 3-D printed packaging system and/or from the aggregator 628. For instance, the information or instructions from another 3-D printed packaging system and/or from aggregator 628 may instruct the computing device 102 to print packages that will fit within a remaining cargo area and/or weigh capacity of a vehicle (e.g., truck 630, drone 632, etc.) dispatched to pick up the package(s). Additionally or alternatively, the information or instructions from another 3-D printed packaging system and/or from aggregator 628 may instruct the computing device 102 to combine multiple items in a package, or split multiple items between separate packages, in order for the packages to fit better in the vehicle. Additionally or alternatively, the information or instructions from another 3-D printed packaging system and/or from aggregator 628 may instruct the computing device 102 to print specific hooks, loops, slots, adapters, connectors, couplers, or other features suitable for securing the package(s) in the vehicle, holding the package(s) during transit or delivery, manipulating the package(s) during transit or delivery, or the like.

Figure 7A:
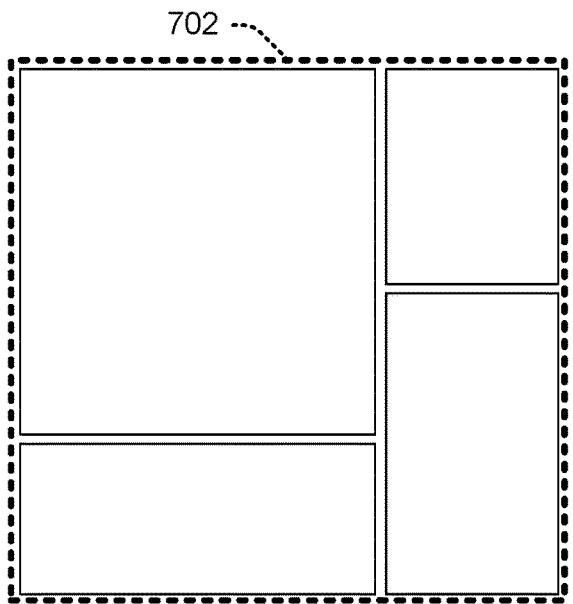
FIGS. 7A-7D illustrate examples of arranging multiple 3D printed packages.
Figure 7B:
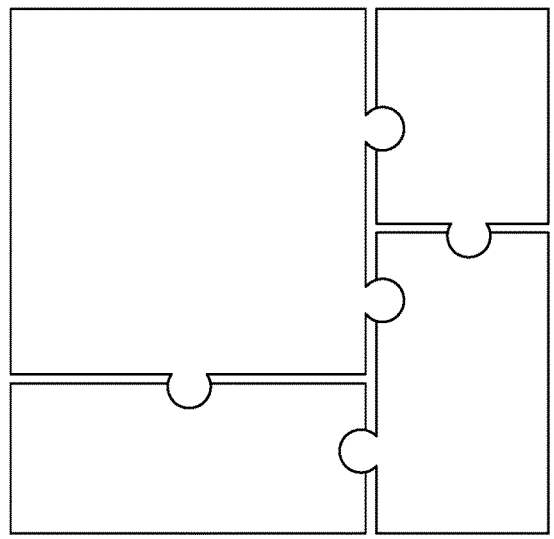
Figure 7C:
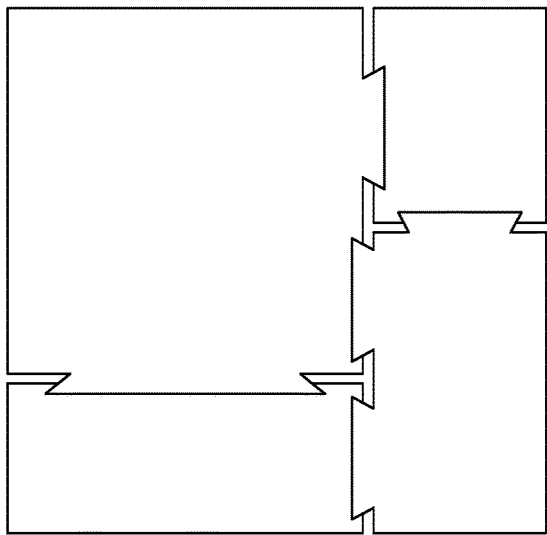
Figure 7D:
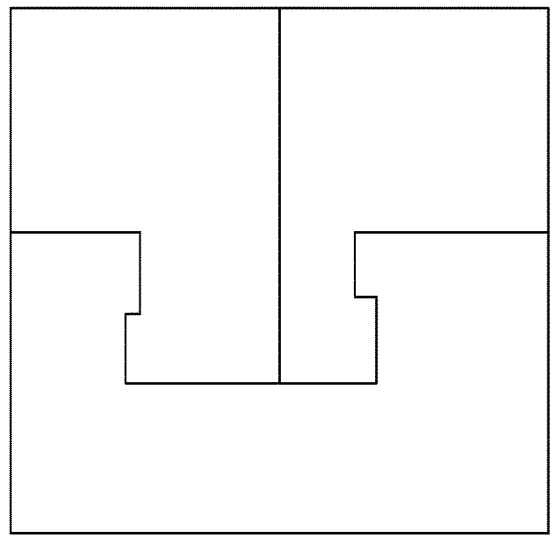

In some examples, such as those shown in FIGS. 7B-7D, the packages making up the unit of packages may include one or more interlocking features configured to interlock with adjacent packages on the top, bottom, and/or sides to hold the unit of packages together. Examples of interlocking features include, without limitation, protrusions, grooves, puzzle pieces, channels, ridges, notches, or the like. FIG. 7B illustrates an example in which some packages have bulbous protrusions that slide into complimentary grooves in adjacent packages to lock the packages together. FIG. 7C illustrates an example in which some packages include outwardly beveled protrusions (e.g., male dovetails) that fit into complimentary beveled channels (e.g., female dovetails) in adjacent packages to lock the packages together. In other examples, such as the example shown in FIG. 7D, the packages themselves may be configured as puzzle pieces that lock together with one or more other packages. Additionally or alternatively, one or more straps, bands, wraps, supports, or other structures may be printed around at least a portion of the unit of packages to secure the unit of packages together and/or to the pallet or support surface. FIG. 7A illustrates a band or strap 702 surrounding a unit of packages. Similar bands or straps may also be provided around the circumference of the unit of packages in other dimensions (e.g., when viewed from the front and/or side). In some examples, multiple bands or straps may be used in each dimension (e.g., one band or strap around each row and/or column of packages). In some examples, such bands or straps may be applied using conventional strapping techniques. However, in other examples, the bands and/or straps may be printed directly around the unit of packages during or after a process of printing the packages making up the unit of packages. The bands or straps may be made of plastic, metal, paper, and/or any other material suitable and/or conventionally used for strapping purposes.

By taking into account characteristics of other items to be packaged, a computing device such as computing device 102, may ensure that not only is each item well packaged, but also that the packages will fit together with the other items to create a unit of packages that can easily be transported and/or stored together. Additionally, the packages may be added to a pallet or other transport structure in an order that protects more fragile and/or expensive items (e.g., fragile and/or expensive items may be placed at or near a top of a stack of packages). In one specific example, multiple items all destined for a same destination (e.g., city, transfer station, warehouse, etc.) may all be packaged concurrently or sequentially) and placed on a pallet or other support surface for transfer to the destination.

Alternatively, the packages making up the unit of packages may be independently packaged (i.e., not taking into account the other packages in the unit of packages and/or without knowledge of what unit of packages the package will be a part of). In that case, a computing device, such as computing device 102, may determine, for a plurality of packages, how to stack and arrange them on one or more pallets or other support surfaces to provide the most uniform, well packed unit(s) of packages possible. In some examples, the computing device may further print one or more spacers or empty packages to fill gaps or voids in the unit of packages to improve a stability and/or uniformity of the unit of packages. In some examples, the computing device may direct an item manipulator, such as item manipulator 108, to stack the packages as the computing device directs. However, in other examples, the item manipulator may be programmed to stack the packages independently of the computing device. In some instances, the item manipulator may use touch sensors on the item manipulator to determine the size and shape of the packages and to place them accordingly. In other examples, the item manipulator may use input from a scanner, such as scanner 106, or one or more other cameras or sensors to determine the size and shape of the packages and to place them accordingly.

In yet another example, multiple items may be packaged in multiple regions or compartments of a single package. Each region or compartment may include a single item or multiple items designed for a same destination. The package may include one or more separation features to allow separation of each of the multiple compartments or regions from the rest of the package. By way of example and not limitation, each of the regions or compartments may be coupled to the package by a skin or one or more thin strips of material, and one or more tear strips may be provided between the regions or compartments to separate the regions or compartments. Each region or compartment may be separated from the rest of the package by pulling on or otherwise breaking respective tear strips to separate the respective region or compartment into a separate package. In some examples, pulling a single tear strip may separate multiple regions or compartments (e.g., a whole row or column of packages) from the package. Examples of other separation features include perforations, notches, thinned or weakened sections, or the like.

Example Packaging Station

In one example, a 3-D printing system such as that shown in FIG. 1 may be implemented as a packaging station. In some examples, the packaging station may be an example of one or more of the entities 602 in FIG. 6. Such a station may be located in a bricks and mortar store, such as a retail store or shipping store (e.g., FedEx Kinkos, UPS Store, etc.), a governmental building (e.g., a post office), an airport, an indoor or outdoor kiosk, a storage facility, or at any other suitable location where items are to be packaged for shipping or storage. In this example, the system may include a user terminal including a display and one or more input devices (e.g., a microphone, touch screen, mouse, keyboard, etc.). The user may identify one or more items to be packaged by, for example, placing the item(s) in the printing area or another area proximate and/or associated with the 3-D printing system, selecting the items from a catalog or menu of items, notifying a clerk or operator of the items, or the like. In another example, the user may have previously identified the item(s) from a remote terminal (e.g., a personal computer, mobile device, or the like).

Additionally, in some examples, the user may be prompted or otherwise allowed to input additional information, such as a purpose of the packaging (e.g., storage, shipping, etc.), a sender address, a recipient address, a shipping mode and/or speed (e.g., UPS ground, FedEx overnight, etc.), any special handling instructions (e.g., fragile, hazardous materials, etc.), a cost of the item(s), an exterior decoration or "wrapping," and/or one or more package features (e.g., thermal insulation, vibration damping, hermetically sealed, child safe, tamper evident, etc.). In other examples, the packing station may automatically determine or infer any or all of these types of additional information. Additionally, in some examples, the 3-D printing system may display a price for packaging and/or shipping the item, and provide an interface by which the user can pay for the packaging, storage, and/or shipping.

Regardless of how the items are identified to the 3-D printing system, the item(s) may be packaged according to the method of FIG. 5 or any other processes described herein. In some implementations, the packaged item(s) may be automatically placed into storage and/or shipped without any further input from the user. For instance, the packages may be placed in a post-printing staging area for pickup by a common carrier (e.g., USPS, UPS, FedEx, or the like), transported to a carrier for shipping, and/or loaded onto a vehicle (e.g., truck, airplane, ship, drone, etc.) for shipping. Alternatively, the packages may be placed in an output area for pickup and storage and/or shipping by the user. In various examples, the item(s) may be purchased prior to, as part of, or after the 3-D packaging process. In one specific example, the user may go to a store, select one or more items they want to purchase, provide the item(s) to the 3-D packaging system, and have the item packaged and/or shipped.

Ecommerce Merchant Example

In another example, a 3-D printing system including some or all of the components and/or techniques shown and described herein, with or without other components, may be implemented by an ecommerce merchant. Such a system may be located in a warehouse or fulfillment center of the ecommerce merchant and may utilize any or all of the structures, techniques, and systems described herein. When a user places an order for one or more items, the one or more items may be provided to the 3-D printing system. In some examples, the items may be retrieved by an employee, robot, conveyor, and/or other inventory management systems or tools of the ecommerce merchant and placed in the printing area or another proximate or associated area (e.g., a staging area, a bin of items to be packaged, or the like). In other examples, the items may be retrieved automatically by and/or under the control of one or more automated systems (e.g., robots, conveyors, machines, computer systems, etc.) and made available to the 3-D printing system. In some examples, the 3-D printing system may be communicatively coupled to the one or more automated systems.

In this example, once the user purchases one or more items from the ecommerce merchant, the item(s) may be automatically packaged and/or shipped according to the method of FIG. 5 or any other processes described herein.

Example 3-D Printed Packaging for Medication

While the examples above are generally applicable to packaging of any items, the following example describes details suitable for packaging pharmaceutical compositions, medications, vitamins, supplements, and the like. This example may employ a 3-D printing system and/or techniques such as that shown and described herein. In this example, however, the system may be located in a sterile environment.

In some examples, one or more pills, capsules, gelcaps, or other medicinal product may be packaged in a 3-D printed package according to according to the method of FIG. 5 or any other processes described herein. In such an example, the operation of preparing the printing area may comprise sterilizing the printing area. Further, the 3-D printed package in such an example may include one or more tamper evident features and/or child safety features, such as those described above. In some examples, the container may be formed and the medicinal product may be counted and placed in the container. In other examples, the medicinal product may be placed in the printing are and the container may be formed around the medicinal product. Such an arrangement may allow for a wide variety of new and previously unattainable packaging solutions. In some examples, the container may comprise a bottle, pouch, or other package into which individual pills, capsules, gelcaps, or other doses of the medicinal product are placed. In that case, the container may be made of a conventional plastic, metal, ceramic, or other material commonly used to house medicinal products.

In other examples, the 3-D printed container may comprise an ingestible capsule to hold a medicinal product in powder, liquid, solid, or gel form.

In still other examples, the medicinal product itself may be printed by the 3-D printing system. For instance, a print media of the 3-D printing system may comprise a pharmaceutical composition. In that case, the 3-D printer used in the system may be a food or pharmaceutical or food grade 3-D printer configured to print using pharmaceutical and/or food grade print media, such as compositions including, for example, one or more active ingredients with or without one or more fillers (e.g., lactose, cellulose, corn starch, sugars, whey, yeast, etc.) and/or one or more binders (e.g., povidone, xanthan gum, carbopol, glycerine, polylactic acid, etc.), or the like. Individual pills, capsules, gelcaps, or other doses (collectively referred to as "pills") of medicinal product may be formed (e.g., printed) in any desired shape and size, customized for a particular user's dose, and/or may be printed directly into a container. The container itself may additionally or alternatively have been printed using the same or different 3-D printing system. Formulation of print media may be varied during print process to adjust concentration of active and/or inactive ingredient in different pills and/or in different parts of a single pill (e.g., high concentration in exterior of pill for quick acting with lower concentration in interior of pill for long lasting). Print media may additionally or alternatively be varied to change the density and/or solubility of different portions of the pill (e.g., lower density and/or higher solubility of a first portion to promote quick release of active ingredient, with higher density and/or lower solubility of a second portion to promote delayed release). Additionally or alternatively, the formulation of the print media may be varied to use different active and/or inactive ingredients in different pills and/or different portions of a single pill (e.g., different active ingredients in different portions of the pill). Color of the print media may also be varied in accordance with variations in formulation in order to visually indicate the changes in formulation. These variances in print media may be designed as multiple (e.g., 2, 3, 4, . . . n) discrete portions, or the variances may be continuously variable (e.g., the concentration, density, and/or solubility of the print media may gradually increase from a minimum to a maximum).

The foregoing examples may be used to produce and/or package medication as-needed or on-demand. As such, the examples may find use in a staffed or self service pharmacy, hospital, doctor's office, grocery store, in a patient's home, or the like. Moreover, the examples may be applicable to bricks and mortar locations as well as online or mail order providers.

Example Methods

FIGS. 8-11 are flowcharts illustrating example methods that may, but need not necessarily, be used in connection with the systems of FIGS. 1 and 6. For ease of illustration and understanding, reference is made in the discussion of FIGS. 8-11 to the systems of FIGS. 1 and 6. However, the methods of FIGS. 8-11 are not limited to being performed using the systems of FIGS. 1 and 6. Moreover, the methods of FIGS. 8-11 may be used individually or in combination with one or more other methods. The methods of FIGS. 8-11 are illustrated as collections of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the process may be omitted entirely.

Figure 8:
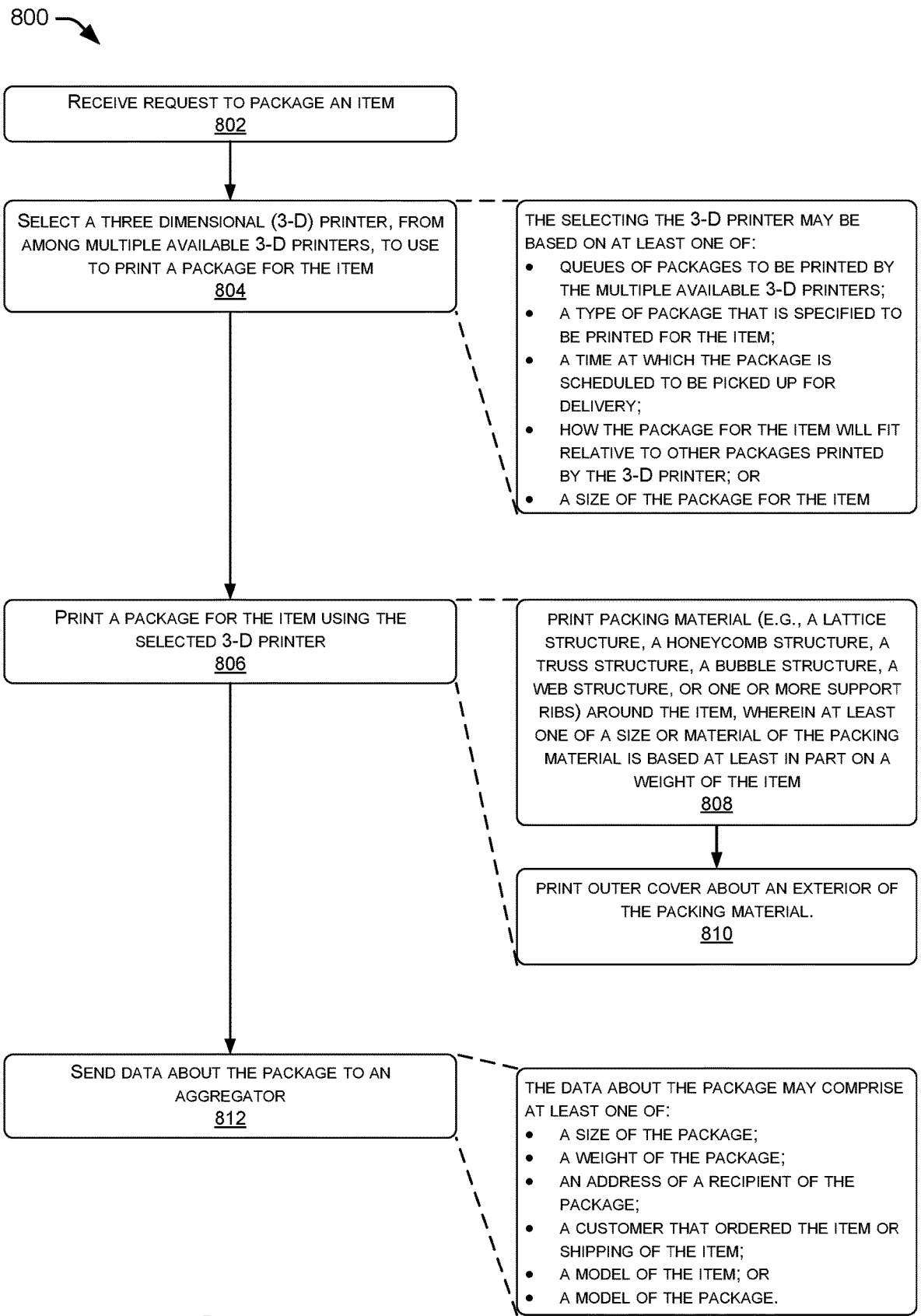
FIG. 8 is a flowchart illustrating an example method of packaging items using one or more 3-D printers from among multiple available 3-D printers.

FIG. 8 is a flowchart illustrating an example method 300 of packaging items using one or more 3-D printers from among multiple available 3-D printers.

The method 800 includes, at 802, receiving by a computing device of an entity, such as entity 602(N) of FIG. 6 for example, a request to package an item. At 804, a three-dimensional (3-D) printer may be selected, from among multiple available 3-D printers, to use to print a package for the item. In some examples, the 3-D printer may be selected based on at least one of: queues of packages to be printed by the multiple available 3-D printers; a type of package that is specified to be printed for the item; a time at which the package is scheduled to be picked up for delivery; how the package for the item will fit relative to other packages printed by the 3-D printer; a size of the package for the item; and/or other criteria.

At 806, a package for the item may be printed using the selected 3-D printer. In some examples, printing the package may comprise, at 808 printing packing material around the item and, at 810, printing an outer cover about an exterior of the packing material. Printing the packing material may include, for example, printing at least one of a lattice structure, a honeycomb structure, a truss structure, a bubble structure, a web structure, or one or more support ribs. In some examples, a size and/or material of the packing material may be based at least in part on a weight of the item. Thus, stronger and/or more packing material may be used to package relatively heavier items. In some examples, the package printed may be suitable for shipping by common carrier (e.g., land, sea, or air vehicle). Unless otherwise specified, the term "vehicle" means any human driven, autonomous, or semi-autonomous land vehicle (e.g., car, truck, train, bus, van, etc.), water vehicle (e.g., boat, barge, etc.), aircraft (e.g., airplane, helicopter, drone/UAV, etc.), or spacecraft.

At 812, data about the package may be sent to an aggregator, such as aggregator 628 in FIG. 6. The data about the package may include, for example, a size of the package; a weight of the package; an address of a recipient of the package; a customer that ordered the item or shipping of the item; a model of the item; a model of the package; and/or other pertinent information about the package.

Figure 9:
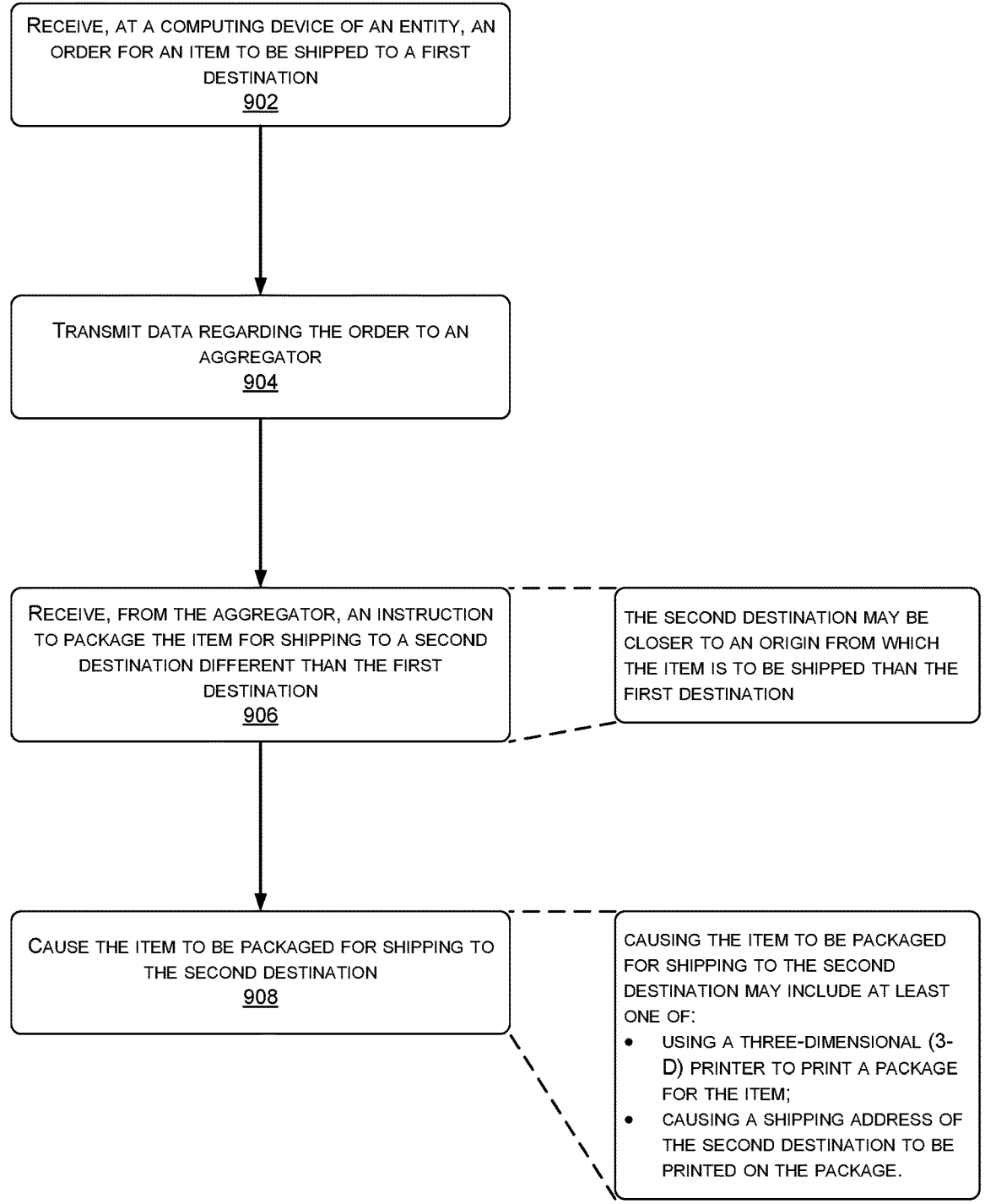
FIG. 9 is a flowchart illustrating an example method of improving a supply chain by leveraging data from an aggregator to cause items to be packaged and/or shipped from a preferred origin (e.g., an origin closest to the destination, a most cost-effective origin, etc.).

FIG. 9 is a flowchart illustrating an example method 900 of improving a supply chain by leveraging data from an aggregator to cause items to be packaged and/or shipped from a preferred origin (e.g., an origin closest to the destination, a most cost-effective origin, etc.). The method 900 includes, at 902, receiving, at a computing device of an entity, an order for an item to be shipped to a first destination. At 904, the computing device of the entity may transmit data regarding the order to an aggregator. The aggregator may receive data regarding multiple such orders and may determine that two different customers in two different geographical areas have ordered the same product from different entities. In that case, the aggregator may send an instruction to modify the order (e.g., to change a destination of the package) so that the orders are fulfilled more efficiently.

At 906, the computing device of the entity may receive, from the aggregator, an instruction to package the item for shipping to a second destination different than the first destination. In some examples, the second destination may be closer to an origin from which the item is to be shipped than the first destination At 908, the computing device may cause the item to be packaged for shipping to the second destination. The packaging may be performed by a 3-D printed packaging system, such as 3-D printed packaging system 604. In some examples, causing the item to be packaged for shipping to the second destination may comprise using a three-dimensional (3-D) printer to print a package for the item, and/or causing a shipping address of the second destination to be printed on the package in 2-D or 3-D.

Figure 10:
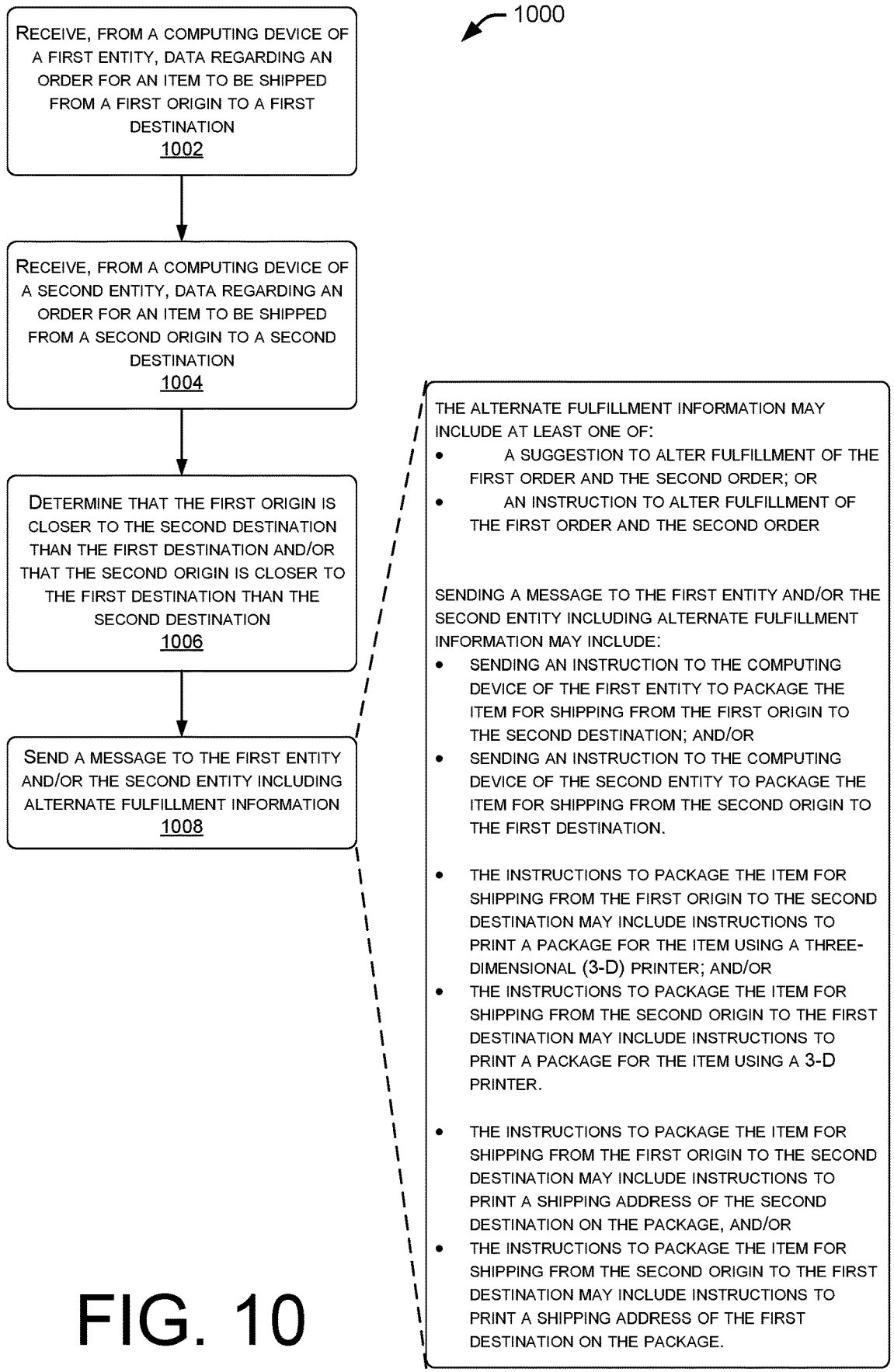
FIG. 10 is a flowchart illustrating an example method of improving a supply chain by sharing order data to cause items to be packaged and/or shipped from a preferred origin (e.g., an origin closest to the destination, a most cost-effective origin, etc.).

FIG. 10 is a flowchart illustrating an example method 1000 of improving a supply chain by sharing order data to cause items to be packaged and/or shipped from a preferred origin (e.g., an origin closest to the destination, a most cost-effective origin, etc.). The method 1000 may, in some examples, be implemented by a computing device of an aggregator, such as aggregator 628. The method 1000 includes, at 1002, receiving, from a computing device of a first entity, data regarding an order for an item to be shipped from a first origin to a first destination and, at 1004, receiving, from a computing device of a second entity, data regarding an order for an item to be shipped from a second origin to a second destination. At 1006, a determination may be made that the first origin is closer to the second destination than the first destination and/or that the second origin is closer to the first destination than the second destination. In that case, at 1008, a message may be sent to the first entity and/or the second entity including alternate fulfillment information. In some examples, the alternate fulfillment information may include a suggestion to alter fulfillment of the first order and the second order, or an instruction to alter fulfillment of the first order and the second order. In some examples, sending the message to the first entity and/or the second entity including alternate fulfillment information includes: sending an instruction to the computing device of the first entity to package the item for shipping from the first origin to the second destination; and sending an instruction to the computing device of the second entity to package the item for shipping from the second origin to the first destination. In some examples, the instructions to package the item for shipping from the first origin to the second destination include instructions to print a package for the item using a three-dimensional (3-D) printer; and the instructions to package the item for shipping from the second origin to the first destination include instructions to print a package for the item using a 3-D printer. In some examples, the instructions to package the item for shipping from the first origin to the second destination include instructions to print a shipping address of the second destination on the package, and the instructions to package the item for shipping from the second origin to the first destination include instructions to print a shipping address of the first destination on the package.

Figure 11:
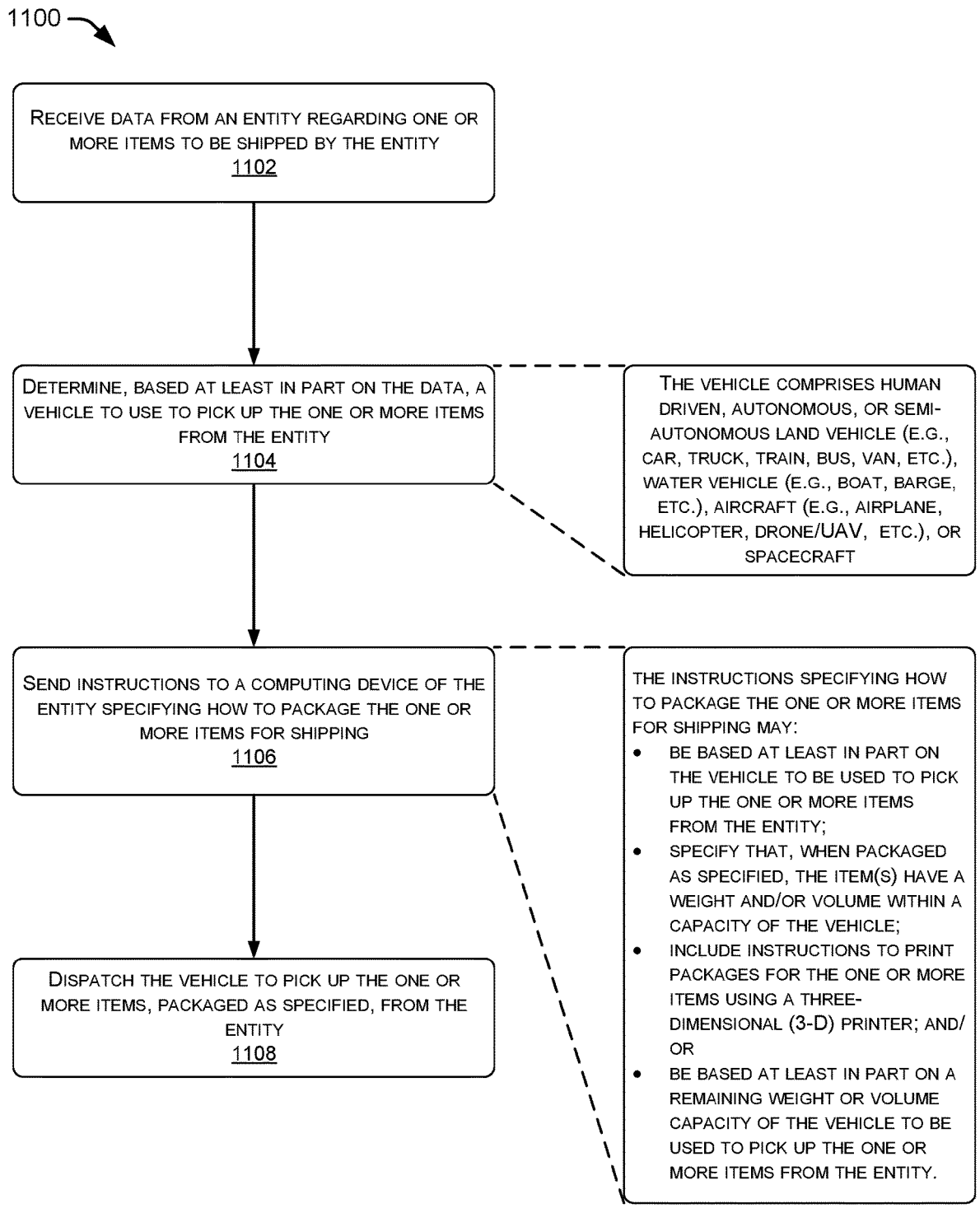
FIG. 11 is a flowchart illustrating an example method of improving a supply chain by coordinating packaging and/or dispatching of vehicles to transport/deliver the packages.

FIG. 11 is a flowchart illustrating an example method 1100 of improving a supply chain by coordinating packaging and/or dispatching of vehicles to transport/deliver the packages. The method 1100 may, in some examples, be implemented by a computing device of an aggregator, such as aggregator 628. The method 1100 may include, at 1102, receiving data from an entity regarding one or more items to be shipped by the entity. At 1104, based at least in part on the data, a determination can be made as to a vehicle to use to pick up the one or more items from the entity. In some examples, the vehicle may comprise a human driven, autonomous, or semi-autonomous land vehicle (e.g., car, truck, train, bus, van, etc.), water vehicle (e.g., boat, barge, etc.), aircraft (e.g., airplane, helicopter, drone/UAV, etc.), or spacecraft.

At 1106, instructions may be sent to a computing device of the entity specifying how to package the one or more items for shipping. In some examples, the instructions specifying how to package the one or more items for shipping may be based at least in part on the vehicle to be used to pick up the one or more items from the entity. In some examples, the instructions specifying how to package the one or more items for shipping may specify that, when packaged as specified, the item(s) have a weight and/or volume within a capacity of the vehicle. In some examples, the instructions specifying how to package the one or more items for shipping may include instructions to print packages for the one or more items using a three-dimensional (3-D) printer. In some examples, the instructions specifying how to package the one or more items for shipping may be based at least in part on a remaining weight or volume capacity of the vehicle to be used to pick up the one or more items from the entity.

At 1108, the vehicle may be dispatched to pick up the one or more items, packaged as specified, from the entity.

Overview of Distributed Manufacturing

This application also describes a distributed manufacturing platform and related techniques that connect designers, manufacturers (e.g., 3D printer owners and other traditional manufacturers), shippers, and other entities and simplifies the process of manufacturing and supplying new and existing products. The application also describes techniques using a distributed ledger or blockchain to record transactions, execute smart contracts, and perform other operations to increase transparency and integrity of supply chain. By way of example and not limitation, the techniques described herein can shorten the time to bring products to market, eliminate inefficiency and manufacturing downtime, reduce production costs, shorten shipping times and distances, reduce packaging size and cost, reduce transaction costs, track and record movement of products in the supply chain, provide digital rights management for part designs, and provide an audit trail to identify and discourage counterfeit goods.

Unless otherwise specified, the terms "item" and "product" are used synonymously herein to refer to any physical object made by one or more parties. The item or object may be comprised of a single part or multiple parts, and may be made by additive manufacturing and/or traditional manufacturing techniques. The term "unit" refers to a single instance of an item or product, and the term "units" refers to multiple instances of the item or product. The terms "blockchain" and "ledger" are used interchangeably herein and mean a digital ledger to which transactions, smart contracts, and other information can be written.

While many of the examples are described as using 3-D printing and/or being implemented by or in connection with a 3-D printer, the techniques described herein are also applicable to other forms of manufacturing. Unless specifically noted to the contrary, the terms "3-D printing" and "3-D printer" are used herein to mean additive manufacturing and additive manufacturing machines, respectively. Unless otherwise specified, the term "manufacturing" includes both additive manufacturing and traditional manufacturing. By way of example and not limitation, additive manufacturing techniques include material extrusion (e.g., fused deposition modeling or FDM), vat polymerization (e.g., stereo lithography or SLA, digital light processing or DLP, continuous digital light processing or CDLP), material jetting (e.g., material jetting or MJ, nanoparticle jetting or NPJ, drop on demand or DOD), binder jetting or BJ, powder bed fusion (e.g., multi jet fusion or MJF, selective laser sintering or SLS, direct metal laser sintering or DMLS, selective laser melting or SLM, electron beam melting or EBM), direct energy deposition (e.g., laser engineering net shape or LENS, electron beam additive manufacturing EBAM), sheet lamination (e.g., laminated object manufacturing or LOM), and the like. By way of example and not limitation, traditional manufacturing techniques include molding (e.g., injection molding, blow molding, blow fill seal, etc.), casting (e.g., sand casting, investment casting, etc.), machining (e.g., milling, turning, drilling, etc.), forming (e.g., shearing, stamping, punching, etc.), joining (e.g., welding, brazing, soldering, etc.), finishing operations (e.g., deburring, sanding, polishing, knurling, sand blasting, etc.), post processing (e.g., annealing, quenching, cryogenically freezing, painting, powder coating, plating, etc.), and the like.

Distributed manufacturing refers to a manufacturing approach in which, instead of having a company design and manufacture a product and then have the product shipped to a customer, products are designed, manufactured, finished, assembled, and/or shipped by one or more entities based on a variety of factors including, for example, product requirements, manufacturing capabilities and availability, location of parties, and the like. For example, one or more customers, designers, manufacturers (e.g., entities owning 3D printers and/or traditional manufacturing equipment such as molding equipment, casting equipment, forming equipment, or machining equipment such as CNC machines, automated lathes, etc.) may be linked and coordinated via a software platform such that orders, plans, designs, and other order details can be input and items can be created (autonomously, semi-autonomously, or manually), packaged (including retail and/or shipment packaging) ready for shipment by common carrier or individual contractors. The distributed manufacturing platform may also include shippers (e.g., private or governmental postal services, shipping companies, common carriers, delivery services, etc.), fulfillment services, merchants (e.g., bricks and mortar merchants, e-commerce merchants, etc.). In some examples, the distributed manufacturing platform may also include makers of 3D printers or other automated manufacturing equipment, CAD software developers, post processing companies, finishing companies, assembly companies, quality assurance companies, e-commerce merchants or marketplaces of e-commerce merchants, fulfillment companies, payment processing companies, brokerage companies to trade or exchange between and/or among various different forms of money (e.g., fiat currency, crypto currency, tokens, credits, gift cards, etc.), rating/reputation services, security companies, and/or any other entities providing or using services related to product supply chain.

Orders can be placed directly via the platform, or the platform can operate as a white-label/back-end component to an otherwise independent business (e.g., marketplace or merchant). In some examples, designers may design products and offer them for sale to customers via the platform. Additionally, or alternatively, customers may provide product specifications or request bids for custom products, and designers may bid on or provide proposals to provide the requested custom products. Customers may specify budgets, desired delivery dates, delivery locations, and other criteria. The platform allows entities to advertise their capabilities (e.g., designers can specify the software packages they work in, manufacturers can specify the types of 3D printers and other manufacturing equipment they have at their disposal, shippers can specify their available modes of shipping and delivery, etc.) and availability (e.g., man or machine hours available per week, number of machines, existing jobs, delivery capacity and/or speed, etc.). The platform may then match designers, customers, manufacturers, and any other entities applicable for a given job, based on the customer criteria and the capabilities of the various entities. In some examples, the matching of entities may be performed autonomously by the platform. In some examples, the matching may be performed by one or more of the entities (e.g., the customer, a merchant, a manufacturer, a shipper, a combination of these, or the like) with or without suggestions by the platform. In some examples, the matching may be performed interactively by allowing multiple entities to negotiate and/or bid on a job or transaction.

By way of example, consider a company or individual that needs 10,000 units of a widget manufactured as quickly as possible. Such a company or individual can utilize the platform to distribute the manufacturing across the required number of machines to fulfill the order in the desired time (e.g., if time allows, one machine may be used to print 10,000 units over a large amount of time; however, if time is short, 10,000 machines may be used simultaneously, with each printing one unit). A cost algorithm may allocate charges, expenses, profits, etc., in any desired manner, such as in accordance with the desired outcomes and required component inputs.

In another example, companies can utilize this platform (i.e., all or part of a distributed manufacturing platform) through a separate web site on which end customers have the ability to order items, but the ordering, payment, manufacturing, shipping, fulfillment, and other necessary business operations may be completed by the platform with complete transparency to the end customer. At the time the customer orders the item, the item may be nothing more than a design (e.g., product specification sheet, computer model, engineering drawings, etc.), and the item can be manufactured, finished, assembled, shipped, fulfilled on-demand (in a matter of minutes for some simple products, to a few days or weeks for larger or more complex products). Traditional consumer products or electronics businesses could exist in a completely automated fashion on the distributed manufacturing platform without owning any of their own infrastructure. Entire companies could be started and grow on this platform by doing nothing more than uploading a design file and then submitting received orders or waiting for orders to come in through the platform. Everything else would be facilitated and fulfilled autonomously through this platform.

The platform may facilitate automated and appropriate payments to and/or from the various buyers, sellers, manufacturers, designers, shippers and/or other actors. In some example, the purchase price of an item may be calculated to cover any license and/or use fee(s) for the designer plus an appropriate margin, the materials and wear costs for the owner of a 3-D printer used in the manufacture, plus an appropriate margin, the actual shipping costs based on the individual item and final shipment location, as well as a margin paid to the platform for facilitating the transaction and any other required payments. These payments may be made in fiat currency, cryptocurrency (e.g., Bitcoin, Ethereum, or other altcoins), tokens, credits, commodities, points, or any other store or transfer of value. In some examples, the platform may facilitate transfer or exchange between one or more of these forms of payment. In some examples, the payments may be made directly between participants of the platform, while in other examples, the buyer may provide payment to the platform (e.g., at the time an order is placed), and the payment may be held in escrow at the platform until the product is delivered or other milestones are met. For instance, in some examples, a transaction fee may be charged by the platform at the time an order is placed and/or upon completion of the transaction (e.g., delivery of the units), a portion of payment may be transferred or released to the designer at the time the order is placed, a portion of the payment may be transferred to a 3D printer owner that is to print the units prior to or after the units are printed, a portion of the payment may be released to a third party company perform finishing operations or assemble the unit from multiple parts, a portion of the payment may be released to a shipping company when the units are put into the care of the shipper or once the parts are delivered to the customer, and a remaining portion of the payment may be transferred or released to the seller upon completion of the transaction.

In some examples, the platform facilitates reputation/review services (e.g., a rating system or forum for quality assessment and/or expressions of user satisfaction and/or dissatisfaction with a party, printer, or other piece of equipment), determining shipping costs and coordination, and storing and distributing design files to the chosen manufacturing device. In some examples, the chosen manufacturing device may be a 3-D printer or other asset that is an available and/or capable device, sufficiently highly rated, and closest and/or sufficiently close to the final destination of a buyer or shipment receiver (to minimize transit distance and cost).

Matching an order request to a production machine (e.g., 3D printer) may occur based on any number of factors or criteria, individually or in combination, including price, type of product or printer, availability, quality requirements, capabilities, reputation, shipping cost, security, etc. Location nearest the final destination may be weighed in making the printer selection decision so as to minimize costs, delay, environmental impact, etc. Additional matching criteria could be based on pricing, number of items ordered, activity level of required printers (i.e. how busy is the needed machine), print materials or final quality. In a further example, a reverse-auction style selection system would allow printer owners, designers and/or shippers to bid on jobs. Other example criteria include a maximum distance from the final location, a minimum rating (e.g., job quality reputation) for the printer owner, a minimum quality level for the individual printer, etc. These and/or numerous other criteria may be used individually or in combination to match parties on the distributed manufacturing platform. Various nonlimiting examples are provided throughout this application.

In addition to manufacturing the specific item, the platform can also facilitate the ability to distribute packaging and/or manufacturing utilizing additive manufacturing, which can be integrated into the distributed digital supply chain created by this platform, regardless of the type or location of the item to be packaged. The item to be packaged could be printed directly around the item itself, created simultaneously on a separate printer, created via a different method, or otherwise integrated into the packaging created by the platform. Therefore, a product could be created at a 3D printer, and the packaging for the product could be printed around the product as the product was being created. Alternatively, the packaging could be printed around the product after the product was printed. The package and the item could be printed or otherwise manufactured at the same or different physical locations or facilities.

In some examples, the platform may help enforce and/or verify product quality and/or authenticity. For instance, quality control can be accomplished at least in part by having each participating printer create and send an automated, predefined test calibrated printed part to demonstrate quality at regular intervals (i.e. monthly/quarterly/after a certain number of print jobs/etc.). In an example, each 3D printer would send to a quality authority of the platform example output that demonstrates fitness for particular level(s) of manufacturing jobs. Additionally or alternatively, once a part is printed but before it is packaged or shipped, the printer or an operator may be asked to scan, photograph, or otherwise document the part and send the documentation to the buyer for approval. Additionally or alternatively, one or more quality control or certification authorities may be parties to the platform. In that case, parties to a transaction may specify that products meet certain standards or comply with certain regulations and may require inspection or certification by one of the quality control or certification authorities.

Traditional "printer bureaus" such as Shapeways™ will be able to leverage this platform to fulfill print jobs, but individual printer owners can lease manufacturing time on their device, as well, providing a return on the printer owner's investment in the 3D printer. Similarly, contract manufacturers may offer their capabilities via this platform, as well as individuals that have home workshops with one or more manufacturing machines.

In addition to facilitating distributed manufacturing, end customers can put a design order requesting design of a new product not yet in existence. Additionally or alternatively, the platform can facilitate re-sale of existing designs in a marketplace style in which designers can upload their designs and make them available for purchase, as well as storing individual design specifications that can be resold and reused dynamically, with appropriate payment per the previous model. In some examples, designers may be both the designer and customer by ordering their own designs for subsequent distribution and sale.

File types and conversions of files between file formats may be done by multiple actors—including the customer, printer owner, designer, printer manufacturer, computer aided design (CAD) software, or a third party integrator whose service is defining the necessary settings or conversions for a given piece of software or desired print output.

In some examples, as discussed in more detail in later sections, any or all transactions performed via or in relation to the platform may be recorded to a ledger or blockchain, which may be distributed and stored on multiple computers (e.g., computers of members or users of the platform, computers of the platform itself, etc.). Examples of transactions that can be recorded to the ledger include an order of one or more units of an item, transfer of funds from one party or account to another, completion of any operation or step in producing or delivering the unit(s) (e.g., the act of printing the unit(s), packaging of the unit(s), physical transport of the unit(s) from one place to another, pickup of the unit(s) by a shipper, movement of the unit(s) between vehicles and/or past checkpoints during transit, delivery of the unit(s) to a customer, signature or other acknowledgement of receipt by the customer, etc.), verification of authenticity and/or quality of materials and/or unit(s), identification and/or licensing of intellectual property rights, identification parties involved, identification of equipment used to produce the unit(s), or any other information generated as part of the transaction. When used, such a ledger provides an immutable record of transactions on the platform, and allows for auditing and tracking of units throughout the supply chain.

The examples described herein involve a variety of different actors. These "actors" are also sometimes referred to as "parties" or "entities" and unless otherwise specified, refer to any person, company, governmental body, group, or organization that interacts or engages with the platform in some way. Some of the more common actors and their potential interactions with the platform are described below by way of example and not limitation.

Designers: Designers are responsible for creating and uploading digital design files, such as computer aided design (CAD) files, part models, package models, engineering drawings, product specifications, blueprints, images, renderings, etc. These digital design files may or may not include printer settings (though final printer settings may need additional input from printer manufacturers, printer operators, customers, or the like), material specifications, surface finishes, manufacturing specifications (e.g., manufacturing processes, machines to be used to manufacture, required tolerances, etc.), or the like. These designs can then either be ordered by the designers themselves, or sold to customers directly or through a merchant interface of the platform or a third-party site. In other examples, customers may place orders or request quotes for custom products that are not yet in existence, and the designers may create and upload the designs responsive to customer order or request for quote.

Platform (software marketplace/broker): The platform facilitates payment, quality feedback on outputs, "matching"

of parties (including reverse bidding or other pricing methodologies), hosting design files (and storing, sharing, reusing, etc. such files), quality assurance on individual printer outputs (e.g., print a job based on a particular file each month/quarter/year/etc. and send to some aspect of the platform for quality assurance review), picking the nearest capable printer to minimize shipping distance and cost, etc.

Printer Owner: Printer owners can be individuals that own one or more printers for other purposes (such as their own manufacturing needs) or printers owned specifically to participate in this platform (such as the existing "service bureau" model).

Traditional Manufacturer: Traditional manufacturers include contract manufacturers, individuals, or other entities that offer any manufacturing capabilities other than additive manufacturing, such as molding, casting, machining, forming, etc. In some examples, parties may be both printer owners and traditional manufacturers.

Shippers: Shippers are any entity that transports items and include common carriers, printer owners, courier services, individual delivery agents, or the like. In some examples, common carriers may be organized to provide information that allows calculation of final shipping costs based on the required variables. In addition, printer owners may offer delivery for an additional fee, as a value added service, etc. Local or regional deliveries could also be completed by independent contractors (in the manner of, or elements of similarity with, Uber, Amazon Flex, etc.), or other crowd-sourced methods, particularly if the final product is printed extremely close to the final location. In other examples, the shipper may be eliminated and the customer may pick up the product from the printer owner, designer, assembler, or other party to the transaction.

Customers: Customers purchase items or other services from other parties via the platform. Customers may provide product requirement specifications, or choose an order from an existing design/designer, and provide payment (payments through the platform for the individual actors involved).

Printer Manufacturer (or printer software producer): Printer manufacturers are those that manufacture 3D Printers or additive manufacturing equipment. Printer manufacturers may provide products, supplies (e.g., filament or other print media), technical support and other services to other parties using the platform. For example, printer manufacturers may provide final printer settings or access to settings (i.e., software license) that may be set by either the designer or the customer or the printer owner. Additionally or alternatively, printer manufacturers may provide integration software such as application programming interfaces (APIs) that enable translation of file formats, remote control of printers or print jobs, or software development kits (SDKs) that allow printer owners or third party developers to develop software programs to interface with the printers. In some examples, printer manufacturers may also be printer owners that offer printing capacity via the platform. In some examples, printer manufacturers may offer membership or integration with the platform along with a purchase of one of their printers in order to help defray the costs of the printer and provide a purchaser with a faster return on investment (ROI) in the printer.

The foregoing are merely examples of a few common actors that may engage with the platform. These and numerous other actors are described throughout this application in the context of various example scenarios and use cases. The distributed manufacturing techniques described herein provide flexibility in the manufacturing process. Numerous variations and use cases are possible using the distributed manufacturing techniques described herein and are within the scope of the application. The following are just a few capabilities that can be implemented using such variations of distributed manufacturing techniques.

In some examples, the platform may receive an inquiry from a customer regarding a product that the customer wants to create, such as for shipment to the customer or an end customer (i.e., a customer of the customer). The platform may help the customer to find a designer, so that the product and/or packaging for the product can be 3-D printed. The platform may provide the customer with pricing information, area of specialty, turn-around time, customer feed-back and/or quality review information about various designers. The platform may also provide designer selection recommendation(s). The platform may receive input from the customer, regarding a selection of a designer. The platform may put the customer and designer into contact, so that the design process can begin. The platform may receive payment from the customer, and provide payment to the designer, using all/part of the payment received. The platform may manage the output of the design process, such as data/instruction file transfer, storage and/or translation. The platform may provide the customer and/or designer with information regarding available 3-D printers, their quality assurance ratings, customer feedback, geographic location, pricing information, turn-around time and/or other information. The platform may also provide 3-D printer selection recommendation(s). The platform may receive payment from the customer, and provide payment to the 3-D printer owner, using all/part of the payment received. The platform may assist the customer with issues of how many product items are needed, and the number of printers to utilize and the geographic location of each. The platform may monitor and/or coordinate the transfer of data from the 3-D designer to the 3D printer. The platform may provide progress reports to the customer and/or designer, as the product and/or the packaging of the product is 3-D printed. The platform may provide the customer with information regarding shippers available at the site of the printer and/or relative distances of the shippers from the site of the printer. The information may include rates/bids, expected delivery time, quality assurance feedback, etc. The platform may receive payment from the customer, and provide payment to the shipper, using all/part of the payment received. The platform may receive instructions from the customer for shipping, and may notify the selected shipper to pick up the product, within its 3-D printed packaging. The product may be shipped, by the shipper, to the customer or to an end customer. The platform may provide the customer and/or the end customer with billing, shipping and/or other product information.

Overview of Blockchain Enabled Packaging

As discussed above, any or all transactions performed via or in relation to a distributed manufacturing platform, such as described herein, may be recorded to a ledger or blockchain, which may be distributed and stored on multiple computers (e.g., computers of members or users of the platform, computers of the platform itself, etc.). These transactions include, but are not limited to, transactions between parties (e.g., purchase transactions, payment transactions, etc.). These transactions may also include transactions between and/or among machines or equipment (e.g., printers, CNC machines, robotic arms, scanners, etc.), packages, items, and other systems. These transactions between and among machines and inanimate objects may be accomplished through one or more wired or wireless connections that connect the machines and inanimate objects to the platform and the internet-of-things (IoT), and allow the transactions to be written to the ledger.

Items and/or packaging with the capability to interact with blockchain technologies represents the link between the digital, distributed ledger of the blockchain and the physical world which we all move through. Creating packaging, whether through traditional methods, or through additive manufacturing techniques, that can read from and/or write to a blockchain (public, private, permissioned, secure, or otherwise) as well as execute predetermined contractual interactions (whether through Ethereum, Hyperledger, or some other smart-contract self-execution system) provides a fundamental re-conception of what's possible in our world today and in the future. In some examples, the smart contract terms may be written to the blockchain and publicly readable. In some examples, the smart contract may be cryptographically hashed and the hash of the smart contract may be written to the blockchain and the parties to the smart contract may maintain a private key usable to decrypt the smart contract from the hash.

By creating packaging through additive manufacturing, a unique opportunity exists to capture real-time information about the package and its contents utilizing blockchain technology. Because the packaging is created by a 3D printer (or some other additive manufacturing process), this moment-in-time creation process presents an opportunity to create the initial interaction on a blockchain—including writing information about the date, time, and location of creation, the packaging system or machine used to package the contents, methods or materials contained within the package, the contents of the package, the destination of the package, authorized users or uses, shipping requirements, promises related to delivery time or condition, customs declarations, payment information, intellectual property rights, or other relevant information. While these techniques are described in the context of items and/or packaging made by additive manufacturing, the techniques can also be adapted to items made by traditional manufacturing techniques and/or packaged in conventional packaging. For instance, date, time, location, batch, manufacturing equipment identifiers, settings, and other information may still be written to the blockchain by one or more computers or other devices involved in the traditional manufacturing process. Because of blockchain's variable deployment methodologies, this information can be unencrypted and publicly accessible, encrypted but publicly verifiable, privately permissioned (e.g., requiring an authentication credential, security clearance, etc.). The particular blockchain used to record the creation can also allow for a varied level of control on a per-package, per-shipment, per-location, per-customer, or other customized basis. For example, in some instances every operation may be recorded to the blockchain, while in other examples, certain important transactions may be recorded to the blockchain while other transactions are recorded "off-chain" in a traditional ledger or data store. In some examples, transactions may be batched off-chain and written to the blockchain in a batch periodically (e.g., daily, weekly, monthly, etc.) or upon occurrence of an event (e.g., performance of a contract or delivery of a product). This level of control, verification, and detailed information can be applied to a broad range of industries, including retail packaging, consumer products, consumer electronics, domestic and international shipping and freight, pharmaceuticals, medical devices, food and beverage, and military and defense applications, to name just a few.

Consider an example in which an item is packaged utilizing blockchain-enabled 3D printed packaging. The item itself may be manufactured using traditional manufacturing techniques that simply utilize blockchain-enabled 3D printed packaging, or the item itself may be customized to the consumer and created through an additive manufacturing process. The 3D printed packaging may be used to ensure that only the intended recipient of the item is allowed to take custody of the item. The nature of blockchain's structure and the underlying public-key/private-key encryption model means that an entry on the on the blockchain can be made for any individual using their public key, but authenticated only by the individual in possession of the corresponding private key. For instance, an intended recipient (e.g., customer, owner, recipient, patient, etc.) can use their own private key or other blockchain-based authentication mechanism to pick up the package. Conversely, the private keys of the seller, printer owner, manufacturer, shipper, or other party can be incorporated to prove that the party is who they say they are and that they are authorized to take custody or otherwise interact with the package at each stage of the supply chain and/or at each phase of the transaction. These authentications are written to the blockchain and create a record and audit trail of the package from inception to delivery. The entries in the blockchain may be publicly available or may be encrypted so that they are accessible only to the authorized parties. The authorization can come in several forms. In one instance, a visual code such as a barcode or Quick Response (QR) code can be displayed on the packaging which can be verified by a scan performed by a mobile device (phone, tablet, point of sale terminal, etc.) containing the private key of the relevant party (e.g., customer, owner, recipient, patient, seller, manufacturer, designer, etc.) In another example, the public/private key pairs can be exchanged using Near Field Communication (NFC) or a Radio Frequency Identification (RFID) chip. This can be incorporated directly into the packaging, as well as a device (phone, tablet, point of sale terminal, token, etc.) possessed or used by the relevant parties. Other sensors, chips, or data repositories can be integrated within the packaging to provide blockchain transaction and integration capability, including WiFi, Bluetooth, cellular radio, ZigBee, or other communications sensors and/or modules. An additional suite of sensors, chips, and/or modules can provide relevant data repositories about the package by writing their data to the same or different blockchain. Example sensors, chips, and/or modules include, but are not limited to, accelerometers, gyros, temperature sensors, humidity sensors, compasses, GPS modules, cameras, processors, CPUs, GPUs, integrated circuits, memory, batteries or other power sources, contract module defining contract terms, blockchain read/write module, hardware security modules, etc. These transactions can be written to a verifiable blockchain—public, private, or some hybrid therein—where parties (e.g., customers, sellers, manufacturers, printer manufacturers, regulators, insurance companies, and other parties) can communally verify transactions and ensure that all parties in each transaction are interacting appropriately. Relevant data can be either embedded directly into the relevant blockchain, or linked to transactions and individual parties and verified through related sidechains or other blockchain-derived structures that provide a pre-computed hash value of the data, otherwise known as providing "proof of existence." These interactions can be mediated by predetermined contractual negotiations which can also be represented on the relevant blockchain.

In some examples, smart-contract technology can automatically enable payment at the time of purchase, upon performance of contract terms, or upon occurrence of certain milestones or events. In some examples, the smart-contracts can include compliance-based payment mechanisms pre-written into the contract (i.e. the customer pays the full price of the item if they do not comply with the prescribed contract terms, or receives incentive payments based on short- or long-term performance of contract terms). This smart-contract capability can further be expanded by creating a compliance-based cost model for items, whereby the blockchain-enabled packaging creates verifiable logs detailing which individual performed contract obligations at which time. By writing this data to an accessible blockchain, providers will be able to track use of items and compliance with contract terms (e.g., warranty terms, license terms, etc.) that can be easily, automatically, digitally, and irrefutably verified.

In another example, 3D printed packaging with blockchain capability offers access control to contained items. In this example, the items are packaged in separate compartments of the package (or in separate packages), and access is granted to each item or group of items in accordance with a schedule, proof of performance of one or more tasks, proof of identity, or other predefined contract provisions (which can be pre-written into the packaging utilizing smart-contract technology). Items can be released automatically when the specified contract terms are met. This release can be accomplished utilizing an actuator, lock, tabbed hinge, or other self-enforcing security mechanism of the package.

Blockchain-based monitoring can also extend to the disposal of unused items or portions of items, worn items, broken items, hazardous items, etc. Such items can be logged back into a seller, distributor, disposal site, other public locale where they can be destroyed, thereby tracking the entire lifecycle of the item from production to destruction.

In another example, the contents of a package can be verified at the point of production and moment of packaging. Verification of package contents include a range of options—including both number and type of items, but also verification within the items contained. For example, contents of packages can be verified in terms of authenticity, quantity, and dosage, to prevent fraud, misrepresentation, or substitution for counterfeits during shipment, transport, or storage. If the packages also include tamper preventing and/or tamper evident features such as tear strips, water marks, materials that react to exposure to air, sensors (e.g., temperature sensors, humidity sensors, light sensors, inertial sensors, or other sensors), etc., then recipients can be confident that the contents of the package are authentic and in the same condition as when they were packaged. Verification of package contents can be accomplished in multiple ways. In one example, contents can be identified/verified (e.g., by optically or chemically scanning the contents, by a quality assurance or certification authority, etc.), and the identification of the contents can be recorded using, for example, a one-way mathematical hashing function, which results in a unique and verifiable output that is written to the blockchain. In another example, verification can be done with integrated sensors that indicate changes or tampering to the package. These indications can be visual indications that recipients can inspect upon delivery, or they can be digitally recorded to the blockchain and verified in that manner, or both. The package can also utilize smart-contract technology (i.e. Ethereum, Hyperledger, or other smart-contract capability) to trigger actions based on these verification functions. In one example, the smart-contract may trigger notifications to the sender and/or the recipient if tampering becomes evident at any point in transit. These notifications may be initiated by the package (e.g., based on a wireless transmitter within the package) or by a device that scans or communicates with the package (e.g., an RFID reader that reads an RFID tag in the package). In another example, the smart-contract capabilities can rescind payment in the event of tampering or failure to verify package contents (i.e., payment in full is only delivered when the final package passes contents verification). This is achieved utilizing the aforementioned blockchain entries or sensors to verify that the contents are as intended, since the original contents are written to the blockchain at the moment of packaging and point of production using the manufacturer's private key to establish authenticity.

Package contents verification can include modular components, as well, such as utilizing the blockchain capability of the packaging to verify the source code contained on embedded electronics, chips, sensors, or processors within the package. In this example, both the mathematical one-way hashing functionality and the sensor-based verification are viable methods and can be used separately or in combination. This is especially useful in certain military, defense, intelligence, and corporate applications. Additional tamper-resistant capabilities can be delivered through this blockchain integration, ensuring that both the package and its contents are delivered exactly as they were intended. All of these verification capabilities can be achieved in multiple ways—including, but not limited to, one-way mathematical hashing functions, tamper-evident sensors, accelerometers, GPS, bluetooth, RFID tags, or other sensors, optical machine-readable codes or watermarks, physical tamper-evident and/or tamper resistant features. In some examples, these sensors and security features can be built into the package during the manufacturing and/or packaging processes. In other examples, they may be added to the package by a security, authentication, or cortication service as a label, tag, package, wrapping, or other indicator applied to, coupled to, and/or embedded in the package or the item.

Blockchain-enabled 3D printed packaging can also be utilized to enhance supply chain visibility, efficiency, and cross-border transport. In this example, blockchain-enabled 3D printed packaging can be used to track custody and movement of the package from origin to destination. For instance, each time the package changes hands the custodian of the package may be determined and recorded and/or each stop a package makes from point of origin to final destination may be determined and recorded. The custody and location of the package may be determined by, for example, scanning the package with a mobile device, scanner, RFID reader, or other device, or by sensors and transceivers within the package reporting the location and/or condition of the package wirelessly over a network. Handlers can be verified at each step, and any required cross-border information (customs declaration forms, etc.) can be embedded in an inalterable form at the point of origin and verified using the blockchain capability at one or more checkpoints (e.g., customs or border crossing locations, transfer stations, ports, airports, etc.). Additionally, any shipping fees, tariffs, or other associated costs can be enabled and fees paid automatically upon performance of the one or more triggering actions (e.g., performance of a contact term, movement of the package from one location to another, change of custody of the package, etc.) through smart contract capability built into the blockchain-enabled packaging. In this example, when the shipper authenticates the package at the point of pickup (e.g., by scanning a bar code, QR code, or other machine-readable code, receiving a radio frequency signal from an RFID tag or radio module in the package, optically scanning or capturing an image of the package itself, etc.), their payment for the shipping can be received in accordance with the agreed upon and predefined carrier agreement, which is represented in the package's blockchain-based dataset. Similarly, when the package crosses an international border and must pay a tariff, import tax, VAT, or similar, this payment may be automatically enacted at the point of crossing (e.g., responsive to authenticating the package using any of the techniques described herein or other techniques to uniquely identify the package or its contents), again in accordance with the predefined contractual capability on the blockchain. This increases efficiency, reduces likelihood of fraud or corruption, and allows both shippers and producers to negotiate based on better data sets and real-world tracking and interactions.

The foregoing and other examples are described further below with reference to the figures, which illustrate example architectures, devices, systems, and methods that may be used to implement the distributed manufacturing and/or blockchain enabled packaging techniques described herein.

Example Distributed Manufacturing Platform

Figure 12:
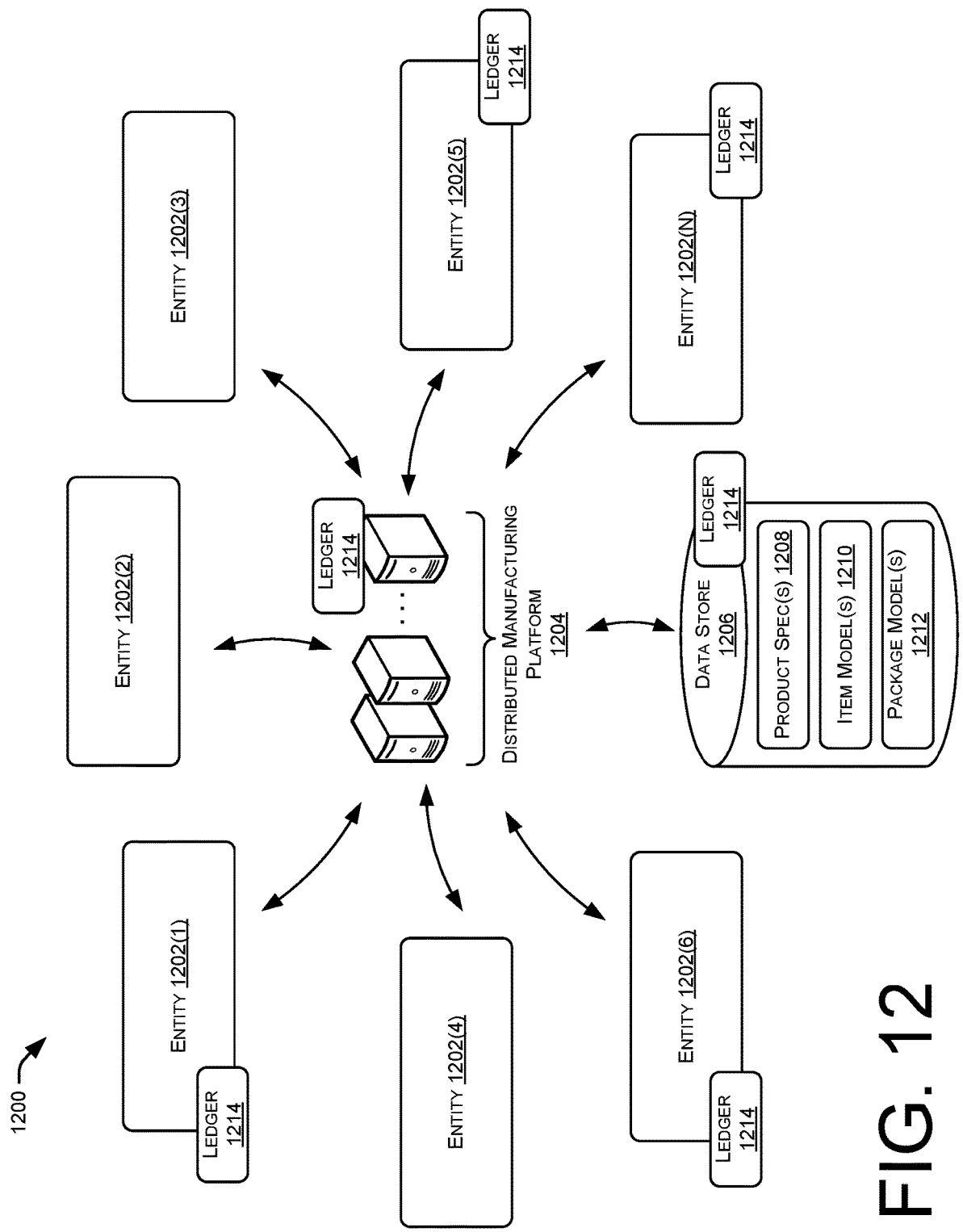
FIG. 12 is a schematic diagram of an example system having a centralized distributed manufacturing platform.

FIG. 12 is a schematic diagram illustrating an example system 1200 usable to implement distributed manufacturing techniques such as those described herein. As shown in FIG. 12, the system 1200 includes multiple entities 1202(1), 1202(2), 1202(3), 1202(4), 1202(5), 1202(6), . . . 1202(N) (collectively referred to herein as entities 102) which are in communication with a distributed manufacturing platform 1204 (sometimes referred to simply as "the platform 1204") and a data store 1206 via one or more wired and/or wireless networks. By way of example and not limitation, the networks may comprise cable networks (e.g., cable television and/or internet networks), telephone networks (e.g., wired and/or cellular), satellite networks (e.g., satellite television networks), local area networks (e.g., Ethernet, wifi, Bluetooth, Zigbee, etc.), fiber optic networks, or any other network or networks capable of transmitting data between and among the entities 1202, the platform 1204, and/or the data store 1206. The network(s) may be a collection of individual networks interconnected with each other and functioning as a single large network (e.g., the Internet or an intranet). In some examples, the entities 1202 may be the same or similar to the entities 602 described with reference to FIG. 6 or vice versa.

The entities 1202 in this example are representative of parties that use and/or provide products or services via the distributed manufacturing platform 1204. By way of example and not limitation each of the entities 1202 may represent one or more designers, customers, printer owners, printer manufacturers, computer aided design (CAD) software companies, traditional manufacturers, shippers, post processing service providers, finishing service providers, assemblers, quality assurance services, certification services, e-commerce merchants, bricks and mortar merchants, fulfillment companies, payment companies, brokerage companies, rating/reputation services, or the like. Each entity 1202 may fit a single role (e.g., customer) or multiple roles (e.g., an entity may be a printer owner, traditional manufacturer, and provide post processing, finishing, and assembly services). Each entity 1202 in this example includes at least one computing device including one or more processors, memory, and one or more communication connections by which the computing device(s) of the respective entity communicate over the network.

The distributed manufacturing platform 1204 in this example comprises a service hosted on one or more servers or other computing devices. The computing device(s) may be disposed at one or more enterprise locations, data centers, or other computing resources accessible via the network. In some examples, the platform 1204 may be a web service accessed via an internet browser, distributed manufacturing client, or other application running on computing devices of the entities 1202 accessing the platform. In other examples, as described with reference to FIG. 13, the platform 1204 may be implemented using a distributed or peer-to-peer architecture. The platform 1204 may be public (e.g., accessible to anyone with a network connection) or private (e.g., accessible only to members, employees of a certain company or organization, individuals or entities holding a security clearance, or individuals or entities meeting some other criteria).

In some examples, the platform 1204 may simply provide an ecosystem or marketplace by which other entities 1202 can interact. However, in some examples, the platform 1204 may also serve any one or more of the roles discussed above for the entities (e.g., a merchant, marketplace for multiple merchants, printer owner, shipper, fulfillment service, payment service, etc.). Whether or not the platform 1204 plays any of the other roles mention above, the platform 1204 may be configured to match various entities based on, for example, the needs or requests of one entity, the capabilities of one or more other entities, and various other considerations (e.g., location, cost, availability, workload, etc.). The platform 1204 may include one or more algorithms or machine learning models to implement the matching.

The data store 1206 represents network accessible storage usable to store various data and information. By way of example and not limitation, the data store 1206 may comprise a data store specific to the distributed manufacturing platform 1204, a repository of product designs/models (e.g., Shapeways™, Turbosquid™, CG Trader™, Sculpteo™, 3D Warehouse™, SolidWorks™ CAD Library, etc.), a general purpose network storage service (e.g., Dropbox™, Box.net™, Google Drive™, One Drive™, etc.), or a combination thereof. While only one data store 1206 is shown in FIG. 12, in practice any number of one or more data stores may be included in the system 1200 and/or accessible via the platform 1204. Additionally, while the data store 1206 is shown as a separate service accessible via the network, in other examples, the data store 1206 may additionally or alternatively be part of or associated with the platform 1204 and/or one or more of the entities 1202. The data store 1206 may store one or more product specifications 1208, part or item models 1210, package models 1212, and/or other data or information.

In some examples, product specifications 1208 may include a description of features, characteristics, and requirements of a product that a customer desires to have designed and/or manufactured. In some examples, product specifications 1208 may additionally or alternatively include engineering drawings, renderings, sketches, blueprints, material specifications, or other information related to the design and/or manufacture of the product.

Part or item models 1210 may include computer generated drawings or models of individual parts, assemblies, and/or whole items or products. The item models 1210 may include 2D and/or 3D models including, without limitation, computer aided design (CAD) files, computer aided engineering (CAE) files, computer aided manufacturing (CAM) files, machine code files such as computer numerical control (CNC) files, finite element analysis (FEA) files, or the like. A few types of 3D modeling that may be used include, without limitation, parametric modeling, direct or explicit modeling, freeform surface modeling, or the like. The files may be in any file format usable by the entities 1202 or the platform 1204.

Package models 1212 include computer generated models of packaging for one or more 3D printed or traditionally manufactured items. The package models 1212 may be designed by a designer or may be automatically generated based on an item model 1210 or one or more scans or images of an item. The package models 1212 can be generated using any of the software and may include any of the file formats described above with reference to the Item models 1210.

In the illustrated example, one or more distributed ledgers 1214 or blockchains may be used to record various transactions, execute smart contracts, and/or perform other operations conducted in relation to the distributed manufacturing platform 1204. While a single common ledger 1214 is shown in this example for simplicity, in some examples multiple different ledgers may be used in connection with the platform 1204. For example, different ledgers may be used for different industries (e.g., a pharmaceutical ledger, an aerospace ledger, an automotive ledger, a medical device ledger, a consumer products ledger, a military ledger, etc.), different ledgers may be used for different industry groups, different ledgers may be used for different businesses or organizations (e.g., an ACME company ledger, a defense department ledger, etc.), different ledgers may be used for different roles (e.g., a customer ledger, a merchant ledger, a manufacturer ledger), and/or different ledgers may be used for different authorizations (e.g., memberships, permissions, security clearances, etc.). The ledger 1214 may be public, private, permissioned, and/or secured as described in other locations of the application. In some examples, the distributed manufacturing platform 1204 may be publicly accessible and may employ a common public ledger, while a subset of entities using the platform 1204 may maintain one or more private ledgers to which transactions involving the subset of entities are written. In some examples, all transactions related to the distributed manufacturing platform 1204 are recorded to the ledger 1214, while in other examples, some transactions or some data associated with some transactions may be recorded off-chain.

In some examples, the creation of an item (e.g., the additive manufacturing process) may be captured digitally through photo or video evidence to demonstrate work performed, provenance, ensure that specific processes were followed, etc. These digital documentation assets can then be stored "off-chain" in common services such as YouTube, but recorded on the ledger or blockchain. A hash value for the digital asset can be created and written to the ledger, along with other related data (date, time, transaction identifier, related or relevant parties to that item, location of off-chain storage, etc.). The hash value allows anyone to confirm the authenticity of the digital documentation by simply re-hashing the asset wherever it may be stored. If the hash values match, then it can be ensured that not a single bit of the digital documentation has been altered. Data can include provenance of materials, condition of raw materials, manufacture methods and materials chosen or algorithmically determined, current equipment maintenance records, conformance to specifications and adjustments of equipment, operator information including certification for equipment, materials or designs.

In the illustrated example, the ledger 1214 is stored and maintained by a subset of the actors. Specifically, in this example, the ledger is stored and maintained by entity 1202(1), entity 1202(5), entity 1202(6), entity 1202(N), platform 1204, and data store 1206. However, in other examples, the ledger 1214 may be maintained by any number of one or more computing devices in communication with the system 1200. In some examples, the ledger may be stored and maintained by computing devices regardless of whether or not they are members or users of the distributed manufacturing platform 1204. For instance, in some examples, the ledger 1214 may comprise an existing or general purpose distributed ledger (e.g., the ledger underlying bitcoin, Ethereum, hyperledger, etc.). In other examples the ledger 1214 may be specific to the distributed manufacturing platform 1204 and/or may be stored and maintained only by members or users of the distributed manufacturing platform 1204.

In some examples, the ledger 1214 may be omitted entirely and transactions conducted in relation to the distributed manufacturing platform 1204 may be recorded using other techniques (e.g., traditional commerce and payment systems).

Figure 13:
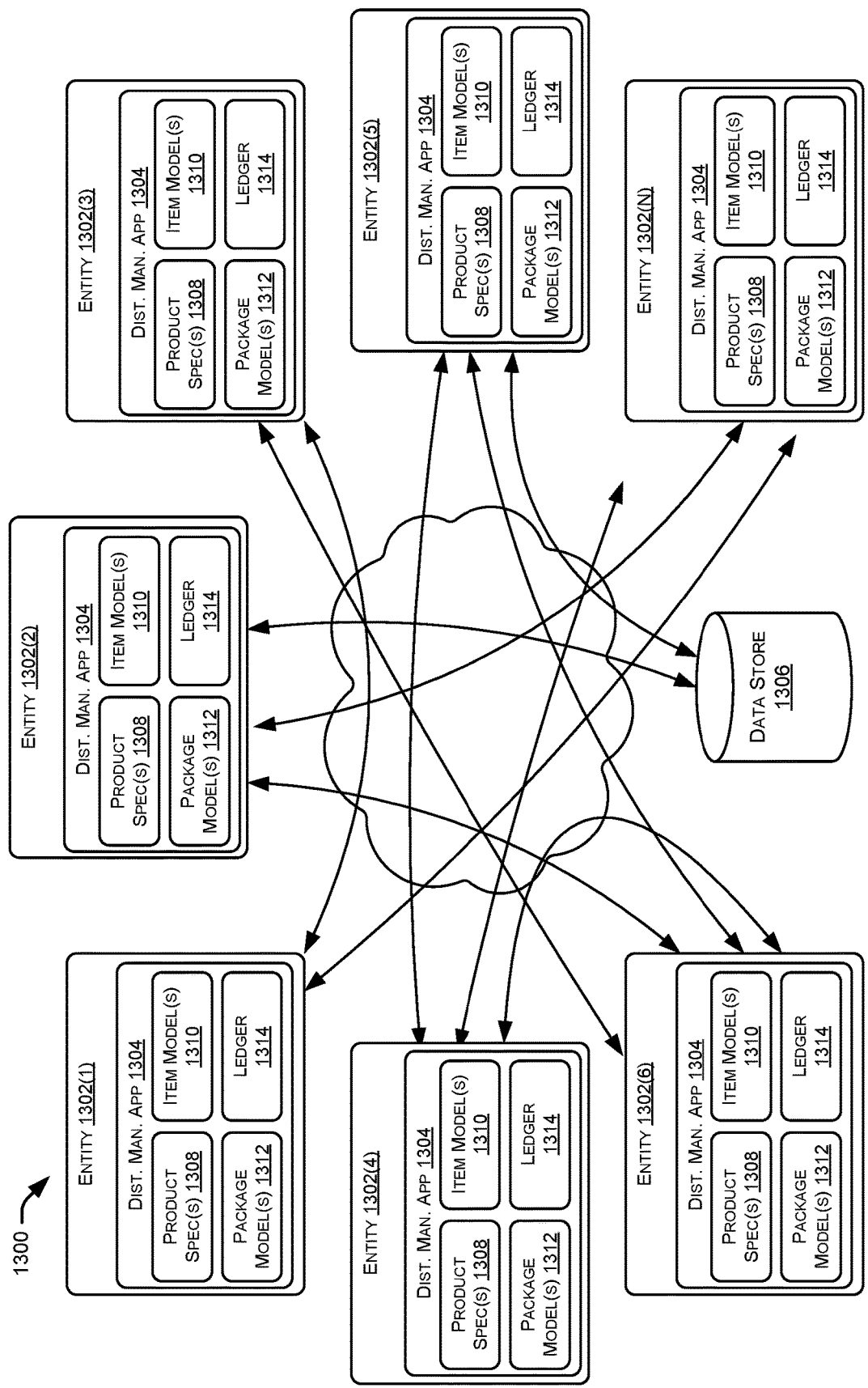
FIG. 13 is a schematic diagram of an example system for implementing decentralized distributed manufacturing techniques.

FIG. 13 is a schematic diagram illustrating another example system 1300 usable to implement distributed manufacturing techniques such as those described herein. The system 1300 of FIG. 13 illustrates a decentralized system in which multiple entities 1302(1), 1302(2), 1302(3), 1302(4), 1302(5), 1302(6), . . . 1302(N) (collectively referred to herein as entities 1302) are in communication with one another via a network. The network may include any of the types of networks described with reference to FIG. 12. In this example, some or all of the entities 1302 have a distributed manufacturing application 1304 installed on one or more computing devices at the respective entity. The distributed manufacturing application 1304 may be stored in memory of the one or more computing devices at the respective entity and executable by one or more processors of the one or more computing devices at the respective entity. The distributed manufacturing application 1304 includes one or more communication protocols for peer-to-peer file sharing ("P2P") that enable the distributed manufacturing techniques described herein. For example, the distributed manufacturing application 1304 includes logic and interfaces usable by the entities 1302 to distribute data and electronic files over the network. In some examples, the system 1300 also includes a data store 1306 similar to data store 106 which is accessible by the entities 1302 via the network. Alternatively, separate data store 1306 may be omitted and replaced with a decentralized data store in which some or all of the entities 1302 and/or other computing devices accessible by the entities 1302 allocate memory for storage of product specifications 1308, item models 1310, package models 1312, and/or other data associated with distributed manufacturing. Such a decentralized data store may be implemented as part of the distributed manufacturing application 1304 or other decentralized data storage protocol such as BitTorrent.

The distributed manufacturing application 1304 may be configured to write to a distributed ledger 1314 similar to the ledger described above with reference to FIG. 12. In some examples, the ledger 1314 may be built into the distributed manufacturing application 1304 (as illustrated), while in other examples the ledger 1314 may be separate from the distributed manufacturing application 1304 (e.g., as in the case where an existing ledger such as the bitcoin or Ethereum ledger is used).

In the decentralized example of FIG. 13, any number of entities 1302 may be networked together to form the distributed manufacturing system 1300. Moreover, the system 1300 may include multiple separate ad hoc groups of entities which may be defined based on membership, role, industry, industry group, or any other criteria.

By increasing and distributing the number of entities in system 1300, many additional functional advantages are provided. In a decentralized example such as system 1300, the system benefits from additional redundancy due to the fact that each node is capable of contributing to the interactions of the overall system. If one or more nodes are inaccessible, the system is still operational. Moreover, the distribution of the ledger allows for transactions to be performed, written, read, and verified independently of the whole of the network. This capability ensures that any orders, payments, smart-contracts, or other interactions can continue with only the minimum necessary number of participating entities, ensuring not only redundancy capabilities, but also decreasing overhead costs as participants are not responsible for operating all entities on the network. In fact, in some examples, participants can be incentivized to operate entities (or nodes) on the network, verify transactions, store relevant entries on the ledger, store or transmit relevant data files, or otherwise engage in the transaction process—all of which increases the overall resiliency and capability of the system. Additionally, decentralized nodes may allow selection of "oracles" or data inputs from known operational and reliable data providers and stream, allow routing around compromised or hacked oracles, and provide choice of law and choice of data within choice of law jurisdictions agreed upon or determined by self-executing contracts reliant on nodes and data from nodes.

Figure 14:
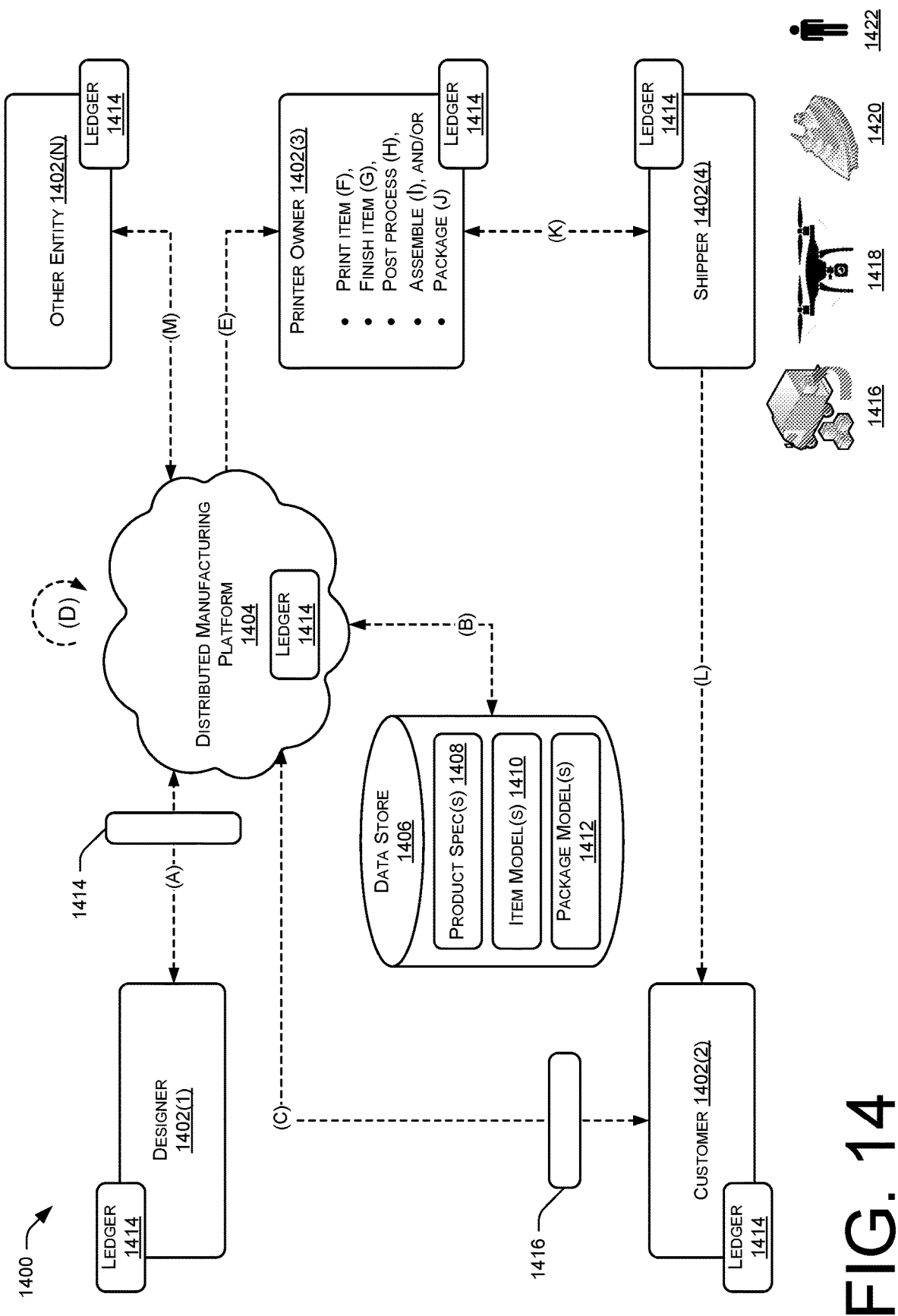
FIG. 14 is a schematic diagram illustrating an example operation of distributed manufacturing techniques.

FIG. 14 is a schematic diagram showing an example environment 1400 illustrating an example operation of distributed manufacturing techniques. The example of FIG. 14 can be implemented using a centralized system such as that shown in FIG. 12 or a decentralized system such as that shown in FIG. 13, and may or may not make use of a distributed ledger. As shown, the environment 1400 includes multiple entities 1402, including a designer 1402(1), a customer 1402(2), a printer owner 1402(3) or other manufacturer, a shipper 1402(4), and one or more other entities 1402(N), which are communicatively coupled to a distributed manufacturing platform 1404 and a data store 1406 via a network. The network may be any one or combination of the networks described herein. The one or more other entities 1402(N) in this example can represent any one or more of makers of 3D printers or other automated manufacturing equipment, CAD software developers, post processing companies, finishing companies, assembly companies, quality assurance companies, e-commerce merchants or marketplaces of e-commerce merchants, fulfillment companies, payment processing companies, brokerage companies, rating/reputation services, security companies, and/or any other entities providing or using services related to product supply chain. The data store 1406 in this example may store one or more product specifications 1408, item models 1410, and/or packaging models 1412. The product specifications 1408, item models 1410, and/or packaging models 1412 of this example may be the same or similar to those described with respect to the preceding examples. At least one, and in this example all, of the entities 1402, the platform 1404, and/or the data store 1406 store and maintain one or more ledgers 1414 as described throughout the application.

In one example operation, the platform 1404 is configured to assist a designer 1402(1) in bringing a new product to market. In such an example, the designer 1402(1) designs product and at operation (A) uploads an item model 1410 of the new product to the distributed manufacturing platform 1404. In some examples, access to the distributed manufacturing platform 1404 at operation (A) may be provided via an interface 1414. The interface 1414 may include one or more controls (e.g., buttons, menus, text entry fields, program calls, voice prompts, etc.) by which the designer 1402(1) may be prompted (or given the option) to provide additional information about the item model 1410. Unless otherwise specified, the term "interface" herein refers to a graphical user interface (GUI), a natural user interface (NUI), an application programming interface (API), or any other interface enabling human-to-machine or machine-to-machine communication. By way of example and not limitation, the additional information that may be provided by the designer 1402(1) can include, among other things, an identifier of the item or item model, parts of which the item is composed, an assembly of which the item is a part, designer, a product specification of the item, a description of the item, images or renderings of the item, an owner of the design of the item (if not the designer), a patent number and/or copyright registration covering the item, license terms under which the item may be made, reproduced, used, sold, etc. In some examples, the item model 1410 may additionally or alternatively include, or have appended to it, meta data such as a version number of software used to generate the item model 1410, an owner or licensee of the software used to generate the item model 1410, a timestamp (e.g., date of creation) of the item model 1410, a location or identifier of a computing device from which the item model 1410 was generated, or any other information related to the item model 1410 and/or the designer 1402(1).

At operation (B) the platform may process the item model 1410 and store it in the data store 1406. In some examples, processing the item model 1410 may include compressing the item model 1410, converting the item model 1410 to one or more different file formats (e.g., file formats compatible with one or more 3D printers or other manufacturing equipment), encrypting the item model 1410, applying digital rights management (DRM) protection to the item model 1410, tagging the item model 1410 with one or more keywords or other information (e.g., date of creation, the additional information provided by the designer 1402(1), the meta data accompanying the item model 1410, etc.), indexing the item model 1410 in an item index, adding the item model 1410 to an item catalog of items available via the distributed manufacturing platform 1404 or another entity (e.g., a merchant or marketplace of merchants), and/or creating an item detail page for the item including a description, images, and/or details of the item.

At operation (C), the customer 1402(2) logs on or otherwise accesses the platform 1404 and places an order for a quantity of an item corresponding to the item model 1410. In some examples, the customer 1402(2) accesses the platform 1404 via an interface 1416. The interface 1416 may include controls by which the designer 1402(1) may be prompted (or given the option) to specify conditions or criteria associated with the order. By way of example and not limitation, the conditions or criteria about the order may include a quantity of the item desired, whether the customer is willing to accept less than all of the specified quantity, whether the quantity of the item must be supplied by a same manufacturer, a price the customer is willing to pay for each item or for the quantity of items, a delivery location of the items, a desired delivery date for the items, whether the customer is flexible on the delivery date of the items (e.g., in exchange for more favorable pricing), a preferred shipping mode for the items, whether the items must all be shipped together or can be shipped as they are made or otherwise become available, a relative priority of delivery speed vs. cost, and numerous other conditions and criteria.

In some examples, a common interface or set of interfaces may be used for all entities accessing or interacting with the platform 1404. In that case, interface 1416 may be the same as interface 1414 and may include substantially the same set of controls and capabilities. However, in other examples, each entity may be provided with its own interface determined based upon the identity, role, or other characteristic of the entity and the interface may present only those controls and capabilities applicable to the particular entity or type of entity. For instance, the interface 1416 provided to the customer 1402(2) may be a customer interface and may be different than the interface 1414 provided to the designer 1402(1) which may be a designer interface, and may be different than the interfaces provided to other types of entities. Unless otherwise specified, the interfaces described herein may be common interfaces or may be determined based upon the identity, role, or other characteristic of the entity. While not shown, interfaces may also be provided the printer owner 1402(3), the shipper 1402(4), and the other entity(s) 1402(N) to access, interact with, and transfer data to/from the platform 1404.

At operation (D), the platform 1404 selects (or recommends) the printer owner 1402(3), from among multiple available printer owners (not shown in this figure), to print the item using a matching algorithm or machine learning model that matches product requirements and/or customer criteria with the capabilities of multiple possible printer owners. In some examples, the matching of entities may be performed autonomously by the platform 1404. In some examples, the matching may be performed by one or more of the entities (e.g., the customer, designer, printer owners, shipper, a combination of these, or the like) with or without suggestions by the platform 1404. In some examples, the matching may be performed interactively by allowing multiple entities to negotiate and/or bid on a job or transaction (e.g., multiple suitable printer owners may be identified and then allowed bid on which will print the quantity of items for the lowest price, or the customer may be allowed to select from among the multiple printer owners based on price, print capacity, location, delivery date, and/or other capabilities of the respective printer owners). Matching an order request to a production machine (e.g., 3D printer) may occur based on any number of factors or criteria, individually or in combination, including price, type of product or printer, availability, quality requirements, capabilities, reputation, shipping cost, security, etc. Location nearest the final destination may be weighed in making the printer selection decision so as to minimize costs, delay, environmental impact, etc. Additional matching criteria could be based on shipping cost, number of items ordered, activity level of required printers (i.e., how busy is the needed machine, how long before the printer is available, etc.), print materials, print resolution, or final quality. In a further example, a reverse-auction style selection system would allow printer owners, designers and/or shippers to bid on jobs. Other example criteria include a maximum distance from the final location, a minimum rating (e.g., job quality reputation) for the printer owner, a minimum quality level for the individual printer, etc. These and/or numerous other criteria may be used individually or in combination to match parties on the distributed manufacturing platform.

As mentioned, in some examples a matching algorithm may be used to match orders with printer owners or other manufacturers. In that case, some criteria may be binary (that is, they are either met or not by a particular manufacturing machine) while other criteria may be variable (that is, they can take on multiple values within a range). For example, a criterion specifying that an item be printed in a particular material is binary (a printer can either print in that material or not), while a criterion specifying a preference for low cost would be variable (since print cost is a value that can be calculated for a printer and may vary from printer to printer). When using a matching algorithm, digital logic can be used as a first stage to identify a pool of machines (printers and/or other manufacturing equipment) that meet the binary criteria specified. The output of the first stage is a pool of machines that meet the binary criteria. Then, in a second stage, a polynomial function can be generated with variables corresponding to each of the variable criteria. The function may include coefficients or weight factors that express the user's relative preferences for different criteria. For example, if a customer prioritizes price over speed, the coefficient on the price variable may be higher than the coefficient on the speed factor. The function can then be solved for each printer or other machine in the pool of machines by substituting the corresponding capabilities of the printer or other machine for the variables in the function. The output of the second stage can be a ranked list of printers or other machines output from the first stage. In some examples, the algorithms may match regulatory requirements and industry standards (strength or type of materials, qualities of materials, conductivity or non-conductivity, impact, shatter characteristics, protective factors, and others). Some examples may include quality indicators, for instance reliability, durability, planned obsolescence, usage cycles, heat tolerances, stress tolerances, impact tolerances, and other measures. Algorithms in some examples may prioritize designers for products, packages, brands (e.g., the brand of a component part of the item, the package, the colors, the inks, the materials, or other components). In some examples the material or printer origin, including import and export license permissibility may be factors in algorithms determining selection of printer, printer type, location, material, allowable designs, and other factors in law, regulation, trade, or external factors. In some cases the personnel qualifications of equipment operators or designers may be factors (e.g., in some defense use-cases, parts may have classified specifications or designs which might only be accessible with a security clearance).

In addition to or instead of using matching algorithm, in some examples the platform 1404 may use a machine learning model to categorize orders and/or match orders with printer owners or other manufacturers. By way of example and not limitation, deep learning techniques, neural language models, convolutional neural networks, or other machine learning models may be used alone or in combination with one or more traditional classification approaches. The machine learning model may be trained offline using existing classified corpuses of data such as product catalogs and/or item detail pages of e-commerce merchant websites, repositories of labeled product designs/models (e.g., Shapeways™, Turbosquid™, CG Trader™, Sculpteo™, 3D Warehouse™, SolidWorks™ CAD Library, etc.), or the like. Additional details of how machine learning models can be applied to match item orders with capabilities of printer owners and other entities can be found in Ristoski et al., "A Machine Learning Approach for Product Matching and Categorization," Data and Web Science Group, University of Mannheim, B6, 26, 68159 Mannheim, Oct. 11, 2016.

In some examples, custom matching algorithms may be used that apply machine learning models to semi-structured data. The matching algorithms may be performed by the platform 1404, or the platform may employ a third-party matching service. In some examples, one or more of the other entities 1402(N) may comprise a matching service. In that case, the platform 1404 may invoke the matching functionality of the matching service by, for example, calling an API of the matching service. One example third-party matching service that can be used is Sajari™, of Sydney Australia.

After selecting one or more printer owners or other manufacturers to produce the item, the process proceeds to operation (E) in which the platform 1404 sends instructions to the selected manufacturer, in this case printer owner 1402(3). In this example, printer owner 1402(3) was selected during the matching process at least in part because it was able to perform multiple required operations at a single location. Specifically, in this example, the printer owner 1402(3) is capable of not only printing the item, but also finishing the item (e.g., removing support structures, sanding, polishing, machining, etc.), post processing the item (e.g., priming, painting, plating, powder coating, heat treating, etc.), assembling the item (e.g., assembling the item from multiple disparate 3D printed and/or traditionally manufactured parts), and packaging the item in a 3D printed packaging and/or traditional package. Thus, in this example, the printer owner 1402(3) can, at operation (F) print the item, at operation (G) finish the item, at operation (H) post process the item, at operation (I) assembly the item from multiple parts, and at operation (J) package the item. In some examples, packaging the item may include printing a 3D printed package customized based on the item, the designer, the customer, the shipper, and/or other factors. The 3D printed package may be printed at least partially around the item, or the 3D printed package may be printed and the item may be may be inserted in the 3D printed package. Or in some examples, individual parts of the item may be packaged in unassembled form for transport to the designer, customer, or another entity (e.g., an assembler, a warehouse, etc.). In other examples, operations (G), (H), (I), and/or (J) can be performed by one or more other entities or may be omitted entirely.

At operation (K) the packaged item may be transferred to the shipper 1402(4). In some examples, the shipper 1402(4) may pick up packaged item from the printer owner 1404(3), while in some examples the printer owner 1402(3) may deliver the packaged item to the shipper 1402(4), and in still other examples another delivery service (e.g., a local delivery service) may transfer the packaged item from the printer owner 1402(3) to the shipper 1402(4). The shipper 1402(4) may load the packaged item onto a land vehicle 1416 (e.g., car, truck, bus, train, etc.), aircraft 1418 (airplane, helicopter, drone, etc.), watercraft 1420 (e.g., ship, boat, barge, ferry, etc.), or couriers 1422 (e.g., on foot or bicycle) for delivery to the customer 1402(2). In some examples, the packaged item may be transferred from one vehicle/aircraft/watercraft/courier to another directly or via one or more transfer stations. Each time the packaged item is transferred, the location and/or custody of the package may be tracked and recorded to the ledger 1414 (e.g., by sensors in the package and/or sensors at the transfer site). At operation (L) the shipper 1402(4) delivers the packaged item to customer 1402(2).

At operation (M), the one or more other entities 1402(N) cause payment for the order to be transferred from the customer 1402(2) to the designer 1402(1), the printer owner 1402(3), and/or the shipper 1402(4). Operation (M) may cause transfer of payment as soon as the order is placed, upon delivery of the item to the customer, and/or at one or more intermediate times. For instance, in one example, a portion of the payment may be transferred to the designer 1402(1) when the order is placed, a portion of the payment may be transferred to the printer owner 1402(3) at the time the print instructions are sent to the printer owner or upon proof that the items have been printed, a portion of the payment may be transferred to the shipper 1402(4) upon the item being placed in the shipper's custody, and additional portions of the payment may be transferred to the shipper 1402(4) and the designer 1402(1) upon successful delivery of the item to the customer 1402(2) within the terms of the smart contract governing the transaction. In some examples, a portion of the payment may be transferred to the platform 1404 at the time the order was placed, when the item is delivered to the customer, or at any other time in between the order and delivery. In some examples, one entity may choose to pay with one currency and another entity may choose to receive funds in another currency. In that case, the one or more other entities 1402(N) may also provide currency conversion or brokerage services to trade one form of currency (e.g., fiat currency, crypto currency, tokens, credits, etc.) for another form of currency. These funds transfers, currency conversions, or other transactions may be accomplished automatically based on the smart contracts written to the ledger 1414 at the time the order was placed.

In a variation of the previous example, the platform 1404 may assist the customer 1402(2) to locate one or more appropriate designers 1402(1), to assist in the design of a new product for the customer 1402(2). The customer 1402(2) may submit a product specification 1408 to the platform 1404, which may be processed and uploaded to the data store 1406. In this example, the platform 1404 may match the product specification 1408 with one or more designers by taking into consideration the job difficulty, designer skill level, designer pay level, designer specialty, designer reputation or rating, and/or other factors, and applying matching algorithms, machine learning models, or invoking a third-party matching service as described in the preceding example. The designer(s) 1402(1) may create data file(s) appropriate for input to 3D printer(s) and/or other manufacturing equipment and may upload them to the data store 1406 for review and approval by the customer 1402(2). In other examples, the platform 1404 may convert files uploaded by the designers 1402(1) to data file(s) appropriate for input to 3D printer(s) and/or other manufacturing equipment. The platform 1404 may also assist the customer 1402(2) to locate one or more appropriate 3D printer owners 1402(3) having one or more 3D printers or other machines to create an appropriate quantity of the product(s). The platform 1404 may help the customer 1402(2) to locate the 3D printer owners 1402(3) based upon geographic location, print job cost, quality of output, printer or media characteristics, or other criteria. The platform 1404 may help the customer 1402(2) to print low volume from a small set of printers (e.g., one or more printers of a single printer owner), or higher volume in shorter time from a larger set of printers (e.g., multiple printers owned by multiple printer owners). The platform 1404 may also arrange for one or more shippers 1402(4) to move the product from the printer owners 1402(3) to an end customer, which may or may not be the customer 1402(2) that worked with the designers 1402(1) and printer owner 1402(3). The platform 1404 in this example may handle aspects of bids provided by various designers, printer owners and/or shippers for the consideration of the customer. The platform 1404 may handle aspects of quality assurance and testing of the printers associated with the platform. The platform 1404 may handle aspects of the credentials and/or competency of the designers for various types of work. The platform may maintain customer feedback related to designer, printer and/or shipper skill, quality and/or timeliness. The platform 1404 may handle, regulate, translate and/or manage the file types or data types that are used by various designers and/or printers. Thus, the platform 1404 may assist designers and printer owners to increase their mutual compatibility, and to thereby help the customer to obtain more value from designers and broader choice of printers, while helping printer owners to maximize the utilization rates of their printers and thereby increase the return on investment on their printers.

Any or all of the operations (A)-(M) and other operations described with reference to FIG. 14 may be recorded in the distributed ledger 1414 maintained at any one or more of the entities 1402, platform 1404, the data store 1406, and/or other computing devices. Moreover, once manufactured, the location and/or custody of the item may be tracked by one or more sensors included in the package and/or one or more external scanners (e.g., scanners located at one or more checkpoints), and the location and/or custody may be transmitted to one or more of the entities 1402, the platform 1404, and/or the data store 1406 where it can be written to the ledger 1414.

Example Computing Device of Distributed Manufacturing Platform

Figure 15:
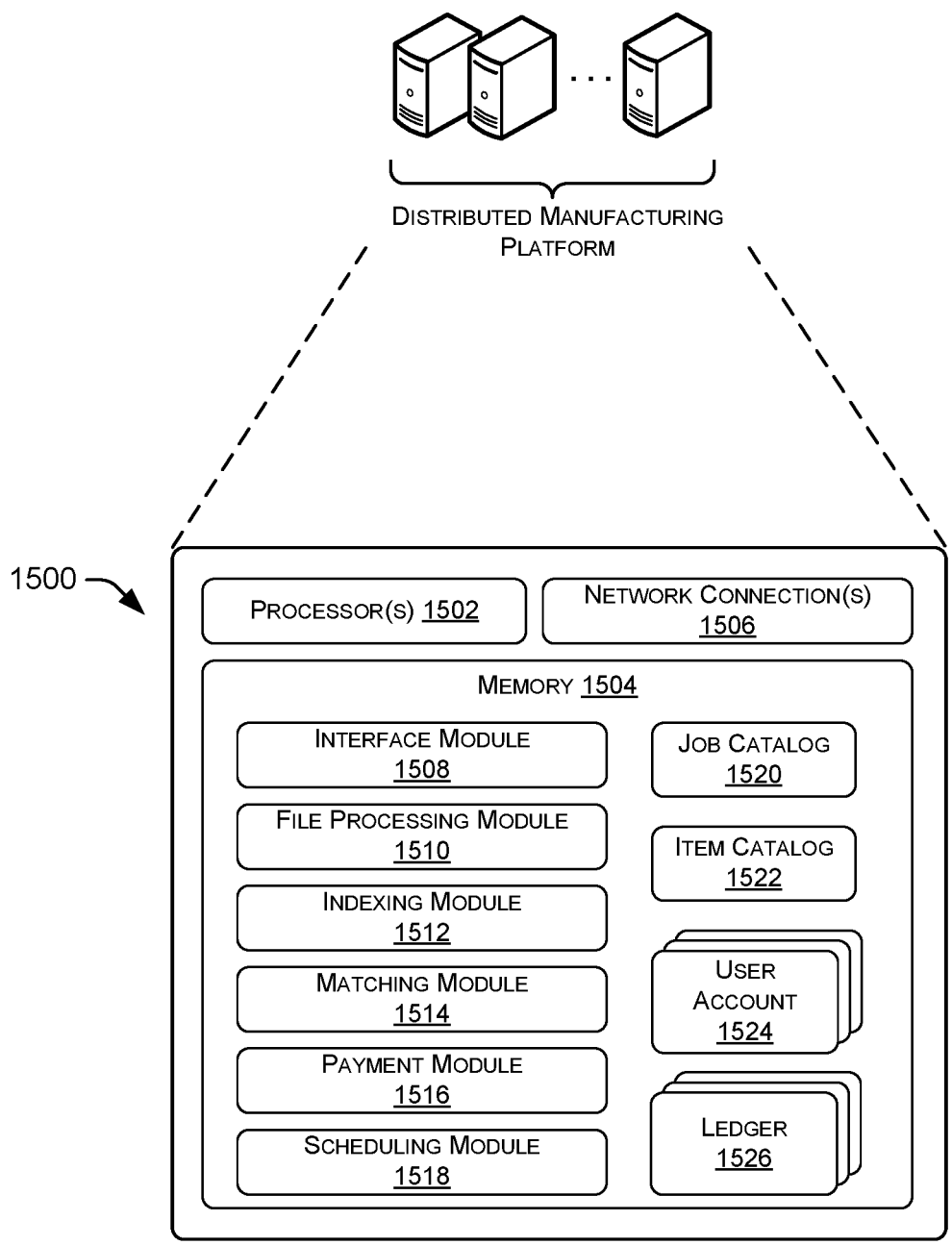
FIG. 15 is a schematic diagram illustrating an example computing device of a centralized distributed manufacturing platform.

FIG. 15 is a schematic diagram illustrating an example computing device 1500 for use a distributed manufacturing platform. The distributed manufacturing platform may be composed of one or more of computing devices 1500. The computing device 1500 is a nonlimiting example of a computing device, one or more of which can, in some examples, be used to implement the distributed manufacturing platform 1204 or the distributed manufacturing platform 1404.

The computing device 1500 comprises one or more processors 1502 and memory 1504. The processor(s) 1502 may comprise one or more microprocessors (e.g., central processing units, graphics processing units, etc.), each having one or more processing cores, one or more microcontrollers, or other hardware capable of processing information and/or executing program instructions. The memory 1504 may be configured to store one or more software and/or firmware modules, which are executable by the processor(s) 1502 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The computing device 1500 also includes one or more network connections 1506 to connect the computing device 1500 to one or more other computing devices via one or more networks. By way of example and not limitation, the network connections 1506 may enable the computing device 1500 to communicate with other computing devices of the distributed manufacturing platform, other computing devices within a system (e.g., entities 1202, 1302, 1402 and/or data stores 1206, 1306, 1406), as well as to one or more other local and/or wide area networks. In some examples, the network connections 1506 may be configured to receive and relay communications between and among other entities via the one or more networks. Distributed manufacturing platforms according to this application may be implemented using one or more local computing resources (e.g., computers, servers, etc.) and/or remote (e.g., cloud-based resources). In some examples, distributed manufacturing platforms may be distributed across multiple local and/or remote computing resources.

As shown in FIG. 15, the memory 1506 stores one or more applications or modules. In the illustrated example, the memory 1506 includes an interface module 1508, a file processing module 1510, an indexing module 1512, a matching module 1514, a payment module 1516, and a scheduling module 1518. In other examples, fewer, additional, or alternative modules may be included. For instance, as will be described further below, the distributed manufacturing platform in this example includes modules that provide functionality (e.g., merchant services, payment services, etc.) that could be performed by one or more other entities, in which case corresponding modules could be omitted from the distributed manufacturing platform. Furthermore, additional modules corresponding to additional functionalities (e.g., manufacturing services, brokerage services, etc.) could be included in the event that the distributed manufacturing platform itself provides 3D printing or other manufacturing services.

The interface module 1508 provides one or more interfaces by which other entities can communicate with the distributed manufacturing platform. The interface module 1508 may include one or more graphical user interfaces (GUIs), application programming interfaces (APIs), web interfaces, or other human-to-machine and/or machine-to-machine interface by which other entities can interact and/or communicate with the distributed manufacturing platform. In some examples, the interface module 1508 may include a website or web portal through which entities can interact and/or communicate with the distributed manufacturing platform. For instance, the interface module 1508 may serve web interfaces that enable the interactions described throughout the application.

The file processing module 1510 receives files (e.g., item models, product specifications, photographs, drawings, renderings, marketing materials, etc.) from one or more entities and processes them for storage in a data store (e.g., data store 1206, 1306, 1406, etc.) and/or transfer to one or more other entities. By way of example and not limitation, the file processing module 1510 may include compression software to compress the files, file conversion software for converting the files to one or more different file formats (e.g., converting item models to file formats compatible with one or more 3D printers or other manufacturing equipment), encryption software to encrypt the files, and/or digital rights management (DRM) software to protect the files and/or limit their reproduction or distribution. In some examples, the file processing module 1510 may additionally or alternatively include tagging software to analyze files and extract keywords, semantic meaning, meta data, or other information with which to tag the files or other files (e.g., a product specification for an item may be analyzed to extract keywords, description, and meta data with which to tag an associated item model). The file processing module 1510 may also include package generation software configured to generate a package model for an item based on an item model for the respective item, a scan of the item, or other information. Then, when designer uploads an item model for a new item, the file processing module may generate a package model that can be used to manufacture (e.g., 3D print) a package for the respective item. The package model can then be tagged with an identifier of the item and/or stored in association with the item model.

The indexing module 1512 includes indexing software to index received files for ease of searching, matching, and presentation. For example, the indexing module 1512 may index product specifications, manufacturing requirements, and other information provided by customers and add them to a job catalog 1520 listing open jobs for which customers seek designers to design new products. As another example, the indexing module 1512 may index item models and add them to an item catalog 1522 of items available via the distributed manufacturing platform or another entity (e.g., a merchant or marketplace of merchants). As yet another example, the indexing module 1512 may index item detail pages for an item including a description, images, and/or details of the item and store them in the item catalog 1522 along with a corresponding item model for the item. The indexing module 1512 may, in some examples, index the files based at least in part on the tagging and other processing performed by the file processing module 1510.

Subsequently, when a designer searches or browses for a job, the matching module 1514 matches the designer with one or more jobs in the job catalog 1520. As mentioned above, this matching may take into consideration the job difficulty, designer skill level, designer pay level, designer specialty, designer reputation or rating, and/or other factors. Similarly, when a customer searches for an item, the matching module 1514 identifies one or more items that match the search criteria. Once an order is placed, the matching module 1514 also matches an order request to a production machine (e.g., 3D printer or other manufacturing equipment) based on factors or criteria, individually or in combination, including price, quantity of items ordered, type of product or printer, availability or activity level of required printers (i.e. how busy is the needed machine), print materials, quality requirements, capabilities, reputation, shipping cost, security, location, etc.

The payment module 1516 transfers payment between the various parties each transaction according to the terms of the respective transaction. In some examples, entities or individual users of the distributed manufacturing platform may have user accounts 1524. The user accounts 1524 may include data regarding users that have registered with the distributed manufacturing platform, such as customers, designers, manufacturers, merchants, shippers, payment services, reviewers, or other entities. The user accounts 1524 may include names, login credentials (e.g., user name, password, security questions, tokens, or other credentials), contact information (e.g., email addresses, phone numbers, mailing addresses, etc.), demographic information (e.g., age, gender, etc.), financial credentials (e.g., credit cards, bank accounts, etc.), birth dates, preferences, purchase history, return history, browsing history, user recommendations, medical history, drug allergies, prescriptions, or any other information reasonably related to the operations of the distributed manufacturing platform. When a customer places an order (or some time thereafter), the payment module 1516 may transfer payment from a financial account of the customer to financial accounts of the distributed manufacturing platform and one or more designers, manufacturers, shippers, and/or other entities, based upon the services used to fulfill the order and the terms of the purchase transaction.

Once an order is placed, the scheduling module 1518 may transmit instructions and/or files to one or more manufacturers, shippers, and/or other entities that are to perform operations associated with fulfilling the order (e.g., designing the item, manufacturing a specified quantity of items, finishing the items, post processing the items, assembling the items, shipping the items, etc.).

The computing device 1500 may record details of any or all of the operations it performs, transactions that are performed using the distributed manufacturing platform, and/or instructions that it sends to other entities in one or more ledgers 1526. The distributed manufacturing platform may maintain a single common ledger or multiple separate ledgers for different entities, industries, industry groups, organizations, permissions, or other groups as described in greater detail in other locations.

In an example operation, a customer may browse or search the distributed manufacturing platform via the interface module 1508 for a product, the matching module 1514 may identify one or more items from the item catalog 1520 that match the search query or browsing category, and the interface module 1508 may serve one or more item detail pages corresponding to the items from the item catalog 1520. The customer may then select an item to order, and the scheduling module 1518 may send instructions and files to a manufacturer to have the item manufactured and to a shipper to pick up the item from the manufacturer at a future date and time and deliver it to the customer. The payment module 1516 may transfer funds from the customer to the distributed manufacturing platform, the manufacturer, and the shipper at times and in amounts according to terms of the purchase. In some examples, these terms may be predefined by the distributed manufacturing platform, while in other examples the terms may be negotiated by the parties to the transaction and may be recorded in a smart contract at the time the order is placed.

Example Computing Device of an Entity

Figure 16:
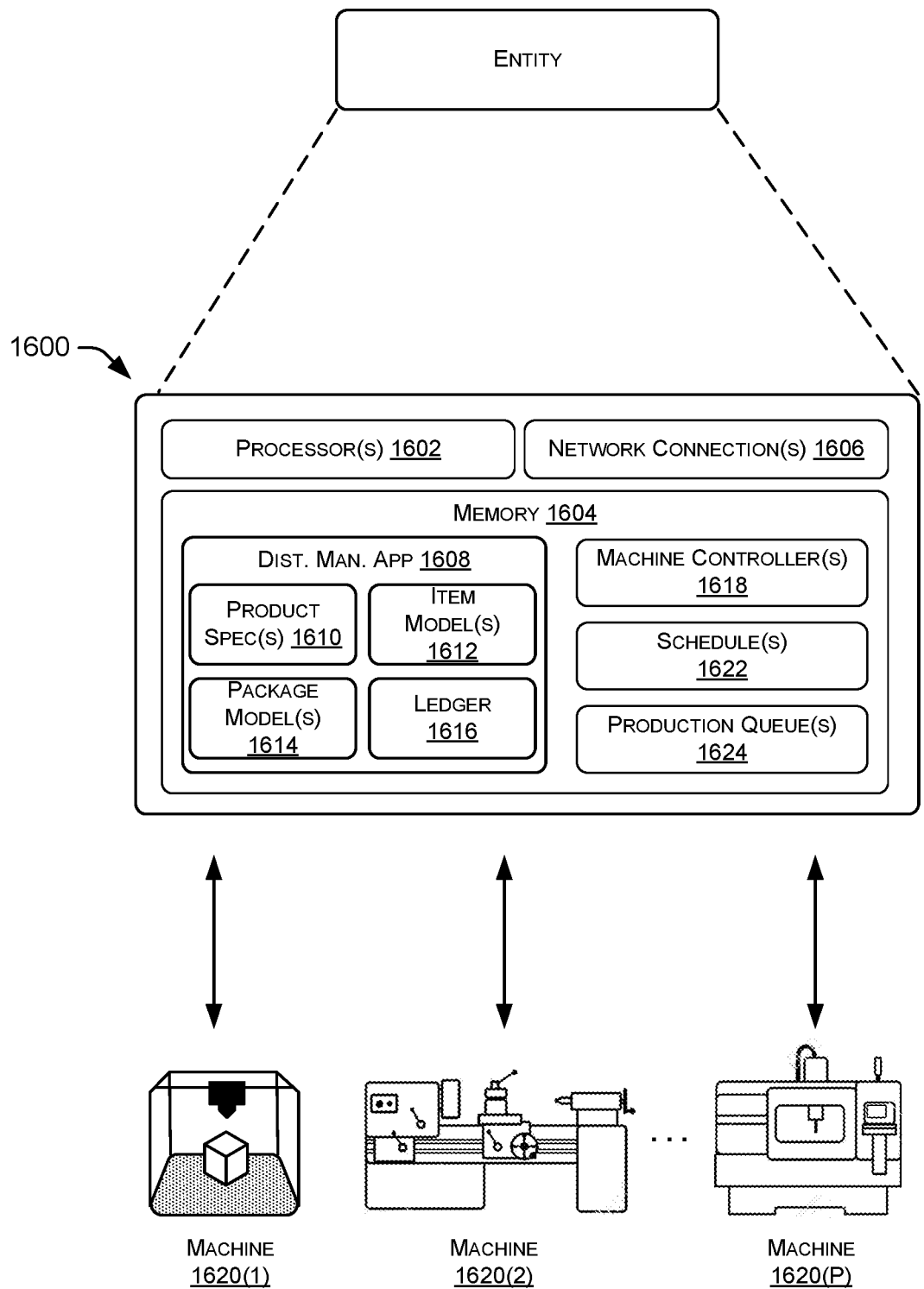
FIG. 16 is a schematic diagram illustrating an example computing device of an entity usable to implement distributed manufacturing techniques.

FIG. 16 is a schematic diagram illustrating an example computing device 1600 of an entity, such as a designer, manufacturer, customer, shipper, or other entity. In this example, the computing device 1600 is illustrated as a computing device of an entity in a decentralized distributed manufacturing system such as that shown in FIG. 13.

The computing device 1600 comprises one or more processors 1602, memory 1604, and network connections 1606, which may function the same as or similar to the corresponding components described with reference to the computing device 1500 of FIG. 15.

As shown in FIG. 16, the memory 1606 stores one or more applications or modules. In the illustrated example, the memory 1606 includes a distributed manufacturing application 1608, which may be the same as or similar to the distributed manufacturing application 1304 described with reference to FIG. 13. Thus, the distributed manufacturing application 1608 may include one or more communication protocols for peer-to-peer file sharing ("P2P") and logic and interfaces usable to distribute data and electronic files over the network to one or more other entities. The distributed manufacturing application 1608 in this example also implements a distributed data store and includes or is associated with memory for storage of product specifications 1610, item models 1612, package models 1614, and/or other data associated with distributed manufacturing. The distributed manufacturing application 1608 may be configured to write to a distributed ledger 1616, which may be built into the distributed manufacturing application 1608 (as illustrated), or may be separate from the distributed manufacturing application 1608 (e.g., as in the case where an existing ledger such as the bitcoin or Ethereum ledger is used).

The foregoing elements of computing device 1600 are representative of any entity in a decentralized distributed manufacturing system such as that shown in FIG. 13. In the case of a system including a centralized distributed manufacturing platform such as that shown in FIG. 12, the distributed manufacturing application 1608 may be omitted. However, computing devices of certain types of entities may have additional or alternative hardware and/or software components.

The computing device 1600 shown in this example includes additional hardware and software components corresponding to a manufacturing entity, such as printer owner 302(3) in FIG. 14. Specifically, memory 1604 of the computing device 1600 includes one or more machine controllers 1618 configured to control one or more machines 1620(1), 1620(2), . . . 1620(P) (collectively "machines 1620"), where P is any integer greater than or equal to 1. In the illustrated example, machine 1620(1) corresponds to a 3D printer, machine 1620(2) corresponds to a computer controlled lathe, and machine 1620(P) corresponds to a CNC mill. However, in other examples, the machines 1620 may include any type of additive or traditional manufacturing machines including, without limitation, machines for molding (e.g., injection molding, blow molding, blow fill seal, etc.), casting (e.g., sand casting, investment casting, etc.), machining (e.g., milling, turning, drilling, etc.), forming (e.g., shearing, stamping, punching, etc.), joining (e.g., welding, brazing, soldering, etc.), finishing operations (e.g., deburring, sanding, polishing, knurling, sand blasting, etc.), post processing (e.g., annealing, quenching, cryogenically freezing, painting, powder coating, plating, etc.), and the like. Further, the machines 1620 may include a single machine, multiple instances of the same type of machine, multiple instances of multiple different types of machines. The machine controllers 1618 may be communicatively coupled to the machines 1620 via the network connections 1606. While the machine controller(s) 1618 are illustrated a single software or firmware module stored in the memory 1604, in other examples, multiple separate machine controllers 1618 may be used (e.g., one machine controller for each machine, or one machine controller for each type of machine) and/or the machine controllers 1618 may be implemented as hardware controllers (e.g., micro controllers) that are part of the computing device 1600 and/or the respective machines 1620.

Memory 1604 of the computing device 1600 also includes one or more schedules 1622, production queues 1624, and other modules 1626. The schedule(s) 1622 define the amount of machine availability that the manufacturer is willing to make available for use by the distributed manufacturing techniques. For instance, if on average the manufacturer currently uses a particular machine 60% of the time and the machine remains unused the remaining 40% of the time, the manufacturer may update the schedule 1622 to show that the machine is available 67.2 hours per week (i.e., 40% of the 168 hours in the week). The schedule 1622 may define the machine availability in numerous different ways. In some examples, the schedule 1622 may be in calendar form indicating the hours in which a particular machine is available. In other examples, the schedule 1622 may set an absolute amount of machine time that the machine is available (e.g., 40 hours, 10 days, etc.), a rate of machine time availability (e.g., 4 hours per day, 3 days per week, etc.), a percentage of availability (e.g., 20% of the machine time is available), etc. Separate schedules 1622 may be used for each machine, or a single schedule may be used for all machines that the manufacturer operates or designates for use with the distributed manufacturing techniques.

The production queue(s) 1624 include jobs that are currently in progress. The production queue(s) 1624 may define the time required to manufacture a quantity of an item. The time required may be a function of, for example, the quantity of the item, an item model 1612 of the item, a package model 1614 for a package for the item, or the like. Separate queues 1624 may be used for each machine, or a single queue may be used for all machines that the manufacturer operates or designates for use with the distributed manufacturing techniques.

The schedule(s) 1622 and/or the queues 1624 may be published, transmitted, or otherwise provided to a distributed manufacturing platform (in the case of a centralized distributed manufacturing system) and/or one or more other participating entities (in the case of a decentralized distributed manufacturing system) for use in matching the manufacturer's machines to new manufacturing jobs.

Examples of Improving 3D Printer or Other Machine Utilization and ROI

New manufacturing methods for pharmaceutical products (including medicine, supplements, and similar items) are changing the way these products reach end users. In particular, additive manufacturing is creating unique opportunities to tailor products to the individual consumer in an on-demand way. This may include customized dosing based on a particular set of dynamically generated inputs, combining multiple medicines and dosings into a single pill (or patch or other delivery mechanism), adding time-delay capability to a multi-medication pill, or adding non-medical supplements to a medical delivery mechanism (pill, patch, etc.). All of these offer great value to both the consumer and the producer, but injecting additive manufacturing into traditional supply chains is not without its own challenges.

Because additive manufacturing technology (3D printers, for example) typically contain networked computing devices or capabilities, a number of novel solutions to the challenges of deploying the technology at scale exist. In particular, several challenges lie in managing usage of the manufacturing platform itself (i.e., the 3D printer), including availability, cost, scheduling, managing need for human interaction versus autonomous operation, and more. This application describes solutions to these problems in several unique ways.

In some examples, a distributed network of additive manufacturing machines can report availability of the devices to accept a manufacturing sequence (e.g., "print job"), thereby capturing latent supply (i.e., underutilization of printers) and making it available to others with unmet demand. There are a number of factors that can be included with regards to availability or capacity of the additive manufacturing device (or other traditional manufacturing machines for that matter), including factors such as duration of print job, material from which to print, location of printer, location of purchaser, location of recipient, "time to human intervention" or "availability of human intervention," finish quality, precision/resolution, size, downstream post-processing requirements, shipping options, or any combination of these factors. The print job may include data describing or related to any or all of these factors. This data can be presented in a machine-readable format and/or a human-readable format and can be accessed via traditional computers or mobile devices and via web browsers, printer drivers, or other applications (e.g., computer aided design applications, graphics applications, e-commerce marketplace applications, etc.). This platform allows manufacturers and individuals to initiate manufacturing sequences (e.g. "print jobs") that align with their other business goals or constraints.

In some examples, a version of this distributed network management capability for additive manufacturing capacity can be deployed internally within a single organization that maintains multiple manufacturing devices or 3D printers (e.g., within a single pharmaceutical company, manufacturer, device company, university, etc.). The distributed network management can interface with other systems and networks of the entity to capture data regarding capacity, supply and demand, in addition to other business elements from other information technology systems within the enterprise, such as customer orders, wholesale supply needs, coordinated logistics information, sales goals or forecasts, weather, employee schedules, or other sets of input. Any or all of these systems can be inputs to inform the distributed network management system, and the distributed management system may output information to these systems regarding external use of the enterprise's 3D printers or other machines.

In some examples, this distributed network can allow individual additive manufacturing devices or 3D printers to participate when not otherwise occupied by work generated by the device owner. In this scenario, device activity can be monitored remotely, and when not in use, accept manufacturing requests from the network that are compatible with its capabilities, as described above. In this example, a system of smart-contracts can enforce payment between the device owner and the requestor, such that an appropriate compensation rate is automatically determined based on relevant factors (e.g., supply, demand, peak vs. non-peak hours, or other market conditions), and reliably transferred between parties at the agreed-upon intervals (upon partial or total completion of the manufacturing session, upon successful delivery of the item, or any combination thereof).

In situations where multiple additive manufacturing devices are operating, this technology offers the capability to capture, calculate, and predict time-related activities such that additional efficiencies can be gained. For example, it is possible to use prior device activity to predict availability (i.e. the device is in use from 9 AM to 5 PM, but idle otherwise, or is typically idle on weekends, etc.). This allows the device owner to maintain uninterrupted operation at their existing pace and pattern, yet allow the device to maximize the value in the latent capacity during periods of typical non-use. Other time-related calculations can include coordination between devices such that manufacturing sequences with different time horizons complete concurrently and can be moved, manipulated, or finished in a batch fashion. In this example, one device may begin a 6-hour sequence (e.g., printing a first part of an item), and two hours later another adjacent device may begin a 4 hour sequence (e.g., printing a second, smaller part of the item), with a final device waiting an additional 2 hours before starting a 2 hour sequence (e.g., printing a package for the item). Each of these sequences end at the same time, allowing any intervention (by human and/or automated means such as robotics) to complete this transitional work, such as assembly of the parts and packaging the item, all at once. This can drastically reduce costs in terms of both time and man-hours. This scheduling can be accomplished via a scheduling module of a computing device of the enterprise (or of a remote distributed manufacturing platform) based on the machines used, the print/manufacturing rates of the machines used, the models of the parts/items/packages to be printed, the print or other manufacturing time required to print the respective parts/items/packages, the availability of human operators and/or automated material handing equipment, or the like.

In some examples, coordination between manufacturing devices can be based on other factors, including coordination of multiple parts of an assembly and timing completion such that the parts are ready for subsequent steps in the appropriate order. This coordination can also take into account external factors, such as multiple additive manufacturing devices at multiple locations. These external factors can include timing of shipment, shipping modality, and others. In this example, it may be the case that some parts are produced domestically and shipped via ground, or air, while others are produced internationally and shipped via cargo ship. In this scenario, the items with shorter manufacturing and shipping cycles can be initiated when the cargo ship reaches a certain destination or distance from final delivery, allowing "just in time" manufacturing capability to happen dynamically and reducing need to store or warehouse any component parts. In this example, all coordinated parts arrive in precisely the order and quantity in which they are required, as determined by the business drivers of the manufacturing effort.

Algorithms can be optimized or tailored for printing speed, shipping speed, or both. In another example, part of the manufacturing process can take place en-route. For example, items can be printed on the container ship as it transits the ocean, post-processing activities may be carried out on a cargo plane while it is in the air. This "mobile factory" can also be coordinated with the other components of the distributed supply chain, such that their deliveries are tightly coordinated to maximize efficiency and minimize waste.

Real-time supply-chain interactions are also possible. For example, if an item is ordered for one customer, but another order for the same item is received while the item is still being made or is in transit, it is possible for the two customers to negotiate such that both parties are happy with the exchange. For example, one customer is willing to pay more to get an item faster, and the second customer is willing to accept a portion of this payment in exchange for delayed delivery of a substitute item as their original order is used to fulfill the first customer's higher-priced offer. This sort of exchange can be accomplished by the manufacturer and/or distributed manufacturing platform identifying the two orders for the same part, and sending notifications to one or both customers. By way of example, the notification may offer a first customer a discount in exchange for a delayed delivery of the item, may offer the second customer an option to obtain the product sooner for a higher price, may connect the first and second customers to negotiate the exchange, may initiate a bidding process to determine which customer will receive the item first, or any number of other techniques. Upon receiving a response to such notification from one or both customers, the manufacturer or distributed manufacturing platform may adjust the manufacturing process, shipping mode, shipping addresses, payments, and any other portions of the transaction in order to accomplish the exchange.

In some examples, the distributed network or a distributed manufacturing platform may provide a dashboard, management panel, or other application to a computing device of the manufacturer. In some examples, via this application, the manufacturer may indicate how much extra capacity they're willing to share (percentage, or hours, time windows, etc.). In other examples, the printer owner might set a dollar amount they're seeking to recover from their printer each day/week/month/quarter/year. An algorithm at the manufacturer's computing device, distributed manufacturing platform, or other entity can determine how many jobs and of what kind to take to meet that number (or, to hit the number faster, slower, maximize profit, etc.). In this example, the people with the printers control when and under what terms they take work through the distributed network.

Examples of Improving Access to 3D Printing and Other Machine Resources

A significant barrier to access exists regarding manufacturing equipment in general, and advanced additive manufacturing technology in particular. In many cases, the acquisition of these machines is prohibitively expensive for small and mid-sized firms, they lack the expertise or personnel to effectively use these machines, and/or their need for the technology simply doesn't justify the capital expenditure. It is also common that major urban areas have shared access to these technologies (i.e., a "maker space") but firms located outside of these areas are often out of luck. Even if a firm can afford to acquire the physical additive manufacturing technology, an additional challenge exists in accessing required packaging expertise to maximize the value of packaging for products may by these additive manufacturing technologies. This application describes techniques that lower the cost to additive manufacturing capabilities and increase access to these resources in a number of different ways.

In one example, manufacturers are able to access multiple packaging designs in a template format, and make additional customizations. In this example, manufacturers are not required to design the packaging themselves, but may add pre-designed components to achieve custom functionality and appearance. These customizable components may include, but are not limited to, packaging type (box, bottle, blister pack, individual foil-type tear packets, tamper resistant, child-proof, etc.). Additional components include models based on inputs such as product size, shape, dosage, standard prescription size (e.g. one week, 30 days, etc.). Packaging may be further customized by selecting integration of additional sensors (e.g. humidity, temperature, shock, torsion, opening/tampering, etc.) or external visual customization.

In the pharmaceutical context, external visual customization of packaging may include some or all of the following: regulatory compliance markings (individual numbering, lot numbering, manufacture date, manufacture location, etc.), as well as patient or provider information, medication instructions or handling details, dosing information, overdose information, side effects, source verification information, anti-counterfeiting markings or other technologies, marketing or branding such as a logo or similar mark, or any other desired external visual customization.

Furthermore, these customizations can be created on an individual, on-demand basis. In this example, one customer of a particular medicine or other product could receive it in on set of packaging, while another customer receives identical medication or product in an entirely different packaging, customized based on the needs or desires of the end-user, branding or advertising efforts of the manufacturer, regulatory requirements based on consumer location, or any combination therein.

In addition to selecting these customizable components from a pre-designed template-style gallery of options, this application describes crowd-sourced design functionality or multi-party collaboration. In this example, one party may be responsible for designing the product, while another party may be responsible for designing the physical elements of the packaging, and yet another party responsible for designing the visual representations on the outside of the packaging, etc. Additional collaboration, crowd-sourcing, or multi-party engagements are possible by engaging additional service-providers in the supply chain, including printers or print bureaus, firms providing finishing work, shipping and logistics companies, last-mile solution providers, customs officials or other regulatory bodies, etc.

In this example, the physical design elements can be altered dynamically based on the downstream delivery logistics. For instance, if a particular product is going to be shipped in a modality that does not offer climate control, temperature and humidity sensors may be required to ensure that the potency or efficacy of the medication is not degraded during transit. Additional physical safeguards may need to be built into the packaging to help prevent any temperature or humidity issues. In another example, if a particular medication is normally shipped via air cargo, but will be shipped via overland freight, additional protective packaging may be required. If a particular shipment is being delivered to a geography with additional regulatory requirements, those can be built into the packaging based on the final destination, and/or any regulatory or customs waypoints. Additionally, in this pharmaceutical context, medications regulated as Controlled Substances can have additional packaging and handling demands, all of which can be accounted for in the packaging design on this platform. In some examples, the wholesale or retail requirements may be dynamically altered, providing for unique configurations, quantities, display locations (e.g., likely display on endcaps, top shelves, eye-level shelves, or ground-level shelves, with important package and label characteristics dynamically determined by who will see the packages and where), by needs for automated package handling equipment machine readability requirements (e.g., codes on top, side, front, back, or bottom of packages), or other related cues. Some examples might include physical design elements based on types of automated equipment handling (e.g., space for forklift tines, handles for robotic arms, indentations for robotic graspers, locking components for pallets, etc.).

While this application describes techniques to increase access to additive manufacturing capabilities and talent for manufacturers, it also increases capabilities for designers, where those capabilities were previously unavailable at their size or scale. This ability to share resources and access scale on-demand can allow for additional innovations benefitting designers and manufacturers, as well as end-users.

Example Techniques to Improve Shipping Efficiency

In some examples, this application describes techniques for the coordination and integration of shipments from disparate locations to a single location or in a linear fashion to facilitate for finishing, post processing, assembly, assembly, and/or packaging. To use another pharmaceutical example, the effects of individual drugs are enhanced when taken in conjunction with each other. In settings where the combinatory drugs are produced by different manufacturers, the techniques described herein can facilitate packaging that enhances this ability to combine medications. In this example, the initial dosage may be created in such a way that it is partially packaged (e.g., suspended, presented, or otherwise accessible) and an additional medication or dosage can then be added to the core dosage and the packaging completed around it, resulting in a single package featuring multiple medications from multiple manufacturers. In some examples, the partial packaging may include a temporary cover or seal that can be easily removed in order to add the additional medication before printing the remainder of the package.

In some examples, multi-modal packaging can be created that adds value to the manufacturer, consumer, or logistics company. In one example, individual dosages may be produced in bulk at one location, and shipped with minimal packaging to a different location, where they are packaged and distributed in accordance with other demands (i.e., HIV treatments and tailored cancer treatments that require a "cocktail" of drugs can be packaged as a customized set of daily dosages from these bulk manufacturers). The packaging can be customized as mentioned above, despite coming from multiple manufacturing sources.

Combining medications successfully can require other inputs such as location or geography, time required to ship from one location to another, volatility of particular compounds over time or in particular environmental contexts, and more. All of these can be taken into account and addressed through packaging modifications, supply chain enhancements, or business processes enabled through the platform. In some examples, multiple medication sources can be integrated into a single additive manufacturing device and co-located with a physical brick and mortar store (i.e., a machine that prints pills but is located in a pharmacy, where the pharmacists provides their existing set of services to the patient, but the medication is created on-site, on-demand, and/or in combination customized to the patient when needed).

Example Auditing, Authentication, and Digital Rights Management (DRM)

Because the techniques described herein allow the supply chain to become distributed and disintermediated, it can be beneficial to authenticate users and provide traceability and auditable records to ensure the integrity, effectiveness, and validity of anything created or packaged using the platform. This can be accomplished in multiple ways.

In one example, any party involved in the transaction (e.g. a human such as a designer, an entity such as a manufacturing corporation or transportation provider, or a machine such as a printer) is assigned a unique identifier on a shared distributed ledger (e.g. a unique address on a blockchain). The nature of the interactions between the parties and the transaction can be included explicitly or intentionally obfuscated. In some examples, it is beneficial to include the details of the transaction, such as to provide authenticity and provenance of a particular item or medication, and verify that it was created by the original and intended manufacturer. In other examples, it may be beneficial to intentionally obfuscate information. In this example, it may be beneficial for regulators to be able to see which providers are prescribing how much of a particular medication, but they need not (and, indeed, should not) be able to personally identify information about which patients are recipients of that provider's prescriptions.

The ability to link the manufactured item, the packaging, and the parties in an interaction can provide additional benefits to participants in the network. For example, this "life story" can significantly reduce medication adulteration, theft, counterfeiting, or diversion. The shared distributed ledger can be queried by potential acquirers (e.g., patients, pharmacy, retailers, shippers, etc.) to verify that the shipment is legitimate, valid, undamaged, and unencumbered by any nefarious background circumstances. The ability to query these datasets can also facilitate more efficient product or drug recalls, track impact through the supply chain to end-users, identify potential sources of counterfeit or infringing goods, and increase regulatory efficiencies.

This shared distributed ledger also enables low-friction licensing transactions between parties. In this example, smart-contracts can be used to license intellectual property including, but not limited to, packaging designs, patents, copyrights, production time on a printer, raw source materials, visual designs, or other valuable materials. These smart contracts can be predefined, or negotiated for each transaction, and can be written to the blockchain and may be in addition to, may incorporate, or may be used instead of traditional shrink wrap or click through licenses. In these transactions, because they are written to the ledger, use of any intellectual property on the network can be verified and compensated automatically according to pre-negotiated royalty rates. The network facilitates a dynamic pricing capability, and can accommodate multiple input variables—for example, whether or not a generic medication is acceptable will impact packaging and branding decisions, number of units the license allows to be generated, whether the item can be preproduced or resold, etc.

Example Techniques for Improving Trust and/or Reducing Risk

The ability to capture transactions on a shared, distributed ledger can also address a significant problem in the distributed manufacturing space: lack of trust between prospective participants. In traditional business relationships, trust can be built over time and through conversations, meetings, and other professional interactions—both in-person and virtual. In the context of a distributed manufacturing platform, trust must be supplied via structural mechanisms to ensure that an acceptable level of trust is present for first-time participants, and for existing participants engaging new partners for the first time. This application describes multiple ways to generate, capture, provide, and ensure this minimum level of trust between participants, while at the same time increasing transparency and auditability, thereby reducing the risk of fraud or bad acts.

In one example, the shared, distributed ledger allows participants to leave a review, offer feedback, or make a comment about the interaction that is linked to their relevant entries in the ledger. By both validating the participant as a verified party in that transaction, and linking to that transaction in conjunction with their response, the techniques described herein incentivize honest and forthright interactions, and quickly surfaces participants who are not meeting expectations.

In some examples, the system may hold payment to new participants in escrow until a positive review is received by the customer, thus preventing fraudulent manufacturing from impacting unsuspecting customers. This may be done for a certain time period (e.g., 3 months, 6 months, 12 months, etc.) or a certain number of transactions (e.g., first ten orders) or when a certain threshold is reached (e.g., until 80% of reviews are positive). It may also be reinstated at any time given similar triggering functions (i.e., positive reviews fall below a set threshold, negative feedback is received, fraud is reported, data analytics of transactions involving the entity indicate likelihood of fraud, a number of flagged transactions in a certain period, etc.).

In some cases, each individual actor may be assigned an identification based on immutable information, including personally identifiable information such as retina scans, fingerprints, or other factors, which may be used to affirmatively allow (white list) actors, or prospectively disallow (blacklist) actors. Similar characteristics could include physical addresses, IP addresses, system hardware identifications as with CPU embedded identifications, internet providers, or other characteristics. Heuristically generated factors could also play a role as with malware and virus scanning, but focused on factors in the stream of commerce, including flooding systems with entries, and other functions that indicate malintent, or lack of ability to provide the ordered products in the quantities desired.

Conversely, the system may also use these capabilities to prevent fraudulent customers from impacting the network by ordering items but claiming to have never received them, leaving negative feedback or ratings, etc. In some examples, this can be done via a third party verification of the transaction, which can be done remotely through digital techniques, physically through an in-person transfer of items, or in a hybrid mode where some third party verification is proffered (e.g., by the delivery driver verifying the delivery of the package and its contents, by video created by the delivery drone, etc.). In some examples, the system may limit the number of orders or price of orders for new customers until a reputation is established, or may require customers to put a good faith deposit, or percentage of the total purchase amount, in escrow prior to ordering.

In either case, the amount of energy required to participate in the system fraudulently is increased, and the benefit of doing so is decreased, thus minimizing negative participants on the network through economic incentives. Because the system is decentralized, additional controls can be implemented or altered at any time to adjust for unforeseen threats or fraudulent practices. Auditability through the shared ledger can allow for reparations to impacted parties after the fact, and also facilitates forensic capabilities that may allow the system to detect and prevent fraudulent activity in near real-time.

This review functionality is particularly important in building a peer-reviewed network of collaborators, considering the multitude of roles potentially required to complete more a more complex transaction (i.e., item designer, packaging designer, printer, shipper, buyer, etc.). The ability to create a feedback loop of community interactions will ensure that active, visible, capable participants are rewarded for their contributions by recognition from others they have worked with. Likewise, less-scrupulous or less-capable participants will also have their participation levels made available for review by a potential partner prior to engagement.

In another example, many of these feedback mechanisms can be automatically generated and enforced via smart contract capability contained within the platform, as well as with sensors or other data-gathering capabilities built into the packaging. In this example, particular metrics regarding a transaction can be captured and shared automatically (i.e., if the production started on time, was completed on time, shipped as agreed, whether the package was dropped or overheated in transit, etc.).

Because the feedback is generated automatically, situations may arise where human review and feedback becomes necessary as an arbitration function. In this example, it is possible for a distributed manufacturing platform to offer token-based incentives for participants not party to the transaction in question to play the role of arbitrator. This human intervention allows the distributed manufacturing platform to be flexible and adapt to situations by leveraging the great value in automated, sensor-based feedback loops, while also accounting for the possibility of data errors, sensor malfunction, fraud/tampering, or other related issues.

These combined capabilities—automated, sensor-based feedback loops and human-powered intervention with network incentives—can be combined to allow contractual allocations of risk, such as insurance or similar financial mechanisms. These verifiable data sources can allow for the application of financial tools and methodologies that can help insure, finance, or otherwise support production efforts, while also allowing for automated enforcement of contract terms. This capability also allows participants to avoid certain existing frictions in dealing with multi-party collaborations, including currency fluctuations or exchange issues, and can enable collaborations that were previously impractical or impossible.

Additional verification and validation mechanisms can be included on the distributed, shared, immutable ledger. In this example, additional evidence or documentation of a product or service can be captured (such as video or photographic content of the item being produced, sensor data regarding production, or other elements). A cryptographic hash function of this evidence can be generated and written to the ledger (i.e. blockchain) such that the authenticity of the evidence can be verified, but the artifact itself can be stored off-chain (such as a cloud-based image or video hosting service, a vendor's own off-site storage, or with the customer). The authenticity of the evidentiary artifact can be verified at any time by re-generating the cryptographic hash and comparing the outcome with the record on the ledger.

This capability can be useful in situations where opening a package to verify the contents would fundamentally alter the contents themselves (e.g., break the sterile field of packaged medical devices or trigger the enforcement of smart-contract conditions that are triggered by the opening of a package or item). It is also useful in situations where someone other than the end-user seeks to verify package contents without altering them (e.g., customs officers, regulators, etc.). In these situations, the contents of the package can be externally verified through a combination of the hash values of the digital documentation and the documentation itself. In the cases of customs inspectors who may be authorized to break seals to inspect package contents, hashing the video of the inspection and resealing of the packages could also be hashed and written the blockchain, including for instance, a law enforcement or customs blockchain to audit and verify actions and behaviors of those who access packages in commerce.

The ability to verify authenticity through this methodology can also be very useful for collectible or luxury goods that are being sold on a secondary market. In one example, a luxury watch maker can embed data on the packaging, the watch, or both that would allow a secondary purchaser to verify not only the authenticity of the watch, but also that the seller is the rightful owner, that the seller is an authorized dealer (e.g., not "grey market", that is legal but not within the system of authorized dealers on which a purchaser may rely for return, replacement, warranty, or even repair at their own expense). Digital documentation may also be augmented to include purchase receipts, warranty cards or claims, or other identifying information that can be linked to the original item and customer, hashed and written to the blockchain or shared ledger, then stored off-chain for retrieval and utilization in a future transaction such as a re-selling. This capability also allows manufacturers to gain insight into the life of their products following the initial sale. For high-end products, luxury goods, and industrial machinery, this represents a significant advantage, potentially generating resale, repair, or new customer acquisition opportunities during goods and equipment lifecycles.

This can generate enough trust to facilitate a great number of complicated interactions. For example, each party in the supply chain for a particular product can add a cryptographic hash documenting their value-addition as the item moves through the lifecycle. This can be used to resolve disputes, identify where problems occurred within the supply chain, or enforce contractual obligations like the example above. The nature of the technology is such at that each additional participant can build on the hash function of the previous participants, providing irrefutable cryptographic validation of the transaction:

Hash Function{[Item Originator]×[Item Generation]}=$H1$

Hash Function {[$H$11]×[Step 2 in Supply Chain]}=$H2$

Hash Function {[$H$2]×[Step 3 in Supply Chain]}=$H3$

Etc.

The hash function can be a known hashing algorithm, or an Exclusive OR (XOR) operation.

In this example, the supply chain life cycle can be "gated" and check points established with regards to quality, validity, or any other metric relevant to the item. At the point of each hash function, the item and the input are both validated, and become irrefutable. For instance, if the item was in acceptable condition at H2, but was not acceptable at H3, then the issue must be with Step 3 in the Supply Chain.

Additionally, public key/private key cryptographic functionalities can be added to create additional layers of validation or verification. Cryptographic hashes representing partner contributions can be generated using the partner's private key, which can be verified using the corresponding public key. This provides integrity and non-repudiation to the transaction. It is also possible to provide confidentiality to the transaction, whereby the hash elements of the transaction can be encrypted using the public key of a trusted third party. Then, in the instance of a dispute, only the trusted third party can use their private key to decrypt the hash values and examine the transactions. This could be particularly useful in situations where information regarding the participants or the transaction is sensitive (i.e. proprietary data, trade secrets, classified information, etc.). In these settings, the trusted third party can hold additional validation credentials (i.e. a security clearance) to add additional layers of trust to the transaction.

In some cases, a designer or copyright owner may designate that certain designs may only be printed in trusted environments, by trusted vendors, or otherwise limit printing to ensure that only authorized, paid for, properly licensed, or other restrictions are honored. This is similar to photo printer kiosks being present in photo departments of stores so that an attendant may verify that a photo is not being mass-copied, or photocopiers in libraries being located by the librarian desk to prevent someone from copying full books. The venue, attendant, or other components of the location act as deterrents to printing unauthorized items. Some cases might include artistic copyrights, patented parts, or those covered by other intellectual property rights such that rights will not be violated due to the nature of trust, human monitoring, or certification/licensure. For instance, a limited edition 3D printed sculpture might be limited to printing only in one location (e.g., popular vacation locations), or by one manufacturer's printer, or otherwise limited, and trust factors would be elements of decisions on where printed products could be authorized, with buyers assured of receiving what they have purchased.

In some cases, a high value item could be marked (similar to a watermark, embedded barcode, or other identifying factor) to assure its authenticity. This could be used in collectables which garner their value from limited editions, regional editions, or other similar supply constraints. Marking through additive manufacturing and/or packaging would assure that only that number authorized units would be printed, with the mark verifying for instance against a distributed ledger how many were printed and where, assuring authenticity and actual limited editions. Distributed ledger permissions and limits could be applied in such a way that it is similar to "breaking a mold" of a limited edition casting, so that no more may ever be produced. Watermarks can also be encoded into printed items such that scanners could be told not to allow replication similar to features in copiers that limit photocopying U.S. and other currencies despite technological capabilities. Printers and systems could be programmed to search permission white list and black list databases to determine if items may be printed based on watermark technologies, including such items as sensors, barcodes, QR codes, markings invisible to the human eye, patterns that appear to be part of the item but have marking functions, and other types of markings or indicators.

In some cases, a printer may receive only one part of a digital file at a time, may be restricted from copying or transmitting that portion to any other devices, and may be required to "prove" the design is deleted before receiving the next part of the design. The ability to prove that the first portion of the design may be implemented and enforced by software, firmware, or hardware of the 3D printer. For example, in order to be able to print parts requiring such proof, printer owners may be required to install a hardware DRM module in the printer which enables this proof and enforces the deletion of files after printing. In instances of required continuous printing, instructions could be received, buffered, executed, and deleted, while new instructions are being received and buffered so as not to interrupt printing. The printer and communications system can be secured for purposes of unauthorized printing, counterfeiting, design theft, or other conditions. An example of non-continuous 3D printing might be a drone with a body, wings, motors, and propellers. Purchasing one drone print might allow receiving the body design, printing the body, deleting that design, then receiving the wing design, printing the wings, deleting that design, and continuing in sequence with the motor(s), propellers, and so on. Each item which requires continuous printing could receive that design, but not the next part until it proves completion and deletion. Each operation may be written to a distributed ledger demonstrating compliance with the manufacturing process, the packaging process, and so on.

Example Techniques for Reducing Manufacturing and/or Shipping Costs

By utilizing a shared, distributed, immutable ledger to capture and verify each transaction on the network, and thus in a given supply chain or product life cycle, this data can be leveraged to help identify costs and inefficiencies in the manufacturing and shipping/logistics of anything produced utilizing the network and its resources. This can allow for changes in how items are manufactured, resulting in great savings for both producers and consumers.

In one example, the data available through a distributed manufacturing platform or the distributed ledger may be used to transform warehouses and fulfillment centers into production centers. In this example, additive manufacturing capabilities (i.e., 3D printers) could be installed in some or all of a particular warehouse or fulfillment center, changing the focus of the space from receiving, storing, and staging items to creating them. These spaces are naturally suited for this transition, as they are typically located in areas that are easily accessible to modes of transportation, have plenty of space, and have the ability to both bring resources in and send them out. These are all advantages that allow companies with warehouses that currently only serve as a middleman between producer and consumer to become the producer themselves.

In addition to increasing their own opportunity, this transition would significantly reduce the cost in all stages of the manufacturing process—including, but not limited to, lowering cost to produce the item by producing them closer to the point of use, lowering cost to ship the item by producing it closer to the point of use, reducing the cost to store or stage the item by producing it only when ordered and closer to the point of use, and being able to make iterative changes to the item without committing to a bulk production run.

Examples Solutions to the "Last Mile" Problem

By allowing manufacturers to produce items closer to their point of use, the technology described herein enables a host of other capabilities that can add value to the manufacturing and shipping process. Because our technology allows for on-demand production, a number of inputs or variables can be utilized to help solve the "last mile" problem that exists for so many with regards to logistics.

In one example, current conditions can be leveraged to determine packaging requirements at the time of production. For instance, current weather at the delivery location or forecast weather at the delivery time can dictate if the packaging needs to be water-resistant, water-proof, temperature controlled, etc. Other data points can include whether or not a customer will be physically present at the time and place of delivery (i.e., whether additional security or authentication capabilities need to be incorporated into the packaging), whether there are pets or children present at the location (particularly in the case of packaging food or medicine), whether the time in transit has the potential to impact the item, etc.

The on-demand manufacturing and packaging capabilities can also incorporate interactions from the end user to dictate some of these needs. In one example, the delivery mode or time can be based on customer availability, location, or other preference. In this example, the user may request that the delivery to be made to their office as soon as possible, and packaging for drone delivery can be created.

Other end-user input can be incorporated to create customized packaging in both shape and functionality. For example, it may be beneficial to print two layers of packaging for security, obfuscation, discretion, protection, or other reasons. External packaging can be customized to reflect the contents or minimize the attention the package might receive in transit. Branding for the interior packaging can be retained (i.e. consumer electronics with strong branding requirements). In another example, delayed access capabilities can be incorporated (i.e. a gift from a loved one that cannot be opened until your birthday, Christmas Day, etc.).

Examples Facilitating Interoperability

Significant challenges exist with regards to interoperability of design files and file types, as well as translation between two-dimensional designs or design components and three-dimensional designs and design components. The techniques described herein provide several direct solutions to these problems.

In some examples, an extensible platform can be enabled through an Application Programming Interface (API) of a distributed manufacturing platform that provides a level of commonality. The API may allow for the exchange or manipulation of multiple file types (e.g. CAD files, .PSD files, PDF files, standard 3D printer files such as .STL, .OBJ, .VRML, .DAE, .3MF, etc.). Translation capabilities also exist for measurements (i.e. between inches, centimeters, millimeters, etc.). The distributed manufacturing platform may additionally or alternatively be extensible through plugins or modules that can be developed by third-parties to work with their own proprietary or preferred formats. These and any of the other file processing operations described herein may be performed via the API or other interface of the distributed manufacturing platform.

Additional translation, mapping, or merge capabilities exist to merge a three-dimensional model with a two-dimensional design (e.g., to map a 2D image onto a 3D item, or two wrap a 3D item with a 2D wrap so that the image applied to the 3D object is not distorted). In this example, the API or other file translation software translates two-dimensional elements in a three-dimensional representation (e.g., applying a two-dimensional element to the surface of a three-dimensional object that has been produced via additive manufacturing). In some examples, existing drawing or rendering software may be adapted to translate two-dimensional images for application to three-dimensional parts. By way of example and not limitation, software products that can be adapted or interfaced with include templates for Adobe Illustrator, SignLab, CorelDraw, Photoshop, Gerber Advantage, and FlexiSign. The platform is also able to use multiple criteria to select the most appropriate printer for each element (i.e., which device should create the two-dimensional elements given which devices is creating the three-dimensional elements, etc.). In some examples, printers can be selected based on resolution, material, color, speed, cost, addressable print size, continuous print capacity (e.g., moving bed, moving print head, continuous sheet stock), maintenance, wear characteristics, such as fading "ink", worn print heads, alignment, leveling, and/or related characteristics. Some components or materials may employ floating print beds not subjected to vibration or movement. Selection may include proximity to additional "assembly line" printers for the other components that are 3D.

This translation, mapping, transposition, interpretation, and extrapolation capabilities allow the distributed manufacturing platform to provide color consistency (i.e. Pantone colors, ICC (International Colour Consortium) color map, etc.), standardized specifications regarding particular printing media, and a reverse-engineering capability whereby visual scans of physical items or original CAD files can be interpreted to facilitate digital creation and modification or the item or components of the item.

Example Distributed Finishing and Post Processing

The flexible nature of the distributed manufacturing techniques described herein with regards to file types and dimensions provides significant value to the finishing and post-processing phase of manufacturing. In this example, products can be created that merge three-dimensional objects and two-dimensional objects in a number of unique ways that were previously not feasible.

For example, a distributed manufacturing platform allows for a two-dimensional "shrink wrap," applique, or other covering to be printed in two dimensions and subsequently applied to a three-dimensional object. This can be done for protection, aesthetics, to provide customized branding or advertising, to create photo-realistic representations of an object, to apply a different surface finish, etc. These appliques may take the form of traditional shrink-wrapping, manifest as a simple iron-on applique, or become a full wrap where the "skin" is indistinguishable from the underlying three-dimensional frame. In some examples, after the wrap or cover is applied, the item may be heat treated to bond or fuse the skin to the item.

The distributed manufacturing platform allows customers to preview both how the two-dimensional wrapping will look on the completed package, but also how the two-dimensional item must be created to achieve that look, as well as illustrating the process to achieve the desired outcome (order of application for the wrapping components, modularity of the two-dimensional to achieve desired outcomes (i.e. two-part wraps, three-part wraps, etc.)).

Customized size, shape, configuration of wrapping, and other options such as customized sealing adhesives (e.g., tape) can be included in this portion of the process to achieve the desired outcome. Additionally, the platform can utilize "negative space" to provide visibility to the underlying object, creating additional opportunities to customize the final output, save costs on printing (e.g., no need to print black design elements if item itself is printed from black material, but instead leave that portion of the print clear or empty to allow the underlying material to show through).

The application of this type of post-processing can take place either at the same geographic location as the printing, or the platform allows for disparate geographic locations to be combined to achieve the desired outcome (e.g., the three-dimensional item is created in one location and the two-dimensional elements are created in another, and it is possible that they might be applied at a third location, or by the end consumer, etc.). Because the post-processing component can be disintermediated, these processes can take place in-transit (e.g., a team of people, processes, or machines can apply post-processing items en-route, and then can be packaged after post processing either en-route to the final destination or packaged at an intermediary destination after post-processing).

In that example, it is possible that the items can be delivered ready for post-processing, or delivered with temporary packaging, packaging that allows for final post-processing, packaging that includes supplies to perform post-processing, or packaging that can be used itself to perform post-processing (e.g., built-in tooling, stickers that can be applied to the item, etc.). Items can also be designed to be delivered with minimal packaging that does require some final assembly (similarly to how some popular Scandanavian furniture requires final assembly by the customer).

Example Reduction in Environmental Impact

In addition to offering increased functionality, reducing logistics overhead and other sources of friction, the techniques described herein greatly reduce the environmental impact of a given supply chain, something that is both difficult to do and in high-demand. In some examples, this is due to the ability to reduce associated fuel costs with transporting manufactured items. For example, by allowing manufacturers to produce items closer to the point of use, they can reduce the actual distance that a manufactured item must be shipped to reach the end user. Furthermore, by 3D printing a custom package for each item, the amount of packaging can be reduced to the minimum necessary amount for the given functionality requirements, and additionally the weight of any given amount of packaging is reduced to a minimum. By reducing both size and weight of packaging, without adversely impacting functionality (and potentially improving functionality and durability of the package), the weight of the cargo is reduced—thereby increasing fuel efficiency during transport—or the size of the cargo is reduced—thereby allowing more cargo to be shipped on a given modality (i.e. cargo ship, tractor trailer, box delivery truck, etc.)—or both.

By optimizing packaging materials based on functionality requirements and other dynamic inputs previously mentioned (package contents, weather, mode of transport, variable regarding the end-user, etc.) the 3D printed packaging and distributed manufacturing techniques allow manufacturers, shippers, and end-users to collaborate dynamically to create a balance of these competing factors. A goal of the platform is to optimize—not necessarily to minimize—packaging. This allows the platform to create packaging that can reduce breakage or insurance claims resulting from mishandling, incorporate biodegradable or reusable packaging, produce packaging that is both environmentally friendly and environmentally attuned, and incur additional costs (weight, size, materials, etc.) only when the involved parties agree that it is "worth it."

This agreement can be achieved dynamically in multiple ways. In some examples, the end user can select their packaging preferences, along with the associated impacts (e.g., some choices may increase or decrease cost, increase or decrease delivery time, etc.). In other examples, the end user and the manufacturer are interacting through the platform based on smart-contract capabilities (e.g., the end user orders an item and is willing to accept delivery within a given date or cost window, and the manufacturer can work to meet those requirements most efficiently). In other examples, this interaction can take place directly during the production and shipping lifecycle. In some examples, the end user may receive a notification by SMS message on a mobile device or push-notification within an application on a tablet or other computing device indicating that there is a possibility to change their order with proper incentives (e.g., another user is willing to purchase the same item at a higher price if they can get it more quickly, and the manufacturer might offer to share the balance of the increased sale price with the end user in exchange for re-routing their item to the higher bidder and accepting a later delivery in exchange for a cut of the margin or credit towards future purchase; or a truck is over capacity and a shipper might offer a discounted shipping charge if the item is put on a later truck, etc.). The system can utilize many factors in calculating opportunities for dynamic re-routing, including but not limited to possibility of increased sale price, item location, weather, shipping delays or impacts, past purchase behavior, time to replace the original item to the original customer, and more. When the system determines that an opportunity for an increase in revenue is possible, it sends notice to the potentially impacted customer, who has now become a partner in realizing this additional value. The recipient of notice can then immediately and finally accept or reject the proposal, or, in some cases, propose an alternative arrangement (i.e. an increase or decrease in the amount of compensation, amount of time they are willing to bear in order to receive their item, etc.). The system can then re-calculate the opportunity and accept or reject the counter-proposal. In instances where the counter-proposal does not impact the secondary customer's purchase offer (i.e. it aligns with their purchase terms on both price and time), the system can accept the counter-offer and make the appropriate changes in the shipping, routing, or other supply chain components. In instances where the counter-proposal does impact the secondary customer's purchase offer (i.e. an increased price or timeline than originally tendered), the system can then notify the secondary customer of the new offer. The secondary customer can continue to negotiate, or choose to accept or reject the offer outright. The negotiation process can continue until a final acceptance or rejection is achieved. If an acceptance of new terms is reached by all parties, the outcome of this newly altered transaction are then automatically written to the blockchain or shared ledger to indicate the change was made, and the system may or may not choose to include the terms of the negotiation. If the new offer is rejected by any party, the system can then seek a new potential opportunity and begin the negotiation process again. In these examples, multiple parties are able to interact and achieve outcomes that are beneficial for all—the manufacturer, the original purchaser, the shipper, and the new customer willing to pay more—where all feel satisfied with the arrangement.

The techniques described herein can further reduce the environmental impact of a given supply chain by utilizing the packaging in fundamentally new ways. In addition to offering both recyclable packaging options and biodegradable packaging options, it is possible to design both interactions and functionality into the packaging to achieve this reduced impact. In some examples, this involves opening the package immediately upon receipt and inspecting the final item. In this example, the delivery mechanism (postal worker, drone, ride-share driver, messenger, etc.) can serve as an external validator of both successful delivery to the identified recipient and the undamaged and fully functional status of the product. In addition to this third-party validation of a successful transaction, the packaging itself is designed to be recovered by the delivery mechanism on-the-spot for recycling or reuse and the end user may receive some financial compensation for returning or reusing their packaging.

In some examples, the packaging may be design to collapse, fold in, fold flat, disassemble, or otherwise be reduced in size and bulk for return transport. In other examples, the packaging may be collected by a third party (municipality, private company, neighborhood association, apartment building, etc.) in bulk and then repurposed in batches.

In other examples, the packaging itself can be designed to be "reversible" and enable additional engagements. For instance, returning an item may be as simple as "reversing" the packaging in whole or in part to re-secure the item and update the shipping location back to the manufacturer or retailer. In some examples, this may take the form of two-piece packaging where the top portion can be reversed to reveal a pre-labeled return address while the bottom portion can remain suited to provide safe passage to the item. In other examples, the shipping destination may be represented by a machine-readable code (e.g., Barcode, Quick Response Code, RFID tag, Bluetooth/Zigbee beacon, etc.) and the end user can simply alter the representation of that destination code back to the manufacturer or return center through a web portal, mobile phone app, or interaction with the delivery mechanism. By simply changing the address in the backend database and not the physical representation on the packaging, this permanent or semi-permanent addressing mechanism can allow for more durable packaging to be re-used many times, either by being returned to the manufacturer to ship another item, or forwarded on to the nearest manufacturing location in need of that type of packaging.

In some examples, new items being delivered may be replacing items that can be refurbished or remanufactured (e.g., phones, electronic toothbrush heads, glasses, printer cartridges, ammunition casings, auto parts, etc.). In these cases, the packaging can be utilized to not only deliver the new item, but also package one or multiple of the items being replaced. These items can be returned to the manufacturer directly, forwarded to a different location for re-manufacture, or shipped on to a third party for recycling, repurposing, or some other use. In combination with the permanent machine-readable addressing, the destination of the items being replaced can be done dynamically (e.g., through an online auction where the highest bidder receives the item) or through direct integration with other supply chain components. This capability will reduce unnecessarily shipping items to a depot, warehouse, or other staging area and will instead send them directly to their next point of use.

In some examples, this remanufacturing can be accomplished through additional additive manufacturing (e.g., printing additional material on a worn part to restore functionality, printing new threads onto a pipe or screw, adding layers of enamel to dental implants, resoling shoes, etc.). The techniques described herein allow for these items to reach their refurbisher quickly, efficiently, and with minimal waste by using some or a combination of the above technologies to get remanufacturable parts into the hands of those who can capture, restore, and add value to the items. The same packaging can then be used to send the remanufactured item onto a new user, and restart the virtuous cycle, adding to or repairing the packaging as needed in a similar manner.

There are also examples where remanufacturing offers an opportunity to increase functionality beyond what was originally possible (e.g., upgrading from stainless steel to titanium, adding carbide or diamond components to a saw, etc.). This capability can be incorporated into not only the capture and return of the item, but also in the sales and distribution of enhanced items, all utilizing a consistent packaging platform.

Examples of Source Identification and Verification

Significant challenges surround capturing and validating inputs of a particular supply chain (source of raw materials, proving provenance, preventing tampering or fraud, etc.). The distributed manufacturing and blockchain enabled packaging techniques described herein allow for several novel solutions to this problem.

In some examples, the packaging of an item can contain geolocation data (e.g., automatically recorded by a sensor suite in/on the package, input by a manufacturer or certification authority manually or automatically) to authenticate point of manufacture (e.g., if a diamond is sourced from Canada, it can't be a "blood diamond"; champagne is sourced from the proper region in France, etc.). This geo-location data can be written into or onto the packaging in an unalterable way (e.g., through an embedded sensor such as GPS that both generates and retains the data, an embedded sensor that only retains the data such as a RFID or NFC tag, Bluetooth/Zigbee, etc.). Additionally or alternatively physical code (either machine readable such as a Barcode, Quick Response Code, watermark, or human readable such as serial number or other unique identifier) can be printed as part of the packaging, any of which can then be verified utilizing a distributed, shared, immutable ledger to retrieve and verify relevant details.

In addition to geolocation, other data can be added to the packaging, as well, which can also be verified at later points in the supply chain or at the point of use. This might include, but is not limited to, type and source of raw materials, batch of material, material data sheet, any relevant verifications, approvals, or certifications (e.g., FDA-approved, certified organic, non-GMO verified, licensed, etc.). In addition to the packaging, it is possible to move the verification upstream to the point of manufacture and certify the make, model, identifier, and/or owner of the printer and/or contents of the printer (e.g., print media, printer cartridge, etc.). In this instance, the data would represent the source of manufacture, which could then be verified for a given time and date utilizing the shared, distributed ledger to ensure authenticity.

These solutions can be combined, where in the printer itself writes the contents of the package to the packaging itself. This can be done discretely on the internals of the packaging so that only the end user can verify the contents (e.g., via a machine-readable code or watermark), or externally allowing a potential customer or participant in the supply chain to verify the contents without opening the packaging.

Because of the underlying nature of the ability to store, share, and retrieve this data, our platform allows for sophisticated analytics capability based on the movement of raw materials, printers, and packages.

CONCLUSION

Although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
supporting an item in a printing area of a three dimensional (3-D) printer of a first entity;
printing a package at least partially around the item in the printing area of the 3-D printer;
sending data about the package and the item to a second entity, wherein the second entity is a different company or organization than the first entity; and
recording the data about the package and the item to a distributed ledger,
wherein the second entity is an aggregator which is communicatively coupled to multiple different manufacturing entities and multiple different shipping entities, the aggregator being configured to determine a shipping company from among the multiple different shipping entities to use to deliver the package.

2. The method of claim 1, wherein the second entity comprises the shipping company, the method further comprising:
receiving from the second entity an indication of a time at which the package will be picked up for shipping.

3. The method of claim 1, wherein the data about the package comprises an identifier of the 3-D printer used to package the item, an identifier of the first entity, and a date on which the item was packaged.

4. The method of claim 3, wherein the data about the item comprises a unique identifier of the item.

5. The method of claim 4, wherein the data about the package and the item further comprises an identifier of a purchaser of the item and an identifier of a recipient of the item.

6. The method of claim 1, further comprising recording a smart contract to the distributed ledger, the smart contract being associated with a transaction involving the item.

7. The method of claim 6, wherein the smart contract is configured to automatically cause payment of a fee by a purchaser upon performance of one or more triggering actions, the one or more triggering actions comprising:
packaging of the item;
movement of the package from one location to another; or
change of custody of the package.

8. The method of claim 7, wherein the smart contract is cryptographically hashed and a hash of the smart contract is written to the distributed ledger.

9. A method comprising:
receiving, at a first entity, an instruction to package an item;
determining, by the first entity, a three dimensional (3-D) printer from among multiple available 3-D printers to use to package the item;
causing the 3-D printer to print a package at least partially around the item;
sending data about the package and the item to a second entity, wherein the second entity is a different company or organization than the first entity; and
recording the data about the package and the item to a distributed ledger,
wherein the data about the package comprises an identifier of the 3-D printer used to package the item, an identifier of the first entity, and a date on which the item was packaged.

10. The method of claim 9, wherein the second entity comprises a shipping company, the method further comprising:
receiving from the second entity an indication of a time at which the package will be picked up for shipping.

11. The method of claim 9, wherein the second entity is an aggregator which is communicatively coupled to multiple different manufacturing entities and multiple different shipping entities, the aggregator being configured to determine a shipping company from among the multiple different shipping entities to use to deliver the package.

12. The method of claim 9, wherein the data about the item comprises a unique identifier of the item.

13. The method of claim 9, wherein the data about the package and the item further comprises an identifier of a purchaser of the item and an identifier of a recipient of the item.

14. The method of claim 9, further comprising recording a smart contract to the distributed ledger, the smart contract being associated with a transaction involving the item.

15. The method of claim 14, wherein the smart contract is configured to automatically cause payment of a fee by a purchaser upon performance of one or more triggering actions, the one or more triggering actions comprising:
packaging of the item;
movement of the package from one location to another; or
change of custody of the package.

16. The method of claim 15, wherein the smart contract is cryptographically hashed and a hash of the smart contract is written to the distributed ledger.

17. A system comprising:
one or more processors;
memory storing instructions that, when executed, configure the system to perform operations comprising:
supporting an item in a printing area of a three dimensional (3-D) printer of a first entity;
printing a package at least partially around the item in the printing area of the 3-D printer;
sending data about the package and the item to a second entity, wherein the second entity is a different company or organization than the first entity; and
recording the data about the package and the item to a distributed ledger,
wherein the second entity is an aggregator which is communicatively coupled to multiple different manufacturing entities and multiple different shipping entities, the aggregator being configured to determine a shipping company from among the multiple different shipping entities to use to deliver the package.

18. The system of claim 17, the instructions further configuring the system to perform operations comprising:
recording a smart contract to the distributed ledger, the smart contract being associated with a transaction involving the item,
wherein the smart contract is configured to automatically cause payment of a fee by a purchaser upon performance of one or more triggering actions, the one or more triggering actions comprising:
packaging of the item;
movement of the package from one location to another; or
change of custody of the package.

* * * * *